(12) United States Patent
Kosche et al.

(10) Patent No.: US 8,762,951 B1
(45) Date of Patent: Jun. 24, 2014

(54) APPARATUS AND METHOD FOR PROFILING SYSTEM EVENTS IN A FINE GRAIN MULTI-THREADED MULTI-CORE PROCESSOR

(75) Inventors: Nicolai Kosche, San Francisco, CA (US); James P. Laudon, Madison, WI (US); Adam R. Talcott, Los Altos, CA (US); Sanjay Patel, Fremont, CA (US); Farnad Sajjadian, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1965 days.

(21) Appl. No.: 11/689,359

(22) Filed: Mar. 21, 2007

(51) Int. Cl.
*G06F 9/44* (2006.01)
(52) U.S. Cl.
USPC .......................................................... 717/127
(58) Field of Classification Search
None
See application file for complete search history.

(56) References Cited

U.S. PATENT DOCUMENTS

| | | | |
|---|---|---|---|
| 5,355,484 A * | 10/1994 | Record et al. ................. | 717/127 |
| 5,666,509 A | 9/1997 | McCarthy et al. | |
| 5,768,419 A | 6/1998 | Gundlach et al. | |
| 5,822,578 A | 10/1998 | Frank et al. | |
| 5,828,883 A | 10/1998 | Hall | |
| 5,937,191 A | 8/1999 | Graham | |
| 5,950,003 A | 9/1999 | Kaneshiro et al. | |
| 5,964,867 A | 10/1999 | Anderson et al. | |
| 5,999,736 A | 12/1999 | Gupta et al. | |
| 6,002,872 A | 12/1999 | Alexander et al. | |
| 6,021,261 A * | 2/2000 | Barrett et al. .................... | 714/37 |
| 6,061,711 A | 5/2000 | Song et al. | |
| 6,079,032 A | 6/2000 | Peri | |
| 6,085,312 A | 7/2000 | Abdallah et al. | |
| 6,145,121 A | 11/2000 | Levy et al. | |
| 6,189,141 B1 | 2/2001 | Benitez et al. | |
| 6,282,701 B1 | 8/2001 | Wygodny et al. | |
| 6,311,326 B1 | 10/2001 | Shagam | |
| 6,314,533 B1 | 11/2001 | Novik et al. | |
| 6,343,295 B1 * | 1/2002 | MacLeod et al. ...... | 707/999.103 |
| 6,349,406 B1 | 2/2002 | Levine et al. | |
| 6,363,053 B1 | 3/2002 | Schuster et al. | |
| 6,367,034 B1 | 4/2002 | Novik et al. | |
| 6,374,367 B1 * | 4/2002 | Dean et al. ..................... | 714/37 |

(Continued)

OTHER PUBLICATIONS

U.S. Appl. No. 10/881,032, entitled "Performance Instrumentation in a Fine Grain Multithreaded Multicore Processor".

(Continued)

*Primary Examiner* — Jue Louie
(74) *Attorney, Agent, or Firm* — Robert C. Kowert; Meyertons, Hood, Kivlin, Kowert & Goetzel, P.C.

(57) ABSTRACT

A system and method for profiling runtime system events of a computer system may include associating a data source type with detected system events. The system events may be detected dependent on information included in a reply message received by a processor in response to a data request or other transaction request message. The reply message may include information characterizing a source type of a source of data included in the reply message. The source type information may indicate that the source is remote or local; that it is a shared or a private storage location; that the data is supplied via a cache-to-cache transfer; or that the data is sourced from a coherency domain other than that of the requesting process. Instructions, events, messages, and replies may be sampled, and extended address information corresponding to the samples may be stored in an event set database for performance analysis.

14 Claims, 48 Drawing Sheets

(56) References Cited

U.S. PATENT DOCUMENTS

| | | | |
|---|---|---|---|
| 6,401,240 B1 | 6/2002 | Summers | |
| 6,427,140 B1 | 7/2002 | Ginter et al. | |
| 6,467,052 B1 | 10/2002 | Kaler et al. | |
| 6,519,766 B1 | 2/2003 | Barritz et al. | |
| 6,539,339 B1 | 3/2003 | Berry et al. | |
| 6,634,023 B1 | 10/2003 | Komatsu et al. | |
| 6,671,830 B2 | 12/2003 | Kaler et al. | |
| 6,694,425 B1 | 2/2004 | Eickemeyer | |
| 6,704,842 B1* | 3/2004 | Janakiraman et al. | 711/141 |
| 6,708,173 B1 | 3/2004 | Behr et al. | |
| 6,725,363 B1 | 4/2004 | Damron | |
| 6,728,955 B1 | 4/2004 | Berry et al. | |
| 6,735,758 B1 | 5/2004 | Berry et al. | |
| 6,754,891 B1 | 6/2004 | Snyder et al. | |
| 6,775,827 B1 | 8/2004 | Harkins | |
| 6,804,814 B1 | 10/2004 | Ayers et al. | |
| 6,907,520 B2 | 6/2005 | Parady | |
| 7,007,269 B2 | 2/2006 | Sluiman et al. | |
| 7,013,456 B1 | 3/2006 | Van Dyke et al. | |
| 7,039,910 B2 | 5/2006 | Kosche et al. | |
| 7,086,064 B1 | 8/2006 | Stevens | |
| 7,111,059 B1 | 9/2006 | Garcea et al. | |
| 7,111,290 B1 | 9/2006 | Yates et al. | |
| 7,137,110 B1 | 11/2006 | Reese et al. | |
| 7,379,860 B1 | 5/2008 | Bartz et al. | |
| 7,389,497 B1 | 6/2008 | Edmark et al. | |
| 7,426,684 B2 | 9/2008 | LaFrance-Linden | |
| 7,707,554 B1* | 4/2010 | Kosche et al. | 717/127 |
| 7,779,238 B2 | 8/2010 | Kosche et al. | |
| 7,904,889 B2 | 3/2011 | Avitzur et al. | |
| 8,032,875 B2 | 10/2011 | Kosche et al. | |
| 8,166,462 B2 | 4/2012 | Kosche et al. | |
| 8,176,475 B2 | 5/2012 | Kosche et al. | |
| 2002/0032754 A1 | 3/2002 | Logston et al. | |
| 2002/0174416 A1 | 11/2002 | Bates et al. | |
| 2003/0101336 A1 | 5/2003 | Kosche | |
| 2003/0188226 A1 | 10/2003 | Talcott et al. | |
| 2004/0031020 A1 | 2/2004 | Berry et al. | |
| 2004/0034795 A1 | 2/2004 | Anderson et al. | |
| 2004/0078784 A1 | 4/2004 | Bates et al. | |
| 2004/0163079 A1 | 8/2004 | Noy et al. | |
| 2004/0225948 A1* | 11/2004 | Adkisson et al. | 714/776 |
| 2005/0010930 A1 | 1/2005 | Vaught | |
| 2005/0021708 A1* | 1/2005 | Raghuraman et al. | 709/223 |
| 2005/0071515 A1 | 3/2005 | DeWitt et al. | |
| 2005/0183066 A1 | 8/2005 | Jabori | |
| 2006/0130070 A1 | 6/2006 | Graf | |
| 2006/0167939 A1 | 7/2006 | Seidman et al. | |
| 2006/0179207 A1 | 8/2006 | Eisen et al. | |
| 2006/0206882 A1 | 9/2006 | Illowsky et al. | |
| 2006/0230391 A1 | 10/2006 | Alexander et al. | |
| 2006/0259751 A1* | 11/2006 | Sohm et al. | 712/227 |
| 2006/0259981 A1 | 11/2006 | Ben-Shoshan | |
| 2007/0043861 A1 | 2/2007 | Baron et al. | |
| 2007/0214342 A1 | 9/2007 | Newburn et al. | |
| 2007/0250466 A1 | 10/2007 | Imrapur et al. | |
| 2008/0127120 A1* | 5/2008 | Kosche et al. | 717/131 |

OTHER PUBLICATIONS

U.S. Appl. No. 10/840,164 entitled "Method and Apparatus for Profiling Data Addresses".
U.S. Appl. No. 10/880,485 entitled "Associating Data Source Information With Runtime Events".
U.S. Appl. No. 10/840,180 entitled "Method and Apparatus for Correlating Profile Data".
U.S. Appl. No. 10/840,167 entitled "Method and Apparatus for Data Object Profiling".
U.S. Appl. No. 11/517,085, filed Sep. 7, 2006.
U.S. Appl. No. 11/516,980, filed Sep. 7, 2006.
U.S. Appl. No. 11/589,492, filed Oct. 30, 2006.
U.S. Appl. No. 11/590,288, filed Oct. 31, 2006.
U.S. Appl. No. 11/557,874, filed Nov. 8, 2006.
U.S. Appl. No. 11/559,275, filed Nov. 13, 2006.
U.S. Appl. No. 11/563,962, filed Nov. 28, 2006.
Sameer Shende, et al., "Portable Profiling and Tracing for Parallel, Scientific Applications using C++," Proceedings of the Sigmetrics symposium on Parallel and distributed tools; 1998, pp. 134-145, ACM.
Dean, et al., "ProfileMe: Hardware Support for Instruction-Level Profiling on Out-of-Order Processors," Proceedings of the 30th Annual ACM/IEEE International Symposium on Microarchitecture, ACM, 1997, pp. 292-302.
Sprunt, "The Basics of Performance-Monitoring Hardware," IEEE Micro, vol. 22, Iss. 4, Jul.-Aug. 2002, pp. 64-71.
Ungerer, et al., "A Survey of Processors with Explicit Multithreading," ACM Computing Surveys, vol. 35, iss. 1, Mar. 2003, pp. 29-63.
Mysore, et al., "Profiling over Adaptive Rangers," Proceedings of the International Symposium on Code Generation and Optimization, 2006, pp. m 147-158.
Monreal, et al., "Late Allocation and Early Release of Physical Registers," IEEE Transactions on Computers, vol. 53, iss. 10, Oct. 2004, pp. 1244-1259.
Lysecky, et al., "A Fast On-Chip Profiler Memory," Proceedings of the 39th Annual Design Automation Conference, ACM 2002, pp. 28-33.
Buck, B., et al., "Using Hardware Performance Monitors to Isolate Memory bottlenecks," 2000, Proceedings of the 2000 ACM/IEEE Conference on Supercomputing (CDROM), pp. 1-10.
DeRose, L., et al. "SIGMA: A Simulator Infrastructure to Guide Memory Analysis," 2002, Proceedings of the 2002 ACM/IEEE Conference on Supercomputing, pp. 1-13.
Itzkowitz, M., et al., "Memory Profiling Using Hardware Counters," 2003, Proceedings of the 2003 ACM/IEEE Conference on Supercomputing, pp. 1-13.
"Using Paths to Measure, Explain, and Enhance Program Behavior," Ball, et al., IEEE, Aug. 6, 2002, pp. 1-9.
Nicolai Kosche, "Sun Sensible," Sun Microsystems, Sep. 15, 2005, pp. 1-11.

* cited by examiner

| data stall seconds | address | address type |
|---|---|---|
| 549.909 | <TOTAL> | |
| 75.303 | 0X02000640 | physical |
| 14.270 | 0X02000720 | physical |
| ... | ... | |
| ... | ... | virtual |

*FIG. 20*

| E$ stall seconds | data E$ read misses % | data E$ read references % | data DTLB misses % | source-level data object language construct |
|---|---|---|---|---|
| 297.569 | 100.00 | 100.00 | 100.00 | <TOTAL> |
| 166.402 | 59.4 | 37.3 | 70.0 | TREE |
| 124.601 | 39.5 | 41.4 | 29.7 | TABLE |
| ... | ... | ... | ... | ... |
| ... | ... | ... | ... | ... |

*FIG. 21A*

| E$ stall seconds | data E$ read misses % | data E$ read references % | data DTLB misses % | source-level data object language construct |
|---|---|---|---|---|
| 166.402 | 59.4 | 37.3 | 70.0 | TREE |
| 29.1 | 8.2 | 3.7 | 0.1 | INT TREE.LEAFS |
| ... | ... | ... | ... | ... |
| ... | ... | ... | ... | ... |

*FIG. 21B*

| E$ stall seconds | E$ cycles % | functions |
|---|---|---|
| 785.235 | 100.00 | <TOTAL> |
| 39.262 | 5.00 | STACK_CONTROL |
| 38.477 | 4.9 | GARBAGE_COLLECT |
| ... | ... | ... |
| ... | ... | ... |

FIG. 22A

| E$ stall seconds | E$ cycles % | source-level data object language constructs |
|---|---|---|
| 785.235 | 100.00 | <TOTAL> |
| 117.785 | 15.00 | TOS |
| 94.239 | 12.00 | NUM_ENTRIES |
| ... | ... | ... |
| ... | ... | ... |

FIG. 22B

| E$ stall seconds | E$ cycles % | time in seconds |
|---|---|---|
| 785.235 | 100.00 | <TOTAL> |
| 15.704 | 2.00 | 0 - 10 |
| 23.557 | 3.00 | 10 - 20 |
| 196.309 | 25.00 | 20 - 30 |
| ... | ... | ... |

FIG. 22C

| E$ stall seconds | E$ cycles % | E$ cycles % for selected parameters | functions |
|---|---|---|---|
| 196.309 | 25.00 | 100.00 | <TOTAL> |
| 31.409 | 4.00 | 16.00 | GARBAGE_COLLECT |
| 5.889 | 0.75 | 3.00 | STACK_CONTROL |
| ... | ... | ... | ... |

FIG. 22D

| E$ stall seconds | E$ cycles % | E$ cycles % for selected parameters | functions |
|---|---|---|---|
| 31.409 | 4.00 | 100.00 | <TOTAL> |
| 29.839 | 3.8 | 95.00 | Structure H |
| ... | ... | ... | ... |
| ... | ... | ... | ... |

FIG. 22E

| E$ stall seconds | E$ cycles % | E$ cycles % for selected parameters | H elements [offset] |
|---|---|---|---|
| 31.409 | 4.00 | 100.00 | <TOTAL> |
| 29.839 | 3.8 | 95.00 | H.HEAD [0] |
| ... | ... | ... | H.TAIL [4] |
| ... | ... | ... | ... |
| 14.9195 | 1.9 | 50.0 | H.VOLUME [158] |

| Functions | DataObjects | Vpage_8k | Ppage_8k | L1CacheLine | L2CacheLine | Core |
|---|---|---|---|---|---|---|

| User CPU (sec.) | Max. Mem. Stall (sec.) | Name |
|---|---|---|
| 32 164.449 | 24 834.612 | <Total> |
| 7 360.979 | 6 785.924 | function4 |
| 4 898.507 | 4 396.145 | function2 |
| 3 189.921 | 2 915.499 | function17 |
| 2 104.602 | 1 828.489 | function42 |
| 1 919.703 | 1 693.845 | function25 |
| 1 887.680 | 858.030 | function63 |
| 1 600.329 | 461.493 | function7 |
| 1 282.067 | 853.917 | function28 |
| 1 236.585 | 608.195 | function19 |
| 732.397 | 689.372 | function10 |
| 666.636 | 139.289 | function33 |
| 571.980 | 434.424 | function3 |
| 556.429 | 188.112 | function12 |
| 507.395 | 435.855 | function48 |
| 499.029 | 232.433 | function51 |
| 482.788 | 380.456 | function5 |
| 465.175 | 298.079 | function1 |
| 426.989 | 375.212 | function71 |
| 399.019 | 348.564 | function13 |
| 219.844 | 134.474 | function22 |
| 77.294 | 42.510 | function65 |
| 64.705 | 13.379 | function88 |
| 58.711 | 8.316 | function99 | tabs 2220 select L2CacheLine next 2210 data display window

| L2Cacheline | Core | Strand | Vaddr | VA_L1 | VA_L2 | Process | Thread |
|---|---|---|---|---|---|---|---|

Display Mode:  ● Text  ○ Graphical

| Max. Mem. Stall | | Name |
|---|---|---|
| (sec.) | (%) | |
| 5 437.193 | 100.00 | <Total> |
| 5 435.963 | 99.98 | VA_L2 Memory Object 2882303761 16256393 |
| 0.140 | 0.00 | VA_L2 Memory Object 2882303761 16213654 |
| 0.130 | 0.00 | VA_L2 Memory Object 2882303761 16254698 |
| 0.110 | 0.00 | VA_L2 Memory Object 2882303761 16212765 |
| 0.110 | 0.00 | VA_L2 Memory Object 2882303761 16279542 |
| 0.100 | 0.00 | VA_L2 Memory Object 2882303761 16215963 |
| 0.090 | 0.00 | VA_L2 Memory Object 2882303761 16275321 |
| 0.090 | 0.00 | VA_L2 Memory Object 2882303761 16297642 |
| 0.080 | 0.00 | VA_L2 Memory Object 2882303761 16223648 |
| 0.080 | 0.00 | VA_L2 Memory Object 2882303761 16254987 |
| 0.070 | 0.00 | VA_L2 Memory Object 2882303761 16224622 |
| 0.060 | 0.00 | VA_L2 Memory Object 2882303761 16288469 |
| 0.060 | 0.00 | VA_L2 Memory Object 2882303761 16257746 |
| 0.060 | 0.00 | VA_L2 Memory Object 2882303761 16211368 |
| 0.050 | 0.00 | VA_L2 Memory Object 2882303761 16244698 |
| 0.040 | 0.00 | VA_L2 Memory Object 2882303761 16275526 |
| 0.030 | 0.00 | VA_L2 Memory Object 2882303761 16288552 |
| 0.030 | 0.00 | VA_L2 Memory Object 2882303761 16244698 |
| 0.030 | 0.00 | VA_L2 Memory Object 2882303761 16289946 |

*FIG. 25J*

Object Name: PA_L2

Formula:

(PADDR >> 6)

OK    Apply    Close    Help

*FIG. 25O*

| PA_L2 | Core | Strand | Vaddr | VA_L1 | VA_L2 | Process | Thread |

Display Mode: ● Text ○ Graphical

| Max. Mem. Stall | | Name |
|---|---|---|
| (sec.) | (%) | |
| 5 437.193 | 100.00 | <Total> |
| 215.871 | 3.97 | PA_L2 Memory Object 254803593 |
| 215.271 | 3.96 | PA_L2 Memory Object 254852745 |
| 213.780 | 3.93 | PA_L2 Memory Object 254713481 |
| 212.949 | 3.92 | PA_L2 Memory Object 254918281 |
| 211.848 | 3.90 | PA_L2 Memory Object 254901897 |
| 209.937 | 3.86 | PA_L2 Memory Object 254844553 |
| 209.186 | 3.85 | PA_L2 Memory Object 254770825 |
| 207.715 | 3.82 | PA_L2 Memory Object 254819977 |
| 207.465 | 3.82 | PA_L2 Memory Object 254738057 |
| 203.362 | 3.74 | PA_L2 Memory Object 254728965 |
| 196.648 | 3.62 | PA_L2 Memory Object 254910089 |
| 188.552 | 3.47 | PA_L2 Memory Object 254787209 |
| 182.448 | 3.36 | PA_L2 Memory Object 254836361 |
| 176.974 | 3.26 | PA_L2 Memory Object 254664329 |
| 172.571 | 3.17 | PA_L2 Memory Object 254680713 |

*FIG. 25P*

APPARATUS AND METHOD FOR PROFILING SYSTEM EVENTS IN A FINE GRAIN MULTI-THREADED MULTI-CORE PROCESSOR

BACKGROUND OF THE INVENTION

1. Field of the Invention

This invention relates to computing systems and more specifically to observing and optimizing costs of various system events through data space profiling.

2. Description of the Relevant Art

Computer systems originally contained a central processing unit encompassing many boards (and sometimes cabinets), and random access memory that responded in the same cycle time as the central processing unit. This central processing unit (CPU) was very costly. Initially, bulbs attached to wires within the CPU aided programmers in the identification of program behavior. These were among the earliest system profiling tools.

Computer languages, such as FORTRAN and COBOL, improved programmer productivity. Profiling libraries were developed to break down the costs associated with the most precious resource on the system, i.e., CPU cycles. Profiling associated processor costs with processor instructions and the source representation of those instructions (e.g., functions and line numbers.) Programmer productivity climbed, as critical CPU bottlenecks were uncovered and resolved in program source code.

As computers evolved, the CPU shrank down to a single board, and then to a single chip, i.e., the microprocessor. Large numbers of cheap commodity microprocessors were grouped together to solve large problems that could previously only be handled using mainframes. By the mid-1990s, the acquisition costs of microprocessors comprised a small fraction of the overall cost of many computer systems. The bulk of the system cost was the memory sub-system and the peripherals.

Profiling code aids developers in identifying sections of code that consume excessive amounts of execution time. Profiling provides data to developers to aid in optimizing code. In general, two major classes of profiling techniques exist: code instrumentation and hardware assisted profiling. Code instrumentation techniques typically include the insertion of instructions into the instruction stream of a program to be profiled. In crude form, programmer insertion of printf source statements may be employed to profile code. More sophisticated approaches may employ compiler facilities or options to insert appropriate instructions or operations to support profiling. Upon execution of the instrumented code, execution characteristics are sampled, in part by operation of the added instructions. Typically, code instrumentation techniques impose overhead on original program code so instrumented and, unfortunately, the insertion of instructions into the instruction stream may itself alter the behavior of the program code being profiled.

Hardware assisted profiling techniques have been developed, in part, to address such limitations by off-loading some aspects to dedicated hardware such as event counters. Practical implementations often employ aspects of both code instrumentation and hardware assistance. In some cases, profiling support is included in, or patched into, exception handler code to avoid imposing overhead on each execution of a sampled instruction. Suitable hardware event counters are provided in advanced processor implementations such as those in accordance with the SPARC® and Alpha processor architectures. SPARC architecture based processors are available from Sun Microsystems, Inc, Santa Clara, Calif. SPARC trademarks are used under license and are trademarks of SPARC International, Inc. in the United States and other countries. Products bearing SPARC trademarks are based on an architecture developed by Sun Microsystems. Systems that include Alpha processors are available from a number of sources including Compaq Computer Corporation.

One reasonably comprehensive hardware assisted profiling environment is provided by the Digital Continuous Profiling Infrastructure (DCPI) tools that run on Alpha processor systems to provide profile information at several levels of granularity, from whole images down to individual procedures and basic blocks on down to detailed information about individual instructions, including information about dynamic behavior such as cache misses, branch mispredictions, and other forms of dynamic stalls. Detailed information on the DCPI tools and downloadable code may be found (as of the filing date) at http://h30097.www3.hp.com/dcpi/.

Throughput performance is often improved by improving concurrent program execution, reducing contention, and lowering the cost of coherency. However, in the majority of cases, data movement constrains achievable gain. In these situations, processors spend more time waiting for data movement than executing instructions. Computer architects, recognizing this dependency, introduced multi-threaded cores to hide data latency: while one thread is blocked fetching data, another can execute. These chip-multithreaded (CMT) processors may include many cores (CPUs) driving many virtual processor strands or threads of instruction execution. The performance-critical component in these systems is often the memory sub-system and not the strands of execution. The scalability of threads relies on the accurate identification and characterization of data motion. Despite evidence that data motion is a key determinant in throughput, an instruction-centric profiling paradigm persists.

As computer architectures have evolved from single to multi-core, multi-threaded processor systems, the performance paradigm has shifted from data transformation to data movement. Software scalability depends on bottleneck analysis, prediction and avoidance. Traditional performance characterization focuses on the instruction pipeline and fails to address the crux of scalability, i.e., the majority of time is usually spent in data motion.

The generally available performance tools provide the developer with instruction execution analysis, typically generated from instrumented applications. However, these tools tend to perturb the application's behavior and, more importantly, may fail to capture the dynamic nature of the program under test. In addition, these tools are directed to look at instruction execution by monitoring the CPU when the bottleneck is often in the memory sub-system. Therefore, traditional profiling tools fail to detect bottlenecks related to the memory systems of these modern systems, and do not addresses issues of application scalability for large-thread-count systems. Traditional profiling tools also fail to provide a mechanism to operate on context specific data and costs, including data related to the hardware and software execution context of an application to be profiled.

SUMMARY

A system and method for data space profiling of a computer system and/or software application may include an apparatus and method for sampling request messages and corresponding reply messages in the computer system. For example, a processor may send a request message on behalf of a process or instruction to one or more system components and may receive one or more reply messages in response. In some embodiments, the request message may comprise a data request and the reply message may comprise requested data and an indication of a source type for the source of the data. In other embodiments, the request message may comprise another type of transaction request and the reply message may comprise a corresponding transaction reply message. In such embodiments, the transaction reply message may also include an indication of a source type of data supplied in response to the transaction request. An event agent of the requesting processor may include a thread identifier in a request message, which may be maintained in a corresponding reply message and may be used to associate the reply with the request.

The source type information comprised in a reply message may include an indication that the source of the data was a remote, rather than a local source, in some embodiments. In one embodiment, the source type information may indicate that the data was supplied from a shared storage location, rather than a private storage location. In another embodiment, the source type information may indicate that the data was supplied via a cache-to-cache transfer. In yet another embodiment, the source type information may indicate that the data was supplied from a source in a coherency domain different from that of the requesting process.

The requesting processor may be configured to detect a runtime system event dependent on information comprised in a received reply message. For example, an event agent of the requesting processor may be configured to detect a runtime system event if the reply message indicates a remote memory access, a cache-to-cache transfer, or a coherency domain crossing. In one embodiment, an event agent may be configured to detect a runtime system event in response to detecting a particular value or pattern in data or other information comprised in a reply message. In another embodiment, receiving the reply message may itself be considered a runtime system event.

In some embodiments, profile data is not collected or analyzed for all detected runtime system events. In such embodiments, the requesting processor may be configured to sample instructions, and/or request and reply messages corresponding to detected runtime events in order to profile the behavior of an application executing on the computer system. In such embodiments, an event agent may be configured to count detected events of a given type and to sample only a small percentage of the detected events for profiling. For example, an event agent may be configured to count coherency domain crossings and to sample one out of every 1000 such events. Sampling detected events may include associating the system event with the source type information comprised in the reply message, as well as with any extended address information corresponding to the reply message, the request message, or an instruction or process on whose behalf the messages are sent and received. For example, a sampled event may be associated with a time stamp, a thread identifier, one or more physical or virtual addresses, a cost value, or an identifier of a software construct or data allocation, in addition to the source type information, in an event set database.

In some embodiments, the detected runtime system event may not be triggered by a particular message or reply, but may be triggered by instruction and/or message sampling. For example, the requesting processor may include a hardware or software event agent configured to sample reply messages by counting the messages and sampling one message out of every 10,000 messages received (i.e., to sample a message in response to an overflow of a transaction reply counter). In other examples, the requesting processor may be configured to sample one of every 5,000 instructions (e.g., in response to an instruction counter overflow), or to sample one instruction and/or message every second (e.g., in response to a timer overflow). In such embodiments, the source type information comprised in the reply message may be associated with the sampled event or a corresponding instruction, in addition to any extended address information captured by an event agent and corresponding to the sampled event or instruction. The profiling information captured for the sampled event may be included in an event set database, in some embodiments, and may be used to identify performance bottlenecks for the application and/or computer system on which it executes.

BRIEF DESCRIPTION OF THE DRAWINGS

FIG. 20 is a table illustrating exemplary profile data revealing execution hindrances in terms of consumed execution time in relation to addresses, according to one embodiment.

FIGS. 21A and 21B are tables illustrating exemplary profile data revealing execution hindrances in relation to source-level data object language constructs, according to various embodiments.

FIGS. 22A-22F are tables illustrating exemplary filtered profile data, according to various embodiments.

Figure 1:
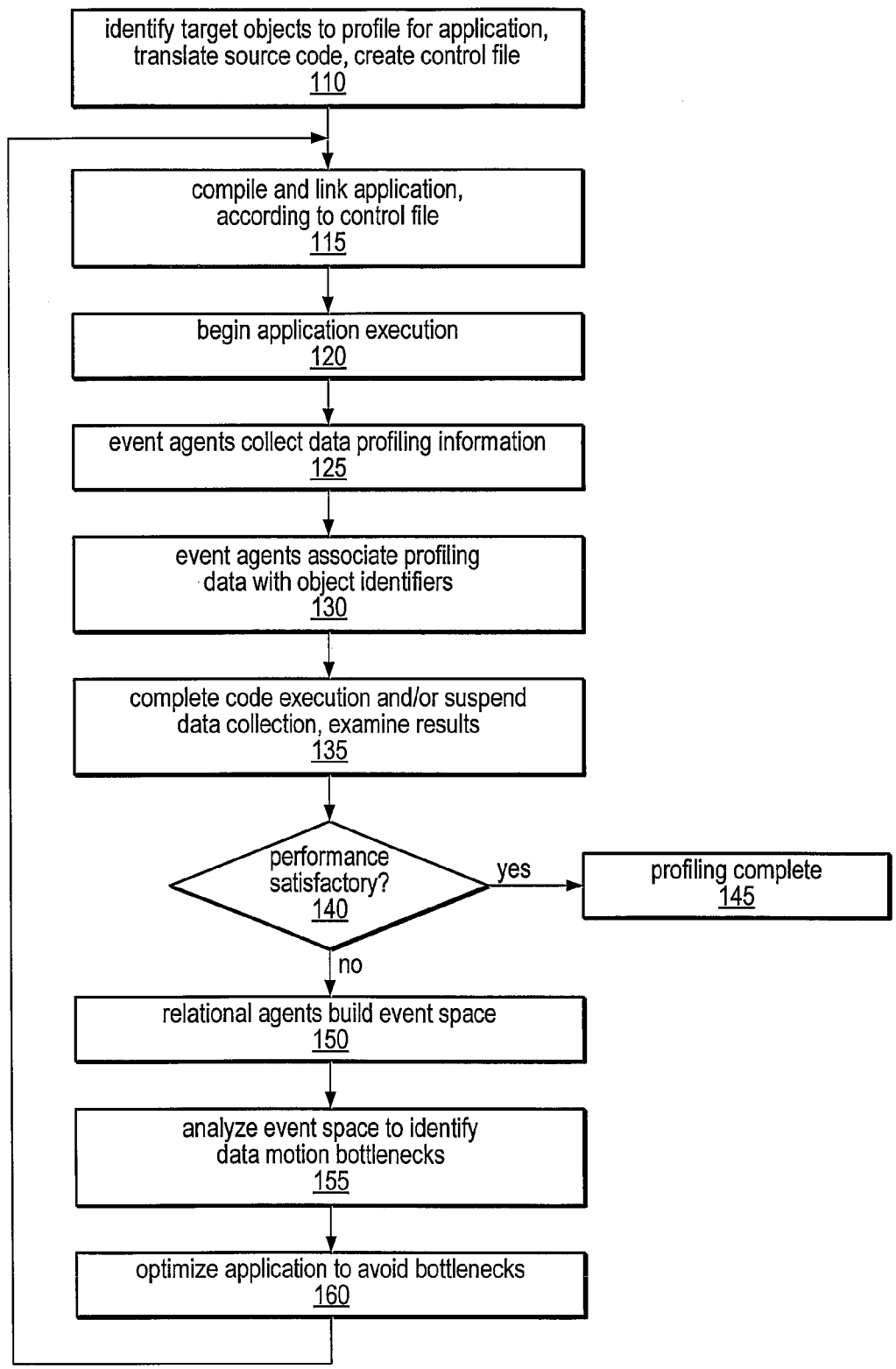
FIG. 1 illustrates a method for performing data space profiling, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Modern computer systems are using increasing numbers of ever-faster processors to solve larger and larger problems. However, performance of those processors may be limited by the need to supply data to them at ever increasing rates. In some systems, a hierarchy of caches between the processors and main memory may be used to improve performance. In these systems, the processors may run at full speed when using data from the caches closest to the processors, but may be frequently stalled loading data from or storing data to the primary caches through secondary or tertiary caches and, ultimately, to or from main memory. Understanding how an application's data is structured in memory and how it passes from memory through the cache hierarchy may facilitate understanding and improving the performance of applications on these systems.

The data space profiler described herein may provide per-instruction details of memory accesses in the annotated disassembly, and may provide data aggregated and sorted by object structure types and elements, in some embodiments. This may in some embodiments provide a new observability perspective for application developers. For example, the underlying framework of the profiler may provide a system and method for providing cache miss data to compilers and dynamic code generators, thus allowing cache-related application optimizations. The system and method may be applied to profiling data related to other types of runtime events, or execution hindrances, in some embodiments.

While conventional profiling tools provide per image, per procedure, per source line, or per instruction level profile information, these tools do not provide profile information in relation to other aspects of code behavior. In particular, conventional profiling tools do not perform data space profiling. For example, while the majority of stall time may be caused by memory related operations or load type instruction instances, conventional tools do not provide information about these memory related operations from the perspective of data profiling objects, addresses (identifiers) of data profiling objects, or data profiling object definitions. Hence, conventional profiling tools do not provide information about data profiling objects that consume the most execution time. In addition, conventional tools do not correlate multiple code behavior attributes to consumed execution time. A system and method of data space profiling, as described herein, may allow the application developer (user) to optimize application code, data structures, memory hierarchy, and/or other hardware and software components by helping him or her understand the relationships between and contributions of these elements to the performance of the application.

In the following description, references are made to source-level data objects, data objects, data profiling objects, profiling objects, extended addresses, extended address elements, address elements, runtime events, sampled runtime events, instruction instances, and language constructs. The terms "source-level data object" and "data object" may be used to describe any of various representations of data identifiable in source code, including variable names, data types, data structures, elements of data structures, data type definitions, operands, statically linked objects, expressions, etc. The terms "data profiling object" and "profiling object" may be used to describe any hardware component, software construct, data allocation construct (e.g., virtual to physical memory mappings done at runtime), or user-defined abstract component from whose perspective costs may be viewed. The term "extended address" may refer to a vector containing a plurality of "extended address elements" or "address elements", each of which represents an identifier associated with a runtime event from the perspective of a particular data profiling object. The term "runtime event" may be used to describe an event that occurs during execution of code (e.g., during execution of a software application being profiled). For example, runtime events may represent data references, cache misses, cache references, data translation buffer misses, data translation buffer references, branch mispredictions, etc. Runtime events may be of particular interest because they may hinder execution of an application. For example, runtime events may consume execution time, or may be associated with consumption of execution time; hence, execution hindrance may be revealed in terms of execution time. "Sampled runtime events" may comprise a subset of all runtime events and may in some embodiments statistically represent all runtime events for a given execution run of a software application. The term "code behavior attribute" may refer to a cost metric, an extended address element or any other attribute associated with a runtime event. For example, a time (e.g., a timestamp value), a program counter (PC) value, execution time, number of cycles, virtual address, or process identifier (PID) may all be considered code behavior attributes, in some embodiments. They may also be considered extended address elements, in various embodiments. These attributes (or their values) may be used by the profiler in filtering and sorting profile data and in defining custom profiling objects and/or cost metrics, in some embodiments. The term "instruction instance" may be used to describe an instance of an instruction or machine operation, such as a macro instruction or a micro instruction, which corresponds to a construct in a source-level representation of program code. For example, an instruction instance may be an instance of a load type instruction. Finally, the term "language construct" may be used to describe a syntactically allowable portion of code formed from one or more lexical tokens in accordance with the rules of a source-level programming language.

In some embodiments, instruction sequences and computer program products may be made using techniques in accordance with the present invention. For purposes of description, certain aspects of the present invention are detailed in the context of data profiling that includes associating sampled cache miss runtime events with different code behavior attributes, such as values of physical addresses, source-level data objects, or other data profiling objects and that includes presenting profile data that has been filtered based on addresses and source-level data objects. More generally, data space profiling may in some embodiments include associating any runtime event with one or more extended address elements and/or source-level data objects and presenting profile data filtered with one or more other code behavior attributes (e.g., source-level data object definitions, source-level data object addresses, stall time, cycle time, function/methods, instruction instances, etc.).

Overview

Providing source-level data object profile information along with other data profiling object information may in some embodiments allow targeted and more efficient optimization of application code. The combined profile information may enhance understanding of code behavior generally and with regard to specific hardware and/or software platforms. Correlating traditionally collected code behavior attributes and data profiling object profile data may further enhance understanding of code behavior.

Profiling may in some embodiments involve translating code, executing the translated code and collecting statistical profile data about the code during execution, analyzing the collected profile data, and providing the analyzed profile data. In some embodiments, the profile data collected and analyzed following a runtime event may include execution costs associated with data movement in addition to, or instead of, traditionally collected profile data. In some embodiments, the profile data may be indexed according to multiple extended address elements associated with the event.

Tagging code during code translation may provide the basis for identifying relationships between code execution time and language constructs representing source-level data objects of the code, in some embodiments. During data collection, sampled runtime events that consume execution time may be attributed to source-level data objects based on the tagging, in these embodiments. Profile data may then be presented that facilitates identification of execution hindrances based on one or more source-level data objects.

During data collection, profile data, including correlations between extended address elements and sampled runtime events, may be collected. In some embodiments, while collecting this data, a determination may be made as to the validity of the addresses. If an address is determined to be valid, then the corresponding runtime event may be attributed to the valid address. Otherwise, an indication that the address is invalid may be made. The profile data, including any correlations between data addresses and execution hindrance, may be provided, and may facilitate optimization of the code, in some embodiments. In some embodiments, these correlations may be based on the association between data addresses and sampled runtime events.

Furthermore, correlations between multiple code behavior attributes may be presented, in some embodiments. For example, data illustrating correlations between traditionally collected code behavior attributes (e.g., execution time) and the additional code behavior attributes associated with data profiling (e.g., virtual or physical addresses) may be presented. Profile data revealing execution hindrances may be aggregated based on source-level data objects, profiling object profile data and other code behavior attributes, in different embodiments. In some embodiments, profile data may be aggregated based on a first code behavior attribute, and then filtered based on an instance of the first code behavior attribute. The aggregated and filtered profile data may then be aggregated and filtered based on one or more additional code behavior attributes. In some embodiments, this capability to aggregate and filter profile data based on multiple code behavior attributes may allow code optimization decisions to be made based on presentation of profile data from various perspectives and on correlations between various code behavior attributes, including source-level data objects, their addresses, their definitions, instructions, functions/methods, etc.

An exemplary method for performing data space profiling, as described above, is illustrated by the flow chart in FIG. 1. In this example, a developer (user) may first identify target objects to profile for a given application, as shown in 110. These objects may include hardware components and/or programming (software) structures, in different embodiments. The user may create a control file specifying associations between hardware components and identifiers thereof, relational agents (functions) defining user-specified data objects, presentation (display) options, etc., in some embodiments. In some embodiments the user may translate the source code of the application to be profiled, such as by annotating the code to add tags or index structures. The source code may be a function or procedure, a library file, a data object class, a segment of code from an application, code for an entire application, etc., and may be written in any source-level language including, but not limited to, C, C++, Java, Lisp, Basic, Perl, COBOL, Fortran, etc. In some embodiments, software event agents may be inserted into the source code to assist in collecting profile data. In other embodiments, variables may be registered for tracking, and one or more event agents may capture their values during profiling.

In addition to the user-specified relational agents, standard or platform/application-specific relational agents may be generated for use in profiling an application, in some embodiments. In some embodiments, these relational agents may be generated by operating system software, such as by the compiler system or by a stand-alone component of the operating system configured for this purpose. These relational agents may be configured to associate various address elements with instructions, instances and data types, in some embodiments. For example, relational agents may associate procedures, line numbers, load objects, etc., with instructions. In another example, relational agents may associate scalars or complex data definitions with data types. In yet another example, relational agents may associate variable names and/or locations with instances of instructions. In some embodiments, standard or platform-specific relational agents may be generated by the operating system in parallel with the compilation of the application to be profiled, and may be dependent on the application itself and/or an associated control file.

The operating system may also include various software event agents, in some embodiments, and/or may be configured to receive profile information from hardware event agents and to store or communicate this data for use during an analysis phase.

After the code and control files have been prepared, the application may be compiled and linked with all applicable files, functions, tasks, etc., needed to support profiling, as shown in 115. Execution of the application, as shown in 120, may in some embodiments include the steps of booting the collection framework, and then transferring control to the application program itself. Booting the collection framework may include initializing hardware event agents, interposing any address space modifications (e.g., changes to the address space made by the operating system) and allocating repositories for profile data collected during execution, according to various embodiments. For example, in one embodiment, each thread of a multi-threaded process may be allocated a separate repository for storing profile data, and each thread may be allocated a different portion of the available address space. Thus, the separate repositories may be thought of as per-thread or per-address-space repositories, in such embodiments.

Once control is transferred to the application, event agents may begin collecting profiling information, as in 125. In some embodiments, when certain hardware events occur, one or more software event agents may be executed in order to collect more profile data than any hardware agents collecting data for that event. Event agents may associate collected profiling data with various object identifiers, as will be discussed in more detail later. This is illustrated at 130. The collected and associated profiling data may be stored in per-thread repositories, as described above, or in any suitable data structure, such as files, registers, tables, linked lists, databases, etc., for later use by the analyzer.

At 135, execution of the application may end, in some embodiments, before analysis begins. In other embodiments, the application may continue to run and collect more profiling data, or the application may continue to run, but with data collection disabled during analysis. The initial results may be examined at this point, in some embodiments.

At 140, it is determined if the performance of the application is satisfactory, in this example. In some embodiments, if the performance is satisfactory, profiling may be complete, as in 145. If not, analysis of the profiling data may be initiated in order to identify and correct performance bottlenecks. In some embodiments, analysis may be performed even if the initial performance results were acceptable, such as in order to further optimize an acceptable application.

To begin the analysis phase, relational agents may be applied to the profile data collected by event agents and may be used to build the event space, as in 150. The event space may in some embodiments include multi-dimensional correlations between costs (such as execution time), programming language constructs (such as functions) and hardware components (such as cache lines.) Relational agents may build the event space by recursively operating on each element of the profile data collected by event agents, in some embodiments. This will be described in more detail later.

The analysis engine may in some embodiments be used to probe the event space in order to identify performance bottlenecks, such as those related to data motion in the system. This is illustrated at 155. This analysis may include displaying costs associated with various hardware and software components of the system and the application being profiled, in some embodiments. The analysis may also include filtering the profile data for a given data object and aggregating the data with respect to additional data objects and/or filter criteria, in some embodiments. The analyzer may display the aggregated and filtered profile data by writing to a profiling report file, for example, or may include a graphical user interface that allows the developer to select data objects to display, zooming and position options, binning (aggregation) functions, filter clauses, etc. The analysis engine and an exemplary graphical user interface for the analyzer will be described in more detail later. As noted at 155, the use of the analysis engine and graphical user interface thereof may allow a user to identify data motion bottlenecks from the event space data, such as those caused by resource sharing or conflicts between resources, in some embodiments. These tools may also allow the user to identify the root cause of the bottleneck, by allowing the user to display the extended address associated with a runtime event, and to trace the data motion back to source code. For example, the analyzer may allow a user to determine that a particular variable is being inefficiently shared between two threads.

Once any bottlenecks and their underlying causes have been identified, the application may be optimized to correct a conflict, reduce sharing, or make whatever changes may be needed to avoid the identified bottleneck. In some embodiments, this may be done by the developer, while in other embodiments, the results of the data profiling analysis may serve as an input to an optimizing compiler or code generator, which may take advantage of this information to produce optimized code.

Translating Code

When translating application code for profiling, annotations may be made to source code for use during data collection. In some embodiments, these annotations may be used to connect source-level language constructs that represent source-level data objects to runtime events. In other embodiments, these annotations may be used to capture user-specified data to be associated with runtime events. In one example, language constructs, such as labels or define statements, may be added to source code and these constructs may be associated with runtime events. In another example, registering one or more variables (e.g., by annotating code using a descriptor apparatus) may allow the values of these variables to be associated with runtime events.

Figure 2A:
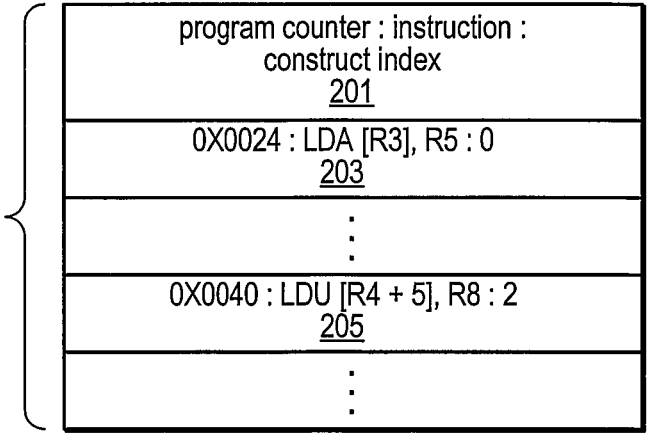
FIGS. 2A and 2B are block diagrams illustrating annotation of code to associate instruction instances with language constructs of source-level data objects, according to various embodiments.
Figure 2B:
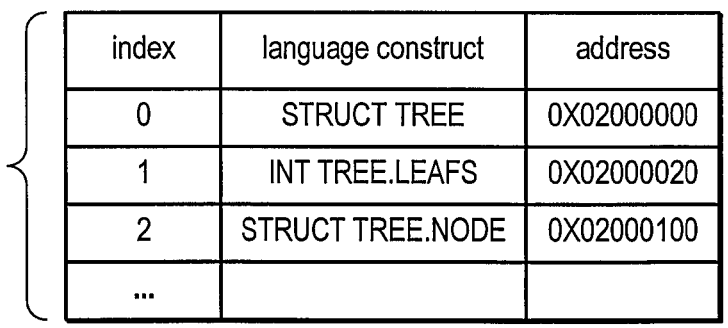

In yet another example, code may be annotated to insert an instruction index construct into the code, in one embodiment, and the index may be mapped to a source-level language construct and/or an extended address element. This is illustrated in FIGS. 2A and 2B. These diagrams illustrate annotation of code to associate instruction instances with language constructs of data objects, according to various embodiments. FIG. 2A is a block diagram of annotated code, according to one embodiment. FIG. 2B is a block diagram of a language construct index table, according to one embodiment.

Although FIGS. 2A and 2B illustrate one level of indirection for code annotation (i.e., one table lookup to determine a data language construct that corresponds to an annotation), in other embodiments there may be more than one level of indirection, or no indirection.

The annotated code shown in FIG. 2A includes code lines 201, 203, and 205. In this example, each code line includes a program counter, an instruction instance, and a construct index, as indicated in code line 201. For example, code line 203 includes an instruction instance LDA [R3], R5 at program counter 0x0024. Code line 203 has been tagged with the construct index "0". Code line 205 includes an instruction instance LDA [R4+5], R8 at program counter 0x0040, and has been tagged with the construct index "2". In other embodiments, code lines may be tagged differently and/or may include different elements. For example, code annotations may be added in a separate section of the code, may be inserted inline with the code, or may be in a separate file, according to different embodiments.

The exemplary language construct index table 231 of FIG. 2B illustrates example entries corresponding to the tags (i.e., construct indices) shown in the annotated code 209 of FIG. 2A. The language construct index table 231 includes construct index entries 0-2. Construct index 0 corresponds to the source-level data object STRUCT TREE, which is a structure TREE. Construct index 1 corresponds to the source-level data object INT TREE.LEAFS, which is an integer data type that is an element of the structure TREE. The construct index 2 corresponds to the source-level data object STRUCT TREE.NODE, which is a structure NODE that is an element of TREE. Annotations and language construct index tables, such as those illustrated in FIGS. 2A and 2B, may in some embodiments be used during data collection to associate a sampled runtime event with a source-level data object language construct. The language construct index table 231 also indicates exemplary addresses of the source-level data objects.

Annotated code, such as annotated code 209 in FIG. 2A, may in some embodiments be byte code specific to a platform, or may be generic across multiple platforms. Source-level data object language constructs may be indexed according to a variety of techniques in different embodiments. Source-level data objects may be indexed with respect to different source-level data objects in a sequential or hierarchical manner, according to different embodiments. In addition, other types of data objects (e.g., physical addresses, data object types) may be indexed, in some embodiments.

Annotations or tagging done during translation and/or generation of code may in some embodiments provide the basis for associating sampled runtime events with source-level data object language constructs during data collection and later analysis. As previously noted, this information may facilitate a targeted and efficient optimization of code with respect to data objects.

Collecting Profile Data

During code execution, profile data may be collected and recorded by various software and/or hardware event agents, examples of which will be described in more detail later. In some embodiments, profiling may be based on the collection of statistical data during execution of code. In some embodiments, statistical data may not be collected for every runtime event because the overhead may significantly impact performance of the code. Therefore, in some embodiments, runtime events may be sampled. In some embodiments, in order to provide more detailed information about code behavior, additional information may be collected about runtime events than is collected using a traditional profiling tool. For example, in some embodiments, information may be collected that facilitates associating runtime events with source-level data object language constructs or other extended address elements associated with the events. One such embodiment is illustrated in FIG. 3.

Figure 3:
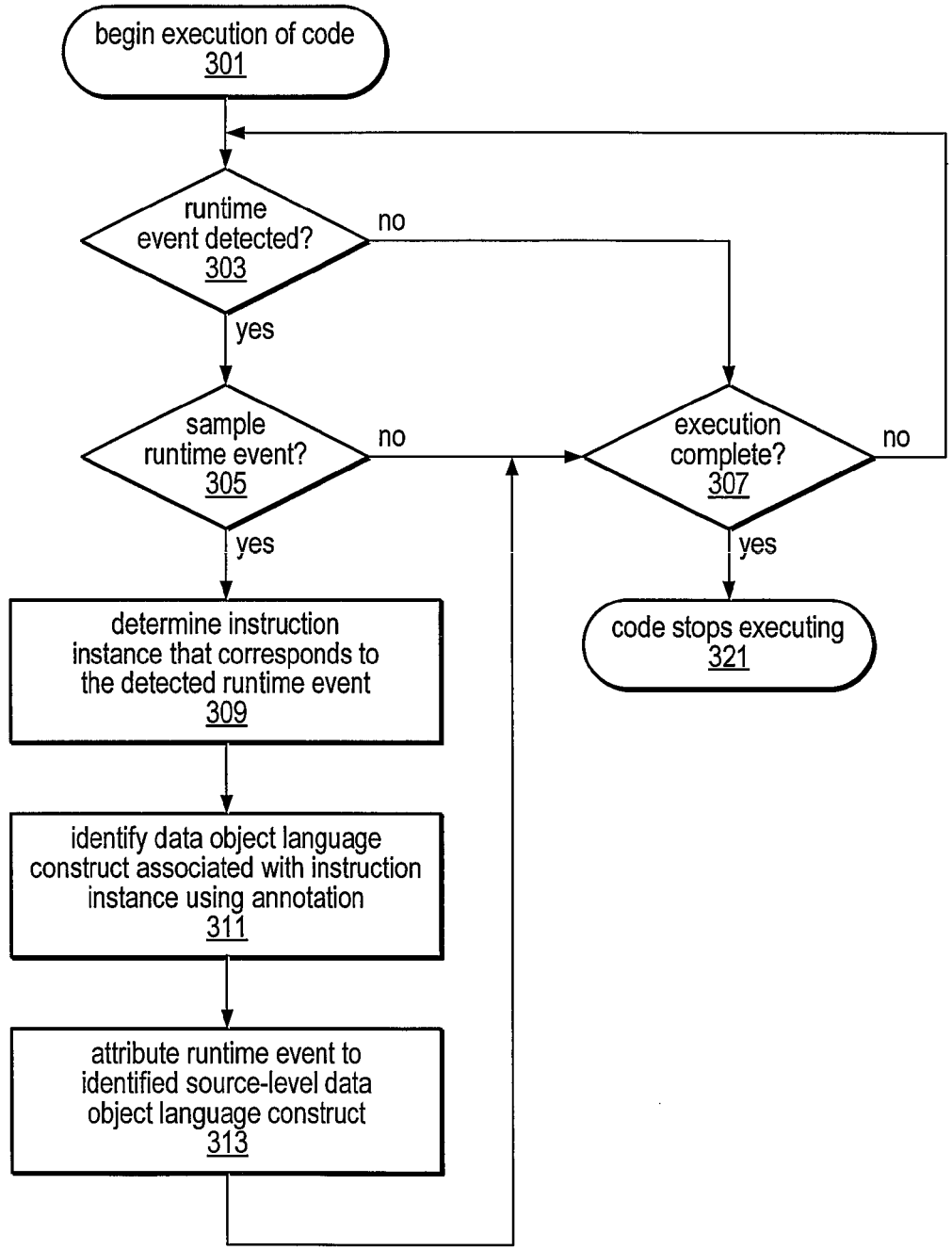
FIG. 3 is a flow chart illustrating a method for attributing sampled runtime events to source-level data object language constructs, according to one embodiment.

In the example embodiment illustrated in FIG. 3, runtime events may be attributed to source-level data object language constructs. In this example, at block 301, execution of code begins. At block 303, it is determined if a runtime event is detected. If a runtime event is not detected, then control flows to block 307. If a runtime event is detected, then control flows to block 305. In some embodiments, additional actions may be performed in response to detecting a runtime event (e.g., incrementing hardware counters associated with the detected events, generating a runtime event mask, etc.).

At block 305, it is determined if the runtime event is to be sampled. In some embodiments, a trap or interrupt may be generated when a runtime event to be sampled occurs. The trap or interrupt may include, reference, or be accompanied by a statistical packet that provides information describing the sampled runtime event (e.g., processor identifier, type of runtime event, process identifier, cycle time, time stamp, thread identifier, type of cache miss, etc.). In some embodiments, runtime events may be sampled when a hardware counter reaches a certain threshold, while in other embodiments, runtime events may be sampled according to a configuration file or logic. In some embodiments, all runtime events may be profiled, while in others, only particular runtime events may be profiled. If the runtime event is to be sampled, then control flows to block 309.

At block 309, the instruction instance that corresponds to the sampled runtime event is determined Various techniques may be employed to determine the corresponding instruction instance in different embodiments. For example, in some embodiments, a technique is employed whereby an instruction instance that corresponds to a detected runtime event is determined by backtracking from a point in a representation of the program code, which coincides with the detection toward a preceding instruction instance associated with the sampled runtime event. Backtracking may identify the preceding instruction instance at a displacement from the detection point unless an ambiguity-creating location is disposed between the detection point and the preceding instruction instance. This technique is described briefly below and in greater detail in commonly-owned co-pending U.S. patent application Ser. No. 10/050,358, entitled "Techniques for Associating Instructions with Execution Events", filed Jan. 16, 2002, and naming Nicolai Kosche, Brian J. Wylie, Christopher P. Aoki, and Peter C. Damron as inventors, the entirety of which is incorporated herein by reference.

At block 311, the source-level data object language construct associated with the determined instruction instance may be identified using the annotation. For example, if the determined instruction instance is the instruction instance at code line 205 of FIG. 2A, then the associated source-level data object language construct is STRUCT TREE.NODE. At block 313, the sample runtime event is attributed to the identified source-level data object language construct (e.g., STRUCT TREE.NODE). In some embodiments, attributing includes recording the sampled runtime event as associated information in a profile database. In some embodiments, the source-level data object language construct may be indicated in the profile database along with the sampled runtime event. Other associated information (e.g., program counter value, runtime event type, etc.) may be written to the profile database and associated with the source-level data object language construct during data collection, in some embodiments. From block 313, control flows to block 307. At block 307, if execution is determined to be complete, control flows to block 321, and the code stops executing. If at block 307 it is determined that execution is not complete, control flows to block 303. Control flows back and forth between blocks 307 and 303 until another runtime event is detected, at which time the collection process repeats.

Collecting profile data that describes source-level data object language constructs and their associated sampled runtime events, may facilitate optimizing code from the perspective of source-level data objects. A developer or an application with optimization intelligence may modify code (e.g., using structure padding, member reordering, structure merging, structure splitting, etc.) based on code behavior related to particular source-level data objects based on identification with the language constructs.

In addition to optimizing code with profile data that reveals code behavior with respect to source-level data objects, profile data that reveals code behavior related to data addresses (which are extended address elements) may also provide for more efficient and targeted code optimization. The data addresses may be associated with memory reference objects. Memory reference objects may include physical memory reference objects (e.g., cache levels, cache lines, cache sub-blocks, memory controllers, memory management page translation units, etc.) and/or logical memory references (e.g., memory segments, heap variables, stack variables, variable instances, expressions, data structures, etc.). With profile data from the perspective of data addresses, the memory reference objects associated with the data addresses may in some embodiments be correlated with sampled runtime events. As previously stated, attributing runtime events to data addresses may also provide for more efficient code optimization. Sampled runtime events may be attributed to data addresses during data collection.

Figure 4:
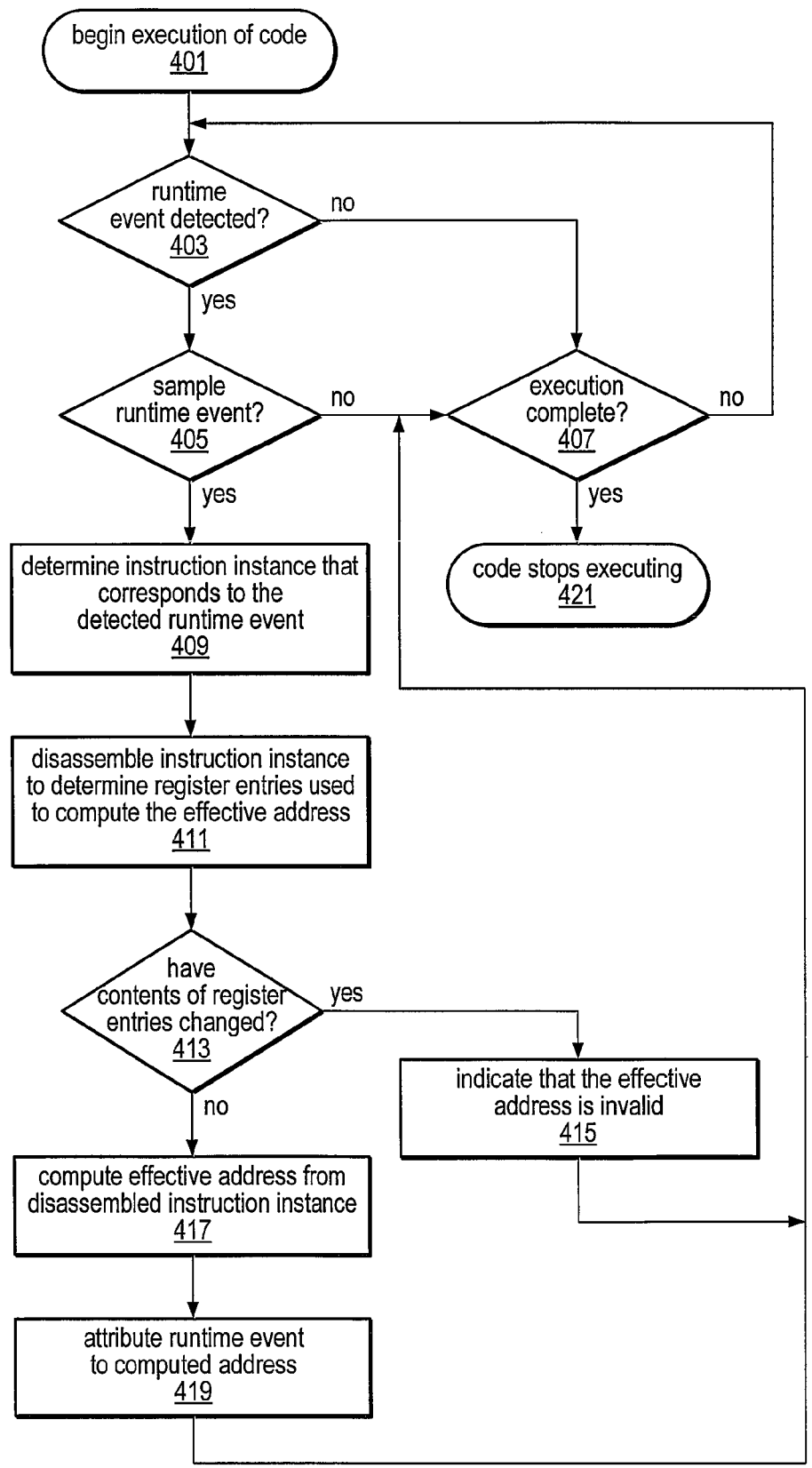
FIG. 4 is a flow chart illustrating a method for attributing sampled runtime events to source-level data addresses, according to one embodiment.

FIG. 4 illustrates a flowchart for attributing sampled runtime events to data addresses, according to one embodiment. Blocks 401-409 are similar to corresponding blocks 301-309, described above.

At block 411, a determined instruction instance is disassembled, or decoded, to determine the register entries used to compute the effective address. In some embodiments, the effective address is an address indicated by the instruction instance, and may correspond to the location of operand data, another address, etc. This address information is often dependent on the content of one or more registers at the time the instruction instance is executed. In some embodiments, at block 413, it is determined if the contents of these registers have changed. If the contents have changed, then control flows to block 415. If the contents have not changed, then control flows to block 417.

At block 415, the effective address is indicated as invalid and control flows from block 415 to block 407. At block 417, the effective address is computed from the disassembled instruction instance. At block 419, the sampled runtime event is attributed to the computed effective address. Control flows from block 419 to block 407, and the collection process is repeated if any additional runtime events are detected during execution.

In other embodiments, the operations depicted in FIG. 4 may be implemented differently. For example, software implementations may perform the operations individually and sequentially, as depicted, or in parallel and combining certain operations. In addition, various hardware implementations may implement hardware to perform operations depicted in FIG. 4. For example, in one embodiment, hardware is utilized to determine which instruction instance is of interest, and to determine validity of the determined instruction instances of interest. In another example, hardware is utilized to effectively perform the operations depicted at blocks 409, 411, 413, 415, and 417. In such embodiments hardware may compute effective addresses without decoding instruction instances, thus de facto determining validity of the instruction instances. Such a technique is described in greater detail in commonly assigned, co-pending U.S. patent application Ser. No. 10/113, 357, entitled, "Sampling Mechanism Including Instruction Filtering", filed Jan. 16, 2002, and naming Adam Talcott and Mario Wolczko as inventors, which is incorporated herein by reference in its entirety.

Figure 5:
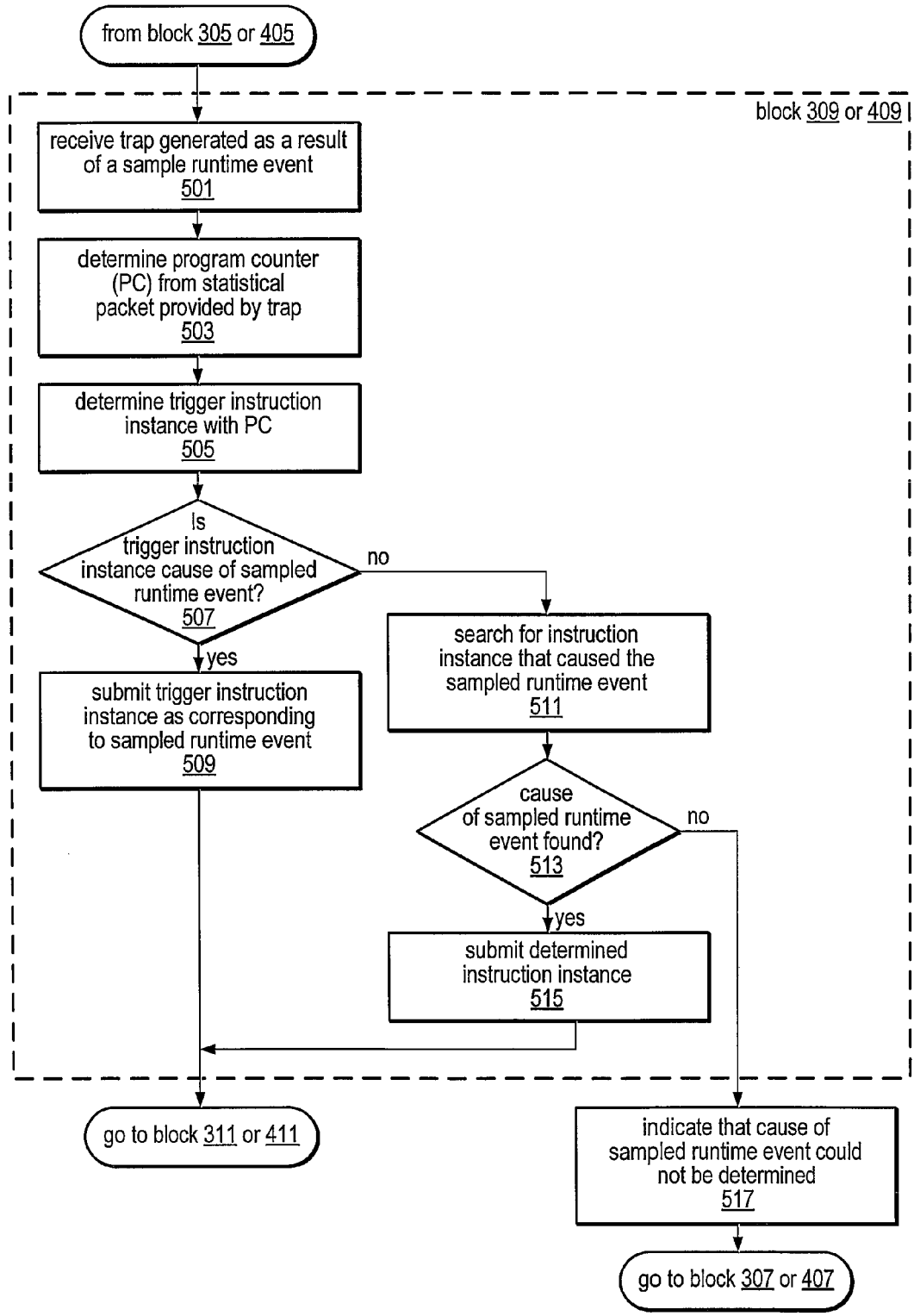
FIG. 5 is a flow chart illustrating a method for determining an instruction instance that corresponds to a detected runtime event, according to various embodiments.

FIG. 5 is a flowchart for determining an instruction instance that corresponds to a sampled runtime event as described in block 309 of FIG. 3 or block 409 of FIG. 4, according to one embodiment. In this example, control flows from block 305 (or 405) to block 501. At block 501, a trap generated as a result of a sampled runtime event is received. At block 503, a program counter value (PC) is determined from a trap or a statistical packet provided by the trap. At block 505, the trigger instruction instance is determined according to the program counter value. At block 507, it is determined if the trigger instruction instance is the cause of the sampled runtime event. If the trigger instruction instance is not the cause of the sampled runtime event, then control flows to block 511. If the trigger instruction instance is determined to be the cause of the sampled runtime event, then control flows to block 509.

At block 509, the trigger instruction instance may be submitted as corresponding to the runtime event. From block 509, control flows to block 311 of FIG. 3 or to block 411 of FIG. 4. At block 511, a search may be initiated for the instruction instance that caused the sampled runtime event. At block 513, it is determined if the instruction instance that caused the sampled runtime event is found. If the instruction instance is found, then control flows to block 515. If the instruction instance is not found, then control flows to block 517.

At block 515, the instruction instance determined to cause the sampled runtime event may be submitted as corresponding to the runtime event. Control flows from block 515 to block 311 of FIG. 3 or block 411 of FIG. 4. At block 517, it is indicated that the cause of the sampled runtime event could not be determined Control flows from block 517 to block 307 of FIG. 3 or block 407 of FIG. 4.

As previously noted, determining an instruction instance that triggered or is otherwise associated with a runtime event may involve a backtracking technique. In such a technique, an event agent may associate particular occurrences of an event with a coinciding point in the original execution sequence of program code. For purposes of description, either an underlying execution event itself (e.g., a stage N read miss in the data cache) or an associated hardware event (e.g., overflow or underflow of an associated counter) may be viewed as the execution event with which a point in the original execution sequence of program code coincides. In some embodiments, the coinciding point is identified using a then current program counter value at or about the time or point of detection. In other embodiments, any facility that establishes a coinciding point may be employed.

The event agent may attempt to associate detection of a particular execution event with a proper target instruction from the original execution sequence of program code by stepping back through the original execution sequence in an attempt to find a preceding target instruction (i.e., an instruction of appropriate type to have triggered the detected event). As the backtracking progresses, if a target instruction is encountered without an intervening ambiguity-creating location (e.g., a branch target), then the detected event may be associated with the target instruction. If, on the other hand, an intervening ambiguity-creating location is encountered, then the execution event may be discarded and the process may continue with the next execution event, in some embodiments. In other embodiments, if an intervening ambiguity-creating location is encountered, an indication that the cause of the event could not be determined (rather than a target instruction) may be associated with the event. In some embodiments, an expected displacement is reasonably fixed and may place an upper bound on the backtracking.

Using backtracking and other techniques, profile data may be accumulated for associable target instructions. Typically, profile data may be aggregated to provide a statistically valid characterization of individual target instructions based on criteria corresponding to the detected execution event. For example, a particular instruction for which profile data indicates a normalized cache miss rate above a predetermined value may be deemed to be a "likely cache miss." Other suitable characterizations are analogous. Depending on the implementation, the original instruction sequence of program code may optimized, e.g., through recompilation, based on profile data. In some embodiments profile data (or instruction characterizations corresponding thereto) may be encoded in program code, e.g., as compiler hints or as inputs to a code-optimizing tool.

As described above, backtracking techniques may be employed to associate observed execution characteristics with particular instructions of program code or associated operations based on event detections that may, in general, lag execution of the triggering instruction or operation by an interval that allows intervening program flow ambiguity.

In some embodiments, it may not be necessary to backtrack through previous instructions in order to determine an instruction corresponding to a detected runtime event. For example, in some embodiments, an event of a particular type may always be detected at a fixed point (e.g., after a fixed number of instructions) following the instruction that triggered or is otherwise associated with the event. In such embodiments, this "trigger instruction" may be found at a fixed position with respect to the detection point. In some embodiments, the relative position of the trigger instruction with respect to the detection point of an event may be predetermined by the processor architecture. The predetermined relative position at which the trigger may be found (i.e., the number of instructions prior to the detection point) may be the same for two or more event types or may differ for each of two or more event types, according to different embodiments. For example, the instruction triggering a counter overflow event may always be found at a relative position of −2 (e.g., with respect to a current program counter value at the time of detection) while an instruction triggering a cache miss event may always be found at a relative position of −4, in one embodiment. In some embodiments and for some events, the predetermined relative position may be zero (i.e., the instruction captured at the time that an event is detected may itself be the trigger instruction.) One method for determining an instruction to be associated with an event is illustrated in FIG. 6 and described below.

Figure 6:
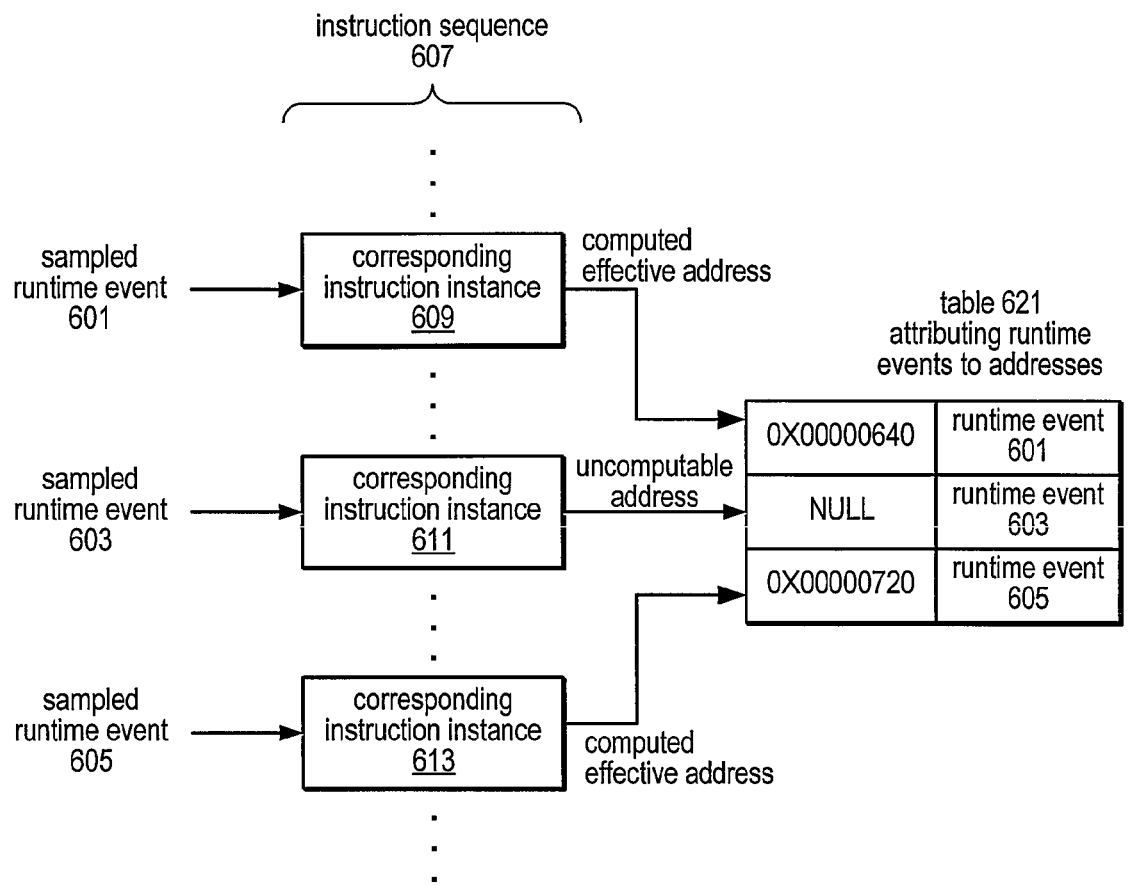
FIG. 6 is a conceptual diagram illustrating data addresses being attributed to sampled runtime events, according to one embodiment.

FIG. 6 is a conceptual diagram illustrating data addresses being attributed to sampled runtime events according to one embodiment. In this example, an instruction sequence 607 includes instruction instances 609, 611, and 613. A sampled runtime event 601 is attributed to the corresponding instruction instance 609. An effective address "0x00000640" is computed from the disassembled instruction instance 609 and stored in an entry in a table 621 along with an association between the sampled runtime event and the effective address. In other embodiments, table 621 may be implemented differently (e.g., using different physical structures, logical structures, a file, various data structures, etc.) and may include more, fewer, or different amounts and types of information than that described in this example.

In this example, another sampled runtime event, event 603, is attributed to the corresponding instruction instance 611. Contents of the register entries corresponding to instruction instance 611 have changed, so the effective address may not be computed, in some embodiments. In other embodiments, if the contents of the registers have changed, the effective address may be computed by means other than that described in FIG. 4. One such means is described in more detail later. In the second entry in the table 621, a null value or a value indicating "uncomputable address" may be stored and associated with the sampled runtime event 603, in one embodiment. In other embodiments, an entry may not be included at all in table 621 if the effective address cannot be computed.

A third sampled runtime event, event 605, may be attributed to the corresponding instruction instance 613. In this example, an effective address "0x00000720" may be computed from the disassembled instruction instance 613 and stored in the third entry of the table 621. The address "0x00000720" may also be associated with the sampled runtime event 605 in the table 621, in some embodiments.

Data address profiling may in some embodiments facilitate determination of execution hindrance with different perspectives of memory references. For example, a user may be able to identify the cache line that consumes the most execution time, and correlate delay times with data addresses or statically linked objects (e.g., global or static variables in C/C++). In another example, a user may be able to ascertain which cache line consumes the most execution time based upon which associated addresses (either virtual or physical) are associated with the most delay. These associations between sampled runtime events and addresses may provide for efficient and targeted optimization of code with respect to data addresses and statically linked objects (e.g., static variables, global variables, etc.). In some embodiments, additional information, such as address type, may be associated with sampled runtime events and data addresses. In addition, data addresses may be converted between different representations at different times, in different embodiments. For example, virtual addresses may be converted to physical addresses during data collection or after data collection, according to different embodiments.

Recording Profile Data

Figure 7:
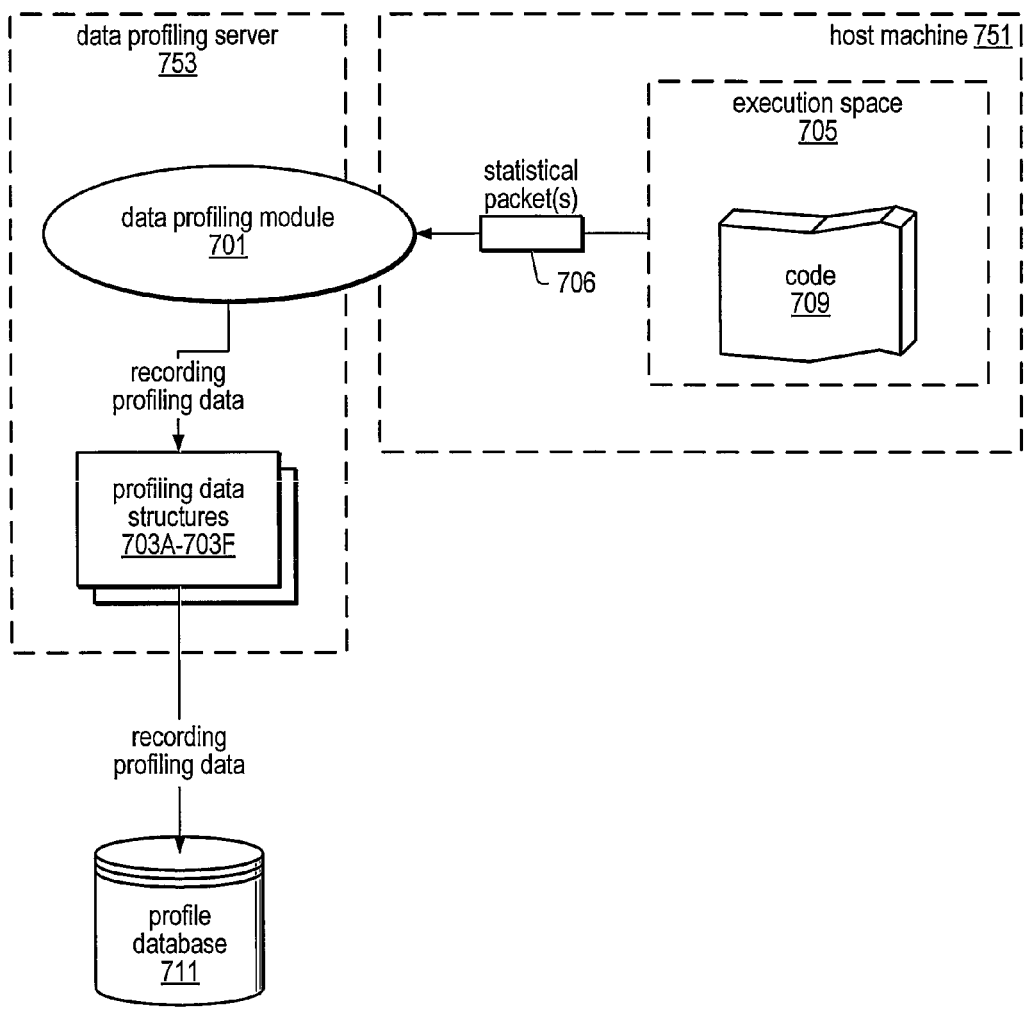
FIG. 7 is a conceptual diagram illustrating recording of profile data, according to one embodiment.

The statistical data collected for data profiling may be recorded using various techniques, according to different embodiments. For example, FIG. 7 illustrates one embodiment of a method for recording profile data. In this example, a data profiling module 701 receives statistical packets 706 for one or more sampled runtime events. The statistical packets 706 may be generated by one or more sampled runtime events that occur in execution space 705 for a code 709. In FIG. 7, execution space 705 is located on a host machine 751. The host machine 751 may also host all or part of data profiling module 701 (e.g., host machine 751 may host one or more daemon processes that collect statistical data). A data profiling server 753 may host the remaining parts of data profiling module 701, which may periodically retrieve or receive collected statistical data from a daemon process on host machine 751. In other embodiments, the data profiling module may be implemented differently. For example, data profiling module 701 may include multiple processes and/or sub-modules distributed between a host and a server, data profiling module 701 may be distributed over multiple nodes of a network, data profiling module 701 may be implemented within a single host machine, data profiling module 710 may work in conjunction with a code profiling module, etc.

In this example, the data profiling module 701 may record the profile data generated from the statistical packets in profile data structures 703A-703F. Afterward, the profile data in the data structures 703A-703F may be recorded into a profile database 711. In other embodiments, the profile database 711 and/or recording profile data may be implemented differently. For example, the profile database 711 may be an on-disk database or may be instantiated in main memory, in different embodiments. In some embodiments, the profile data may be recorded directly to the profile database and then analyzed, or may be stored in main memory for analysis. The results of analyzing the profile data in main memory may be stored in the profile database on a storage media, or elsewhere, according to different embodiments. In one example, collected profile data may be written to an on-disk database and organized into non-overlapping epochs. In some embodiments, the profile database 711 may be hosted by the data profiling server 753. In other embodiments, the profile database 711 may be remote from the data profiling server 753. In such embodiments, the profile data may be transmitted over a network (e.g., Ethernet, ATM, wireless, Frame Relay, etc.).

Figure 8A:
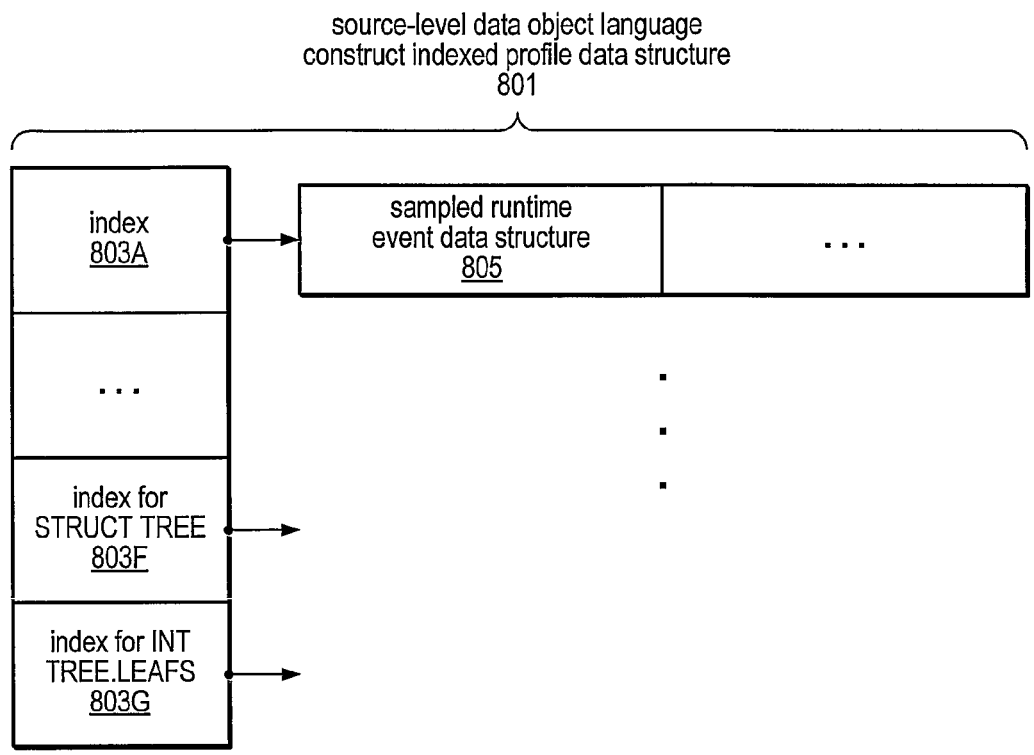
FIGS. 8A and 8B are conceptual diagrams of exemplary profile data structures, according to different embodiments.
Figure 8B:
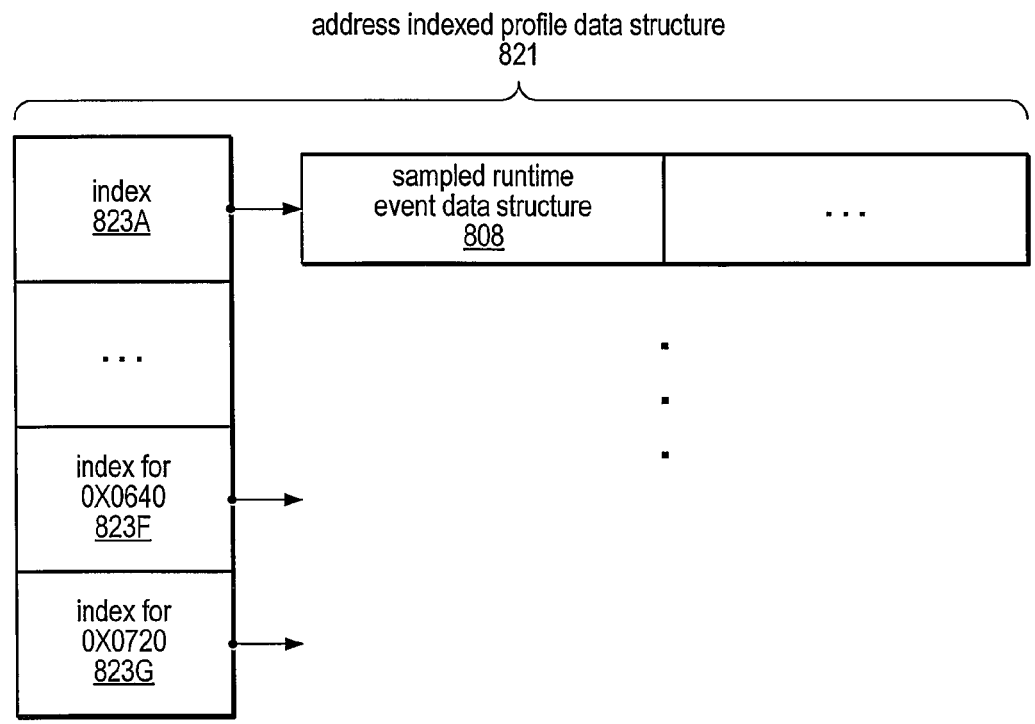

FIGS. 8A-8B are conceptual diagrams of exemplary profile data structures according to different embodiments. FIG. 8A illustrates an exemplary source-level data object language construct indexed profile data structure, according to one embodiment. In FIG. 8A, the source-level data object language construct indexed profile data structure 801 includes an index into sampled runtime event data structures. The index includes indices 803A-803G (e.g., each index may be a clustered index). Structures indicating profile data may be implemented differently in different embodiments (e.g., using unclustered indices, clustered indices, hashed indices, etc.). Each of the indices 803A-803G references a sampled runtime event data structure. For example, index 803A of FIG. 8A references a sampled runtime event data structure 805. In some embodiments, each index references a single sampled runtime event data structure, which may reference other sampled runtime event data structures. In other embodiments, each of the indices may reference multiple sampled runtime event data structures. In the example illustrated by FIG. 8, the index 803A may be a clustered index and the sampled runtime event data structure 805 may be a data array. Details of an exemplary sampled runtime event data structure are illustrated in FIG. 9.

In this example, index 803F is an index for STRUCT TREE. The source-level data object language construct STRUCT TREE may be hashed to generate a unique index that is the index 803F, in some embodiments. Various techniques may be used for indexing in different embodiments (e.g., using a string "STRUCT TREE" as the index, assigning a unique value for each source-level data object in the code, etc.). Similarly, the index 803G may be a hash of the source-level data object language construct INT TREE.LEAFS, in some embodiments.

FIG. 8B illustrates an exemplary data address indexed profile data structure, according to one embodiment. In this example, FIG. 8B illustrates an address indexed profile data structure 821 that is similar to the data structure illustrated in FIG. 8A. In contrast to the source-level data object language construct indexed profile data structure 801 of FIG. 8A, a data address indexed profile data structure 821 indexes sampled runtime event data structures using indices based on data addresses. The data address indexed profile data structure 821 is indexed with indices 823A-823G. In some embodiments, these may correspond to actual data addresses or may be computed values based on the actual data addresses. In this example, the index 823A may reference a sampled runtime event data structure 808, which may be similar to the sampled runtime event data structure 805 of FIG. 8A. In different embodiments, the combination of data structures may vary (e.g., sampled runtime event data structures across different profile data structures may be the same or different). In this example, the index 823F may be based on a hash of the address "0x0640" and the index 823G may be based on a hash of the address "0x0720." As with the indices described in FIG. 8A, indices 823A-823G may be implemented differently in different embodiments.

Figure 9:
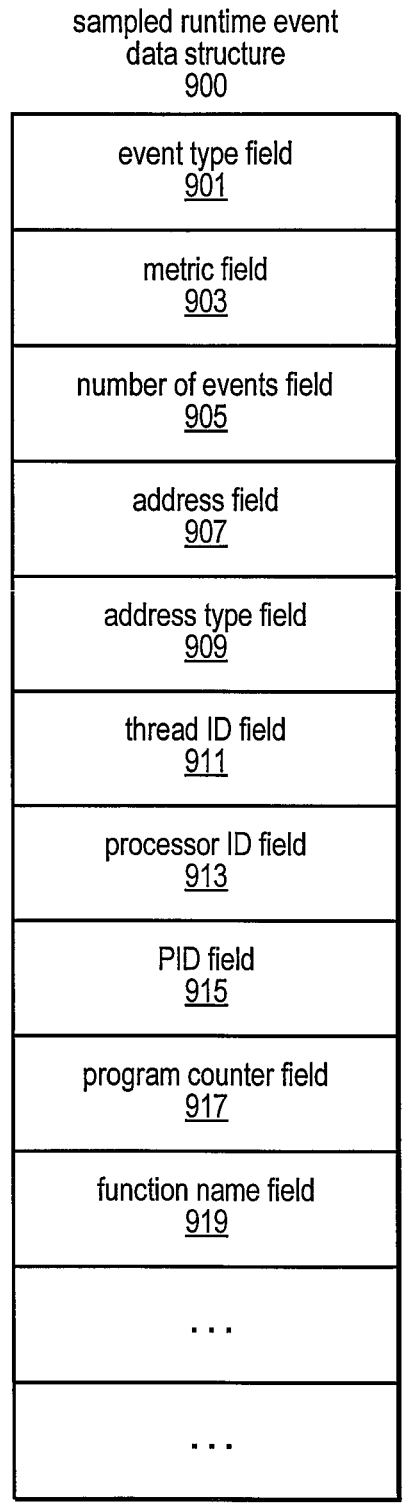
FIG. 9 is a block diagram illustrating an exemplary sampled runtime event data structure, according to one embodiment.

FIG. 9 is a block diagram illustrating an exemplary sampled runtime event data structure, according to one embodiment. The sampled runtime event data structure 900 illustrated in FIG. 9 includes numerous fields as examples of statistical information that may be associated with sampled runtime events. This information may be extracted from statistical packets generated by a corresponding interrupt or trap, or may be collected by various other types of hardware or software event agents. The sampled runtime event data structure 900 illustrated in FIG. 9 includes the following fields: an event type field 901, a metric field 903, a number of events field 905, an address field 907, address type field 909, a thread identifier field 911, a processor identifier field 913, a process identifier (PID) field 915, a program counter field 917, and a function name field 919. The sampled runtime event data structure 900 may include more, fewer, or different fields in different embodiments. For example, the sampled runtime event data structure 900 may be referenced by a corresponding address, therefore, the address field 907 may be removed or may be replaced with a different field, such as a source-level data object language construct field, an instruction instance field, an instruction instance type field, an event mask, an indexing structure, etc. In other embodiments, multiple address fields may be included, corresponding to the addresses of different hardware components and/or additional software constructs associated with the event. For example, addresses may be included to identify a memory board, core, strand, function, task, etc.

In this example, the event type field 901 may indicate the type of sampled runtime event tracked by the sampled runtime event data structure 900 (e.g., data reference, cache miss, cache reference, data translation buffer miss, data translation buffer reference, etc.). The metric field 903 may indicate a metric associated with the sampled runtime event (e.g., number of cycles, execution time in seconds, memory stall time, etc.). In some embodiments, the metric field 903 may correspond to multiple metrics (e.g., a list of metrics for one or more sampled runtime events). The number of events field 905 may indicate the number of sampled runtime events that have occurred of the same type and/or with the same associated statistical information, in some embodiments. In some embodiments, the metric field 903 may be optional and the value may be inferred from the number of events field. Alternatively, the number of events may be inferred from the metric field 903. In addition, a sampled runtime event data structure 900 may be maintained for each individual sampled runtime event that occurs, despite repetition of statistical information, some embodiments. In different embodiments, sampled runtime event data structures may share fields or a sampled runtime event data structure may indicate information for multiple sampled runtime events, for example.

The address field 907 may indicate an address (e.g., an identifier of a cache line or cache sub-block, a random access memory address, a storage address, etc.) associated with the sampled runtime event. The address type field 909 may indicate the address type (e.g., physical address, virtual address, page, segment, memory board, cache line, etc.) of the address element indicated in the address field 907. In different embodiments, the runtime event data structure may be implemented differently and may include more or less information than illustrated in FIG. 9. For example, a runtime event data structure may include multiple extended address element fields and accompanying address type fields, or it may include multiple address element fields but not address type fields because the address types may be inferred from the address elements themselves.

The thread identifier field 911 may identify a thread associated with the runtime event. The processor identifier field 913 may identify the processor associated with the runtime event. The process identifier (PID) field 915 may indicate the PID provided by the host operating system to identify the process associated with the runtime event. The program counter field 917 may indicate the value of the program counter(s) corresponding to the sampled runtime event. The function name field 919 may identify a function that corresponds to the sampled runtime event.

As previously noted, in different embodiments, the sampled runtime event data structure may be implemented and/or utilized differently. For example, the sampled runtime event data structure 900 may be instantiated for each type of runtime event associated with a particular code behavior attribute, or as an element of a data structure associated with a particular code behavior attribute. The fields illustrated in FIG. 9 are for illustration alone and are not meant to be limiting upon the invention. Various embodiments may include some or all of these fields, and may include additional fields not illustrated in FIG. 9. In addition, the sampled runtime event data structure 900 may be N-indexed in some embodiments. For example, the sampled runtime event data structure may be indexed by a hash table of addresses and by a hash table of source-level data object language constructs. In this example, the runtime event data structure may refer to the indexing elements of both hash tables. In some embodiments, a hash table may have indices corresponding to different types of sampled runtime events. Each of the indices may reference statistical information for that particular type of runtime event. In some embodiments, the fields may be grouped into nodes of a binary search tree for a particular runtime event.

The data structures described above may correspond to profile data collected and stored in a per-thread or per-address-space repository, in some embodiments, or may represent profile data that has been processed by an intermediate agent for inclusion in the primary event space for the application. These data structures may be stored in separate tables of a single file, in separate files, in one or more databases, or in any other suitable memory structure on the machine on which the data was collected, on the machine on which the analyzer is run, or on a remote storage device, according to different embodiments.

Analyzing Profile Data

After profile data is collected, tools may analyze the profile data. In some embodiments, the tools may employ artificial intelligence techniques, such as neural networks. The tools may be used to analyze the profile data to determine the cause of certain code behavior, such as stall cycles, in some embodiments. The profile data may be analyzed based on correlations between sampled runtime events (or consumed execution times corresponding to runtime events) and various code behavior attributes (e.g., source-level data object addresses, source-level data objects, source-level data object definitions, functions/methods, threads, time, processes, processors, etc.).

Figure 10:
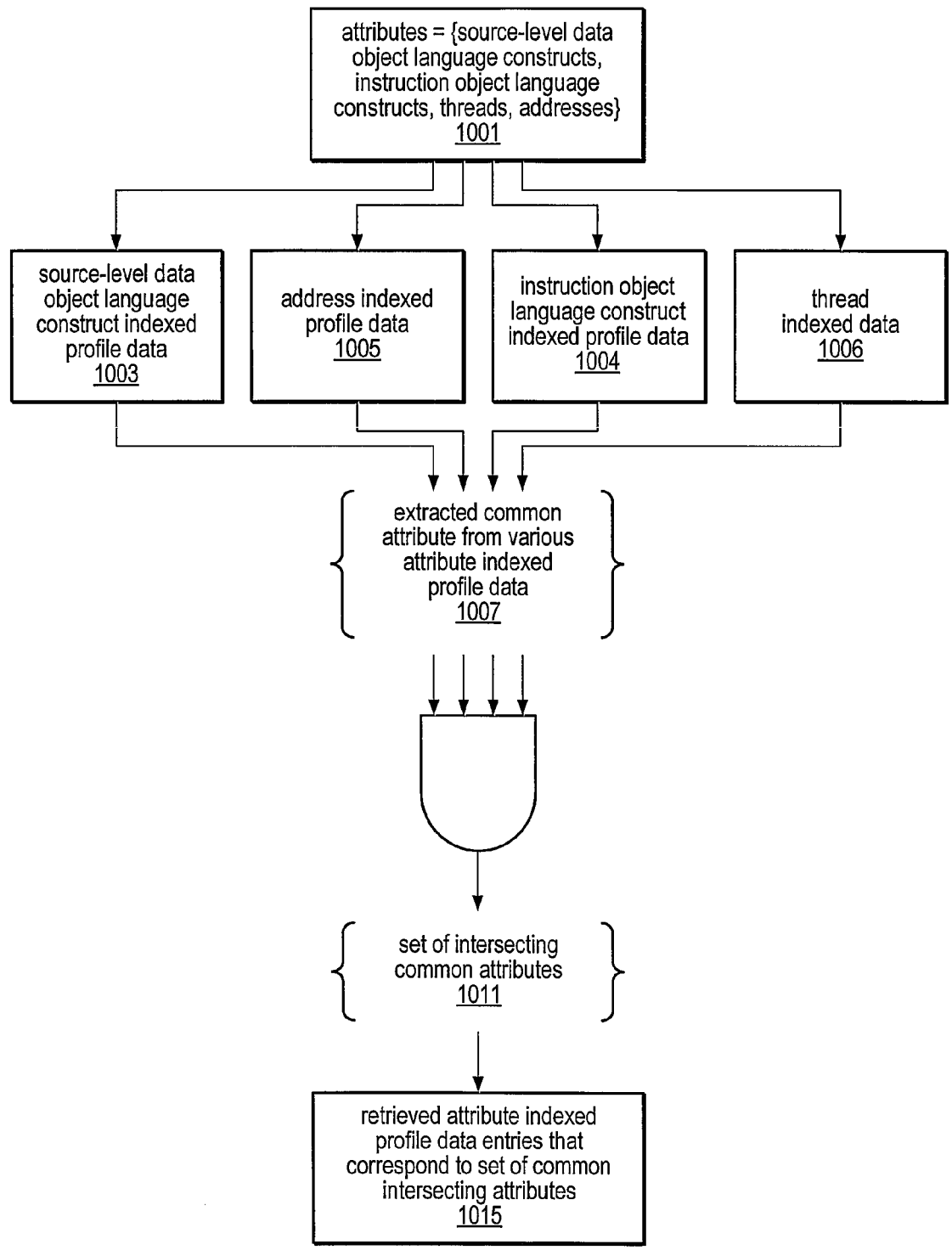
FIG. 10 is a conceptual diagram illustrating correlation of multiple code behavior attributes according to realizations of the invention.

FIG. 10 is a conceptual diagram illustrating correlation of multiple code behavior attributes according to one embodiment. At block 1001, code behavior attributes have been indicated. These code behavior attributes may have been specified directly by a user, in a configuration file, through default settings, etc., in different embodiments. In the example illustrated by FIG. 10, the code behavior attributes include source-level data object language constructs, instruction object language constructs, threads, and addresses. A profile data correlation report may be generated that includes correlation between specific instances of these code behavior attributes, correlation between all code behavior attributes, correlation between conventional profile data and all or particular ones of the code behavior attributes, correlation between the code behavior attributes and other code behavior attributes not listed here, between instances of these exemplary code behavior attributes and instances of other code behavior attributes, etc., in different embodiments.

The code behavior attributes shown in block 1001 may be used to retrieve entries from source-level data object language construct indexed profile data structure 1003, instruction object language construct indexed profile data structure 1004, thread indexed profile data structure 1006, and address indexed profile data structure 1005, in some embodiments. In this example, a set of common attributes 1007 may be extracted from the various attribute indexes profile data structures 1003-1006. For example, all addresses included within the various attribute indexed profile data structures 1003-1006 may be extracted. An operation may be performed on the extracted common set of attributes 1007 to find a set of intersecting common attributes 1011. For example, an intersecting set of addresses may include each of the addresses that can be found in all of the various attribute indexed profile data structures 1003-1006. With the set of intersecting common attributes 1011, entries from the attribute indexed profile data structures 1003-1006 that correspond to the set of intersecting common attributes 1011 may be retrieved and the retrieved attribute indexed profile data entries 1015 may be displayed, stored, transmitted, analyzed, filtered, ordered, etc. The profile data of these retrieved entries may provide insight into code behavior, such as cycle time or memory stall time, from the perspective of any number of code behavior attributes. In different embodiments, fewer, more, or different code behavior attributes than those illustrated in FIG. 10 may be utilized.

Figure 11:
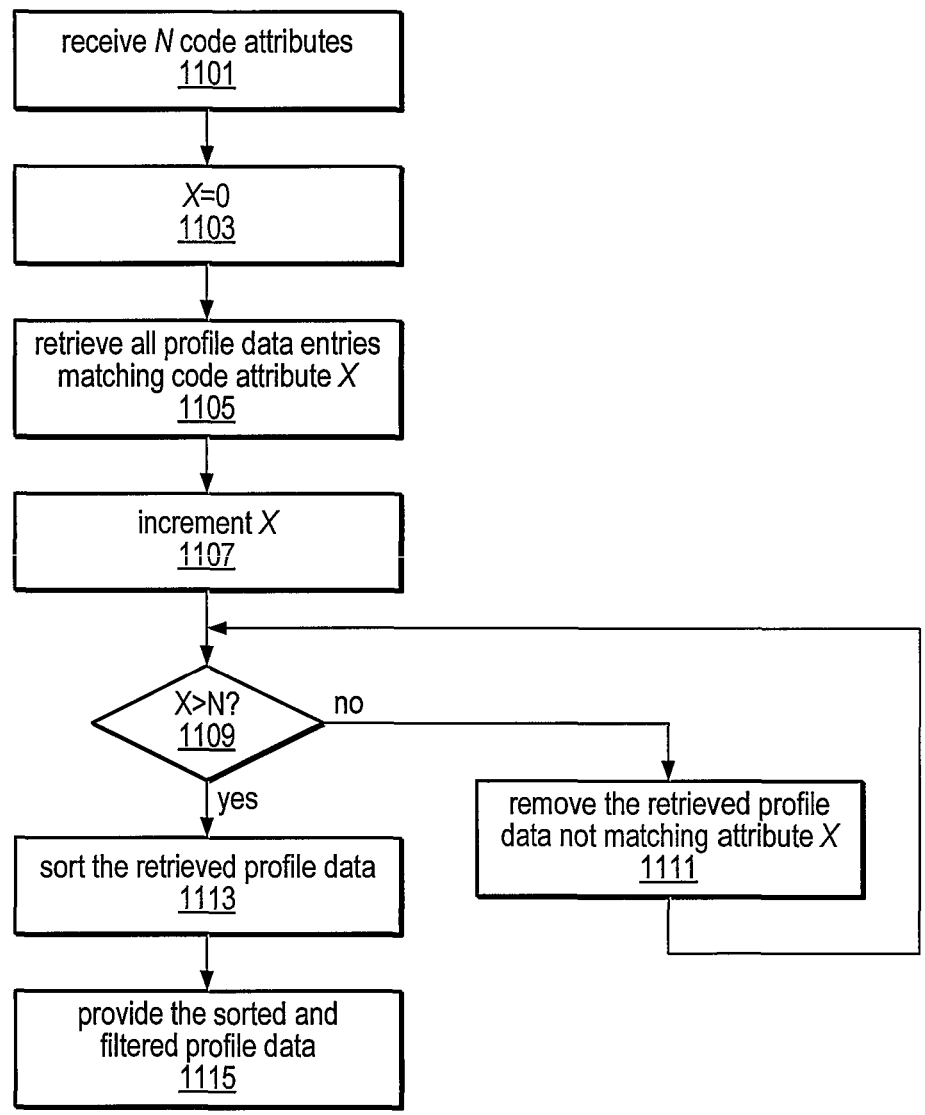
FIG. 11 is a flow chart illustrating a method for analyzing source-level data object profile data from the perspective of multiple code behavior attributes, according to one embodiment.

FIG. 11 is a flowchart for analyzing source-level data object profile data from the perspective of multiple code behavior attributes, according to one embodiment. In this example, at block 1101, N code behavior attributes are received. At block 1103, a control value X is set to 0. At block 1105, all profile data entries matching code attribute X are retrieved. At block 1107, the control value is incremented. At block 1109, it is determined if the control value is greater than N. If the control value is greater than N, then control flows to block 1113. If the control value is not greater than N, then control flows to block 1111.

At block 1111, the retrieved profile data that does not match attribute X is removed. Control flows from block 1111 back to block 1107. At block 1113, the retrieved profile data is sorted. At block 1115, the sorted and filtered profile data is provided. The profile data can be provided for display on a monitor, for saving to a file, for transmission over a network, etc.

While the flow diagrams described above depict a particular order of operations performed by certain embodiments, it should be understood that such order is exemplary (e.g., alternative embodiments may perform the operations in a different order, may combine certain operations, may overlap certain operations, may perform certain operations in parallel, etc.). For example, the loop in FIG. 11 at blocks 1107, 1109, and 1111 may be performed differently in different embodiments. In different embodiments, block 1113 of FIG. 11 may not be performed at all, may be combined with block 1111, or may be performed in parallel with block 1111. In addition, profile data aggregated by a code behavior attribute may be further aggregated and/or filtered with one or more selected instances of the code behavior attribute and/or other code behavior attributes, some embodiments.

Filtering profile data based on combinations of various code behavior attributes may in some embodiments allow analysis of the profile data from numerous perspectives. Correlating multiple code behavior attributes may in some embodiments facilitate more sophisticated code optimization than optimization based on traditional profiling techniques. Correlation of multiple code behavior attributes may also provide additional/alternative views of profile data in some embodiments.

Parallelism and Scalability

As previously noted, developers may attempt to maximize performance by exploiting parallelism (e.g., by executing multiple threads of a multi-threaded process on multiple processor cores in parallel). However, data motion between hardware resources may inhibit application scalability and, thus, application performance. The data profiler described herein may in some embodiments facilitate performance improvements by allowing identification of bottlenecks caused by data motion between hardware resources. For example, data motion of a shared variable among processors exemplifies true sharing that may inhibit performance. In one example, a cache line full of data may migrate among two or more processors requesting a shared variable. References to data migrating between processors may be substantially slower than a local reference to the data. Identifying the migrating cache line and relating the cache line to the shared variable may facilitate solving the scaling problem, in this example. The data space profiler described herein may in some embodiments allow a developer to identify all data migrations within hardware and, thus, to resolve scaling challenges. The profiler may profile data motion in hardware and relate the costs to application source code (e.g., data definitions, function/methods, scheduling and memory allocations), in some embodiments.

The data space profiler described herein may in some embodiments be used to profile a complete system through a coupling of event agents, relational agents, and the application of business intelligence, on-line analytic processing (OLAP), to performance engineering. Hardware and software event agents may capture data motion and runtime events involving data motion. These event agents may tightly couple the extended address elements of the event with the cost of the event. In other words, a specific cost (for example, execution time) may be associated with a specific address, where the address may include any combination of a program counter value, an effective address of the data, a physical address of the data, a processor address, a thread address, and other addresses.

Figure 12:
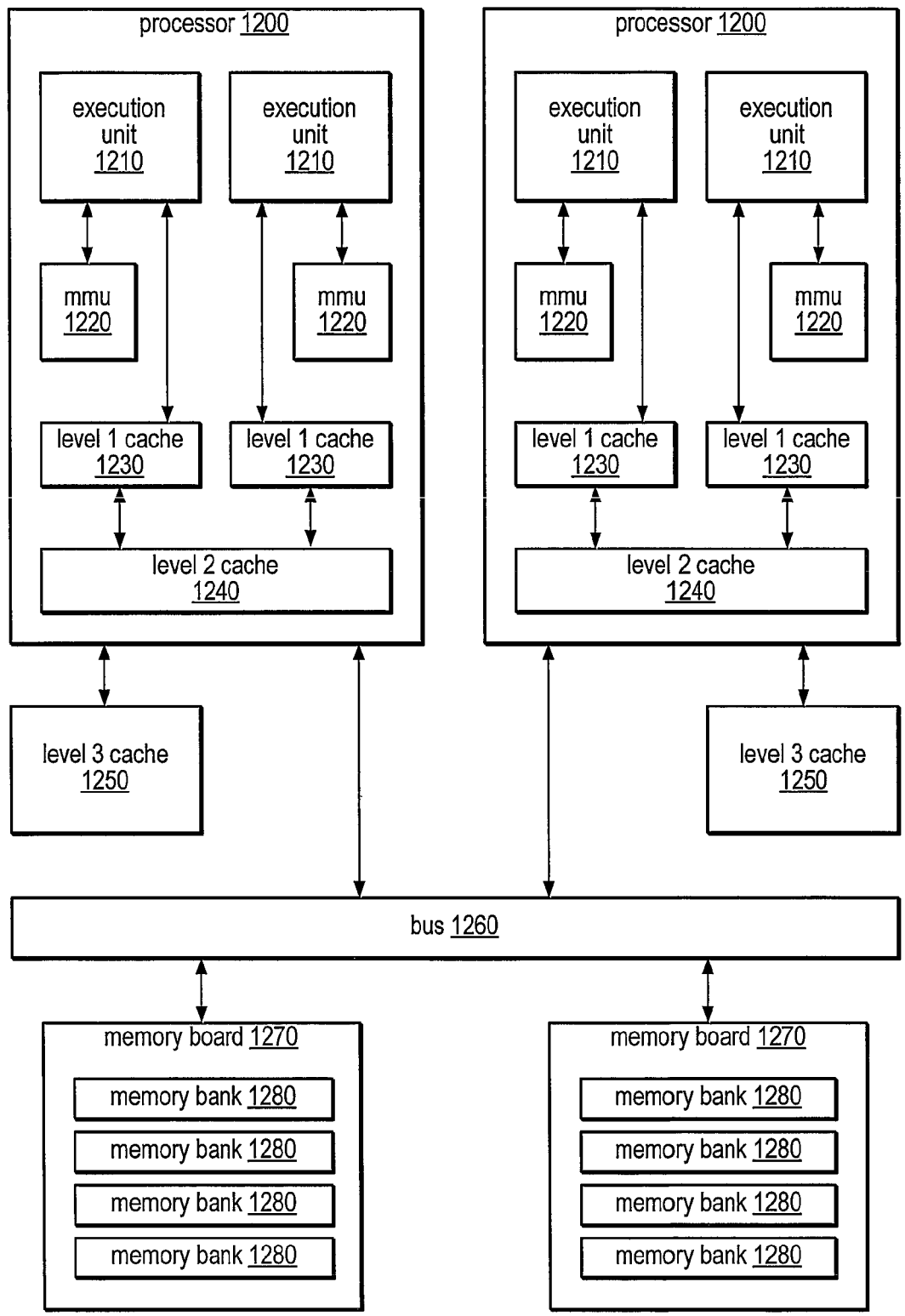
FIG. 12 is a block diagram illustrating various hardware components of an exemplary computer system, each of which may be identified by one or more extended address elements, according to one embodiment.
Figure 13:
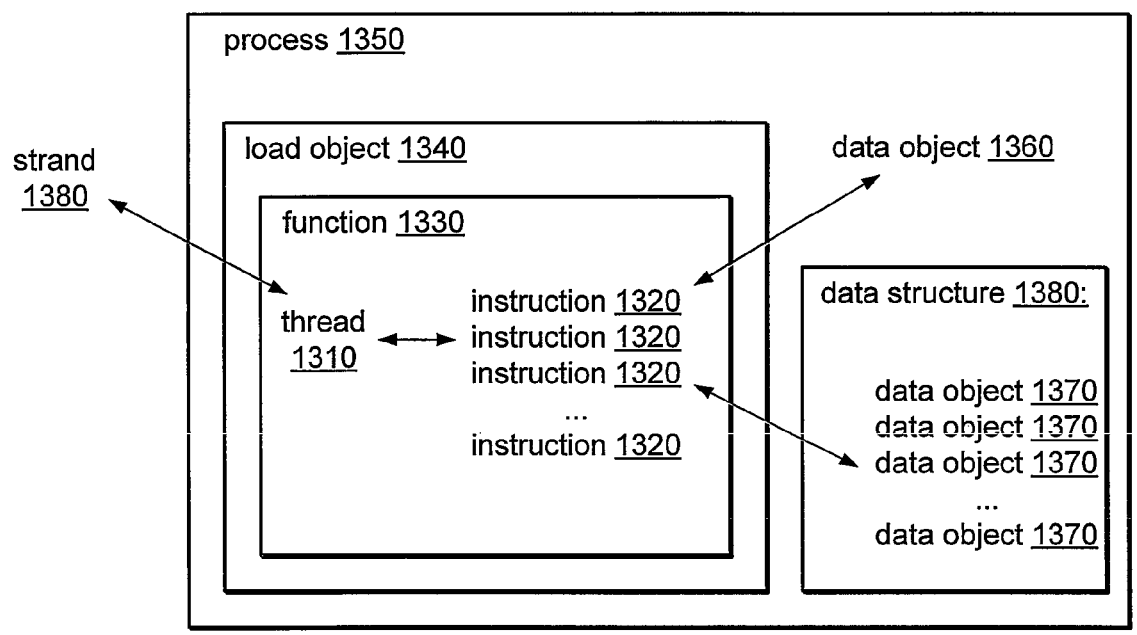
FIG. 13 is a block diagram illustrating various software components of an exemplary software program, each of which may be identified by one or more extended address elements, according to one embodiment.

Examples of the different types of address elements that may be associated with data motion instructions and/or runtime events are illustrated in FIGS. 12 and 13. FIG. 12, for example, illustrates hardware components of the system, each of which may be identified by an "address." These addresses may be used by the profiler as identifiers of profiling objects corresponding to the hardware components. In one embodiment, the address of each hardware component may include a virtual or physical address in the memory map of the system and/or the address space of a software application (e.g., each memory bank 1280 may be addressed by a starting address for the address bank, or using an offset from an address for the corresponding memory board 1270). In another embodiment, the address of each hardware device may include a label or index for the component (e.g., each processor 1200 may be assigned a label: processor1, processor2, etc.) In other embodiments, some hardware components may be addressed using a memory-mapped address, while others are addressed using a label, index, or other identifier. In still other embodiments, the addresses identifying each hardware component in a system may include a combination of memory-mapped addresses, labels, indices, and other identifiers. As illustrated in FIG. 12, each memory sub-system component, board, integrated circuit device or functional module thereof, interface, or storage location may be considered a data profiling object and may be identified by a corresponding extended address element. In addition, functional or arbitrary sub-modules or sub-components of the data profiling objects illustrated in FIG. 12 (e.g. a TLB within an MMU 1220) may also be considered data profiling objects. In other examples and embodiments, more, fewer, or different hardware components may correspond to data profiling objects and each may be associated with one or more extended address elements.

Each programming structure and source-level data object in a system may also be identified by an address, in some embodiments. FIG. 13, for example, illustrates various software components that may be identified by one or more addresses. In this example, each process 1350 may be identified by its PID and/or by a corresponding source-level language construct. Similarly, each load object 1340 may be identified by a corresponding source-level language construct or by a virtual or physical address corresponding to the start of the instructions therein, for example. Each function 1330, thread 1310, and instruction 1320 may also be identified by one or more addresses, including source-level language constructs, virtual and physical addresses, program counter values at the start of execution of the function/thread/instruction instance, etc., in various embodiments. Data objects, whether corresponding to individual data items (e.g., data objects 1360) or elements within more complex data object structures (e.g., data objects 1370 within data structure 1380), may be identified by source-level language constructs (e.g., variable names), virtual or physical addresses of the data objects, etc. FIG. 13 also illustrates that a software thread 1310 may be executed on a particular hardware strand 1380. The addresses associated with both software thread 1310 and strand 1380 may be considered address elements of runtime events associated with thread 1310, in this example. Relational agents may map these address elements and associated runtime event costs, to other hardware and software data profiling objects involved in the events, such as cache lines or variable names, in various embodiments.

The analysis engine may be used to drill down to the cause of observed bottlenecks by applying set arithmetic on the relationships mapped the event set, in some embodiments.

For example, a user may display virtual addresses and then display physical addresses used by only the most costly cache line. By examining the two displays, the user may identify whether true sharing (e.g., between one physical and/or virtual address and one cache line) or conflicts (e.g., between many physical addresses and one cache line) may inhibit application scalability, and if so, where (e.g., by identifying the shared variable). The data space profiling system and method described herein may be applied to profiling data motion in networks of computers, computer sub-components, and networks of storage devices, in various embodiments.

Profiling Using Turing Machine Model

Figure 14:
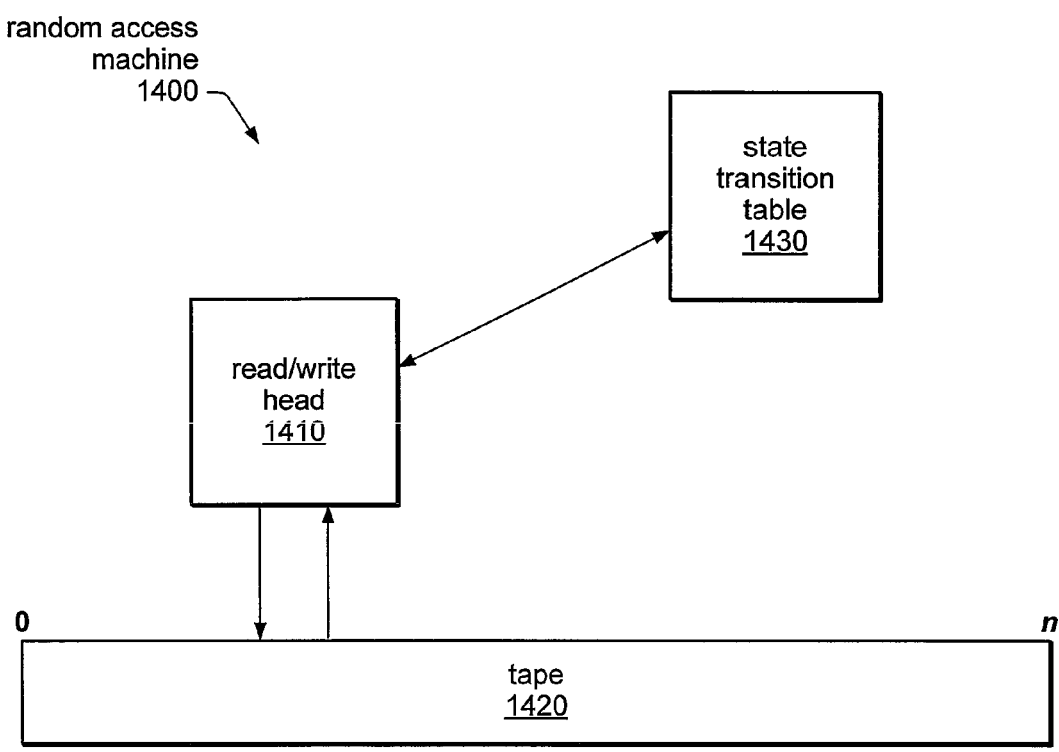
FIG. 14 illustrates an exemplary computing system modeled as a Random Access Machine, according to one embodiment.

It has been proven elsewhere that all computation devices may be expressed using Turing Machines. In other words, if a system can be used to profile a Turing Machine, then it may be used to profile any/all computing system(s). Computing systems may be modeled as a Turing Machine subset or variant called a Random Access Machine. Traditional profiling tools focused on the state transition aspect of the Turing Machine. The data space profiler described herein models profiling of the machine tape of a Turing Machine instead. For example, FIG. 14 illustrates a computing system modeled as a Random Access Machine, according to one embodiment. In this example, random access machine 1400 includes a tape 1420, having storage locations numbered 0 to n, a state transition table 1430, and a read/write head 1410. In this example, the event set for the computing system is addressed by finite locations on tape:

$$A = \{s, n\}$$

Event Set: $E = \{A, c\}$

In this example, A (Addresses) may be represented as a tuple comprising s (the state from the state transition table) and n (the address on the tape). Each event in the event set comprises an address (A) and a cost (c).

Early profilers focused on s in the state transition table because data transformations (i.e., processors and execution units) were the most costly components in early systems. The data space profiling tool described herein provides a superset of existing profiling technologies, because in modern machines the state transitions are actually modeled in the random access tape. Virtually all hardware may be profiled using this tool, because all computer hardware (computer memory, computer processors, computer networks, storage systems, and others) may be modeled as being equivalent to a Random Access Memory Turing Machine. For example, internal components of computers, networks of computers, computing grids, and storage networks may all be profiled and related to the objects that are most relevant to the developer (e.g., elements of the memory hierarchy that affect data movement.)

The profiling methodology and tools described herein may be used to extend multidimensional data to the profiling of complete systems, not just instructions, in various embodiments. For example, they may not only capture virtual addresses of instructions (e.g., Program Counter values), as traditional profilers do, but they may capture a more complete set of extended address elements associated with runtime events. Event agents may include software and/or hardware to capture multiple extended address elements associated with an event. For example, in one embodiment the extended address may include: one or more virtual addresses (program data allocations), one or more program counter addresses (instructions), one or more physical addresses (hardware allocations), one or more cache addresses (identifies which caches are used), one or more software execution entity addresses (threads), one or more execution device addresses (hardware strands), one or more temporal addresses (time), and other addresses (e.g., network addresses, storage locations, etc.)

Topology and Set Theory

The architecture of the data space profiler described herein is based on a mathematical model using n-space topology. This model allows instruction execution information and data movement information to be merged. For example, instructions with high stall times caused by data movement may be traced to cache and/or memory bank conflicts, in some embodiments. These in turn may be traced to inter- or intra-thread conflicts or to interactions with other programs. Once these are identified, they may be traced back to the instructions that caused the conflict, in some embodiments. The mathematical model that undergirds the profiler and enables correlations between these data objects is described below.

The profiler architecture collects, manages, processes and presents multidimensional performance data for analysis. The profiler may in some embodiments expand on statistical event sampling mechanisms. Various event agents, or collectors, may be used to capture events that collectively create an event space, in some embodiments. This event space may then be mapped to hardware and software components. Relational operators may provide cost breakdowns from the event space for hardware components and software constructs. Events may be sliced, filtered, and viewed across different dimensions, in various embodiments. In other words, actionable insight may be drawn out of the data by slicing, dicing, and drilling down on it, using the relational agents and analysis engine of the profiler, in some embodiments.

As previously noted, throughput performance is often achieved by improving concurrent program execution, reducing contention, and lowering the cost of coherency. However, in many of these cases, data movement constrains the achievable gain. In these situations, processors may spend more time waiting for data movement than executing instructions. Computer architects, recognizing this dependency, introduced multi-threaded cores to hide data latency. In these systems, while one thread is blocked fetching data, another can execute.

Optimization that takes into account the scalability of threads may depend on the accurate identification and characterization of data motion. Despite evidence that data motion is a key determinant in throughput, an instruction-centric profiling paradigm persists. Analysis of instruction execution, such as using traditional profilers, yields limited scalability insights. Performance analysts may determine that algorithms have certain characteristics but only with great difficulty may they understand the effects of the memory hierarchy on performance Hardly ever will they understand interactions with other parts of the program, other threads of execution, or other programs, yet these may be more important for system throughput and scalability than the choice of the best software algorithm.

The architecture and mathematics of the data space profiler may be described using set theory and topology. Topology, as used herein, is the study of the properties that are preserved through deformations, twisting and stretching, or, the set of a collection of subsets that satisfy defining properties. Topological space, as used herein, is a set with a collection of subsets that together satisfy a certain set of properties that define that set.

Topology may give more or maximum flexibility in discussing data space as compared to other descriptions. With topological analysis, employing propositions based on set theory (i.e., doing analysis based on numbers in lists) may be used. Whereas there are traditional set theory boundaries, flexibility may be obtained by means of abstraction. In this respect, sets may be viewed as ordered lists appearing in other lists.

A Digital Continuous Profiling Infrastructure (DCPI) is described in the ProfileMe paper from Digital Equipment Corporation's Western Research Laboratory (WRL) by Jefferey Dean, et al. This paper describes an event vector, $\vec{E}$, which expresses the required correlation between {PC, VA, cost}. In some embodiments of the data space profiler, hardware may enable profiling of the program counter, PC, on an out-of-order processor, and the virtual address, VA, with associated cost events. In this example, cost refers to the performance cost of execution of an associated instruction and the access to the virtual address.

The Event Space, S, is described by:

$$S = \vec{E}$$

Each element in vector $\vec{E}$ is defined as:

$$E = \{PC, VA, Cost, time\}$$

This paper states that in a constant cost gradient, one can infer PC costs and VA costs by the probability function $P_{PC}(\vec{E})$ and $P_{VA}(\vec{E})$ within the constant cost gradient. The functions approximate cost for the instructions and virtual addresses used. For example, take this Event Set:
E={PC,VA,L2CacheMiss,time}
E={
{0x1f0, 0x20000004, 1003, 10.05},
{0x200, 0x1ffffff8, 1003, 10.13},
{0x1f0, 0x20000084, 1003, 10.14},
{0x2c8, 0xfffff800, 1003, 10.16},
{0x200, 0x1ffffff8, 1003, 10.20}}

In this example, the probabilities of the instructions at 0x1f0 and 0x200 incurring a cache miss are double the probability of the instruction at 0x2c8. The L2CacheMiss cost at 0x1f0 and 0x200 were each 2006 while that at 0x2c8 was 1003. In this example, the VA 0x1 ffffff8 incurred a cache miss twice as often as the other addresses. Its cost was approximately 2006 compared with 1003 for the other VAs.

In some embodiments, performance counters (e.g., hardware counters implemented in the processor) may include support for trap-on-overflow. In some embodiments, the pipeline may support approximate correlation for cost when cost is time or L2 read misses. In some embodiments, the analyzer portion of the data profiling tool may support events that are not tightly correlated between the event and the PC, such as L2 read stalls.

In some embodiments, compiler support may facilitate some of the functionality involved in data profiling. For example, type information may be propagated from a C frontend to the code generator or all the way to the data profiling tool analyzer, in some embodiments. In other embodiments, typing rules may be defined for developers that use C as a portable assembler. In some embodiments, weakly typed languages tightly associate types with the instruction. For example, in embodiments in which different instructions operate on different data types, the type may be represented as a function of the program counter (PC):

refType=Func(PC)

There may be many more of these tightly associated functions for other objects, in some embodiments. For example, the virtual page number may be a function of the virtual address and the cache line accessed may be a function of the physical address associated with a runtime event:

Virtual Page=Func(VA)

Cacheline=Func(PA)

Even physical address, PA, may actually be represented as a function of VA (although in some embodiments it may be represented by a long function, i.e., the page tables for the process):

PA=Func(VA)

In some embodiments, the PA value may be collected at event collection time, while in other it may be calculated from the VA value at a later time, such as by one of the relational agents.

The Event Vector $\vec{E}$ in the analyzer may in some embodiments look like:

E={
$\vec{PC}$,Cost,time,VA,PA,CPU,process,strand,thread,refType}

In this example, the instruction vector, $\vec{PC}$, is the call stack of the thread for the event and refType is the referenced type of the instruction at the leaf of $\vec{PC}$, which may be added by the analyzer during post-processing.

The analyzer may collect a set of isomorphic event vectors, $\vec{E}$, each based on what cost was collected: VA and PA may be collected in specialized records when profiling is selected for hardware counter events. Homeomorphism is an equivalence relation and a mappable correspondence that is continuous in both directions between points in two topological spaces. In some embodiments, the collection may be represented as a homeomorphic Event Vector:

$$\vec{E} = \{\vec{PC}, \vec{Cost}, time, VA, PA, CPU, process, thread, refType, ....\}$$

In this modification cost is represented as a vector that is execution time-based, memory-sub-system time based, L2 Cache Miss based, etc. That is, cost is based on execution time, as affected by the memory hierarchy (e.g., an L2 cache miss). Using this model may in some embodiments result in a unified Event Space S, where the event space is the union of all event vectors:

$$S = \overrightarrow{E_{exectime}} \cup \overrightarrow{E_{memtime}} \cup \overrightarrow{E_{L2miss}}$$

Software may also have layers of structures similar to the memory hierarchy. In some embodiments, a similar approach may be taken to profile user-defined objects within an application with additional association operators.

Memory hardware structures are predominantly of two types: content-addressed memory (CAMs), and address-indexed structures. Indexed structures are also functions of a portion of the address.

For virtually indexed structures, the index into the structure I, may be defined as a function of the virtual address element of the event vector:

I=Func(VA)

For physically indexed structures, the index I, may be defined as a function of the physical address element of the event vector:

I=Func(PA)

Most of the hardware structures of computers may be described by using topological spaces. With this technology, the pages, cache lines, and software structures in use may be observed, according to different embodiments. Event agents capturing these structures may be implemented as hardware event agents, in some embodiments, or as software agents, in others. These event agents may be standard for most instantiations of the profiler, or may be specific to the particular platform on which the profiled application is executed.

Clock-based profiling may be enabled, in some embodiments, by treating a clock event as a hardware counter-type event. A backtracking mechanism may be used to unwind a single instruction and decode it for a memory operation to create a memory sub-system hardware counter-typed Event Space, S. This space, S, has a cost type of memory sub-system time, instead of hardware counter event type:

$$E=\{\overrightarrow{PC}, Cost, time, VA, PA, CPU, process, strand, thread, refType\}$$

Arbitrary object definitions (e.g., memory objects, other hardware components, software constructs, etc.) may be allowed in the profiler, in some embodiments. Along with user and system object association operators, they may make the profiler highly adaptable, and may enable space S to be mapped into S' by an arbitrary function:

$$S'=Func(S)$$

These association operators may replicate the mappings found in applications, operating systems and hardware. The operators may enable the mapping of space S, into cost Scost by aggregating the user-defined spaces and associated cost functions. For example, the instance of time spent in memory sub-system vs. cache line may be represented as:

$$Scost=\{CostInterval \times Count(Funccacheline(S)), Func\text{-}cacheline(S)\}$$

Some of the operators that may be included in the profiler are: bit-wise operators; and, xor and or (&, ^, |), shifts (>> and <<), arithmetic operators, comparators (==, <, >, ...), logical operators (!, &&, ||) the ternary range operators (?:). All of these operators may help fold space into components usually found in hardware and software structures. In some embodiments, all of the event vector elements may be available as tokens (TSTAMP, PADDR, etc.). Such embodiments may also include various vector operators, such as the inclusion operator (scalar IN vector) returning a Boolean, and the terminator operator (LEAF vector) returning a scalar.

The Funccacheline( ) function maps an Event Space, S, by aggregating based on the definition of the hardware indexing operation for the cache line. In this example, the Count( ) of events that match a cache line may be aggregated, and the sum may be multiplied by the CostGradient per event. However, an arbitrary function can be used to generate cost:

$$S\cos t=\{Func\cos t(S), Funcobject(S)\}$$

In this example, Funcobject( ) returns the hardware or software object from space S; and FCost( ) is the arbitrary cost function. This flexibility may in some embodiments enable a user to create profiles by costs such as by the cycles-per-instruction cost, something that may not be practical to do from a cache line perspective in hardware.

Note that Funcobject( ), a user-specified object, may be used to define existing maps, such as inclusive costs within the function object:

$$Funcinclusive\_junc(S)=\{(Funcfunction(S) IN Func\text{-}callstack(S)\}$$

In this example, Funcfunction( ) returns the source-level language object view for the collection of instructions named Function; and Funccallstack( ) returns the call stack from the event space.

The function for exclusive costs within a function object may be defined as:

$$Funcfunction(S)=\{Funcpc\_to\_junction(S)\}$$

Slices

The true power of data profiling may be in its ability to extract slices from space S. An operator that slices the event space by a specific time interval may be applied to the event set, as in this example:

$$S'=\{((Funcsecond(S)\geq 10)\cap(Funcsecond(S)<11))\}$$

In this example, the function Funcsecond( ) returns the time interval for the event space in seconds.

With this slice, a user may be able to observe the system as it changes over time and observe, in detail, any phase of the program, machine, or hardware device. In this example, behavior may be observed over a period of one second commencing 10 seconds from the start of the application.

Then using this new space S', the cost, Scost may be generated:

$$SCost=\{FuncCost(Funcobject(S')),Funcobject(S')\}$$

In this example, Funcobject( ) is a user-defined function that returns the aggregate of the related objects, and FuncCost( ) generates the cost. Note that in this case, the cost is two-dimensional. In other cases, multidimensional costs can be generated.

$$SCost=\{FuncCost(Funcfunction(S')),FuncCost'(S),\\FuncCost''(S),Funcfunction(S')\}$$

In this example, FuncCost'( ) and FuncCost''( ) may be arbitrary cost functions and the cost, SCost, may be transformed by sorting on any of the dimensions to provide the most insight. For example, SCost={FuncCost(S),Funcsecond(S)}

The data may be presented by FuncCost(S), ordered by the costliest second through the least costly second, or by Funcsecond(S), the execution sequence. Graphical representations of the cost may also provide in-depth insights, in some embodiments. A GUI implementation for the analyzer is described in detail later.

Another example of a data selection may be to slice the event space by a single cache line (e.g. the nth set in the cache structure):

$$S'=\{Funccacheline(S)=n-1\}$$

Then using this new space S', the cost, Scost may be generated:

$$S' cost=\{Funccost(Funcobject(S'),Funcobject(S'))\}$$

In this example, Funcobject( ) is a user-defined function that returns the aggregate of the related objects, and FuncCost( ) generates the cost. In this case, the cost is two-dimensional. In other cases, multidimensional costs may be generated and these costs may be displayed as multi-colored or moving surfaces in a display, for example The cost, SCost, may be transformed by sorting on any of the dimensions to provide greater insight. For example:

$$SCost=\{Sort(FuncCost(S),Funcsecond(S))\}$$

The data may be ordered primarily by FuncCost(S) and secondarily by Funcsecond(S); that is, from most costly to least costly with ties shown in execution sequence.

After an aggregation operation, the costs may be generated from an associated selection that offers further insight, as in this example:

$$SCost=\{FuncCost(FuncVA\_by\_cacheline(S')), FuncVA\_by\_cacheline(S')\}$$

The FuncVA_by_cacheline( ) association selector is designed to compare virtual addresses with cache hierarchy structures. It segments the virtual address space by the same alignment and size restrictions as by the cache hierarchy selector. By way of contrast, Funccacheline( ) lacks the address folding effects. FuncVA_by_cacheline( ) and Funccacheline( ) allow the performance analyst to trace virtual addresses to physical addresses to hardware structures and back.

The associated operations may allow the observer to infer the characteristics of the virtual address to physical address to hardware structure mapping.

For any physically indexed hardware:

$$S'=Funchardware(FuncPA(FuncVA(S)))$$

Note that FuncPA( ) may be a complicated mapping operation. The effects of FuncPA( ) may be captured when the event space is created. Later, the properties of the operation FuncPA( ) may be observed by comparing spaces defined by: FuncVA_by_hardware(S) and FuncPA_by_hardware(S). These are the associated operations for the hardware object using either virtual or physical addresses.

These association operators may enable the analyst to filter on one object in any of the association operators and then view the costs in the other association operators.

Note that these associated mappings may be created to compare two spaces from the viewpoint of any arbitrary dimension. Additional association operators enable the analyst to drill down to processor boards, (e.g., Funcprocessor_board(S)), or memory boards, (e.g., Funcmemory_board(S)).

When comparing the spaces produced by these mappings, the profiler may provide insight into whether or not memory references are remote or local to the processor. Set operators may then be applied to determine if an access is local or remote by comparing these association operators:

$$Funcremote(S)=\{Funcprocessor\_board(S) \neq Funcmemory\_board(S)\}$$

In this example, the Funcremote( ) operation returns the space where processors reference memory on remote memory boards. As noted earlier, this space can be mapped onto any cost space, SCost.

As previously noted, the data space profiler architecture may provide various operators to manipulate set elements: bit-wise, arithmetic, comparators, logical, and ternary, in different embodiments. Set operators may also be available: union, intersection, inclusion, terminator, etc. Built-in functions may be used to manipulate data; e.g., to sort the data. The profiler may be readily implemented with in-order processors that support trap-on-overflow performance counters. For systems that lack hardware counters or hardware-based profiling infrastructure to drive sampling, clock events may enable data profiling, in some embodiments. A clock event may generate a Hardware Counter-Typed event representing retire latency. A backtracking mechanism may unwind a single instruction and decode it for a memory operation to create a Memory Sub-System Hardware Counter-Typed event space, S, which has a cost representing memory sub-system time.

As noted earlier, a processor's memory sub-system may be viewed as a subspace, in some embodiments. In an exemplary system this might comprise an execution unit, L1 and L2 caches, bus, and memory, although the actual names and architecture are not significant. Cost may be attributed in this subspace as shown in Table 1 below. Using logic operations, events may be traced to each memory sub-system. By comparing event spaces, the time cost of each memory sub-system component cost may be related to other events, in some embodiments. In other words, latency for specific hardware devices and under which specific conditions they arose may be determined, in some embodiments.

As previously noted, the association operator of types in weakly typed languages uses the instruction as an argument:

$$refType=Func(PC)$$

In some embodiments, data type information may be correlated with the instruction in the analysis engine. In some embodiments, data type information may be correlated with the PC, or address of the reference, by the runtime system. For example, a particular data type may in some embodiments be associated with a given memory location. In some embodiments, the compiler may generate a table that associates every instruction's memory reference with an identifier to its data type. During the analyzer's processing, the event set may be joined with the type tables and the result may be merged into the event set as the referenced type (refType).

To gain resolution (data density) in specific dimensions, mappings may be applied while building the Event Space, S. For example, if call stacks are not relevant, the Event Space S may be transformed into S' at data collection time:

$$S=\vec{E}=\{\overrightarrow{PC},\overrightarrow{Cost},time,VA,PA,CPU,process,thread,refType,\ldots\}$$

$$S'=\vec{E}'=\{PC,Cost,time,VA,PA,CPU,process,thread,refType,\ldots\}$$

In this example, data may be aggregated on PC, instead of $\overrightarrow{PC}$. Specificity in one dimension, call stacks, may be lost, but data density may be gained in the other dimensions by reducing the cost gradient. Data may be sampled more frequently because the data is pre-aggregated.

Note that hardware may only need to guarantee the event tuple:

$$E=\{PC,VA,Cost\}$$

However, Cost may be the vector $\overrightarrow{Cost}$, rather than a scalar. Adding a cost dimension may enable attribution into the event space, S.

The memory sub-system of an exemplary large machine is described below. The actual names of the components are not significant; the concept to note is that the memory sub-system may be viewed as a dimension:

| Execution Unit | L1 Cache | L2 Cache | Bus Controller | Bus | Bus Controller | Memory |
|---|---|---|---|---|---|---|

The cost vector may provide attribution into this dimension with hardware that describes which component in the memory sub-system participated in the runtime event. In this example, logical unknown values are represented as X.

TABLE 1

| Cost Type | Execution Unit | L1 Cache | L2 Cache | Bus Controller | Bus | Bus Controller | Memory |
|---|---|---|---|---|---|---|---|
| Instr Count | 1 | X | X | X | X | X | X |
| Memop Count | 1 | 1 | X | X | X | X | X |
| L1 Cache Miss | 1 | 1 | 1 | X | X | X | X |
| L2 Cache Miss | 1 | 1 | 1 | 1 | 1 | 1 | X |
| Mem Ref | 1 | 1 | 1 | 1 | 1 | 1 | 1 |
| Cache to Cache | 1 | 1 | 1 | 1 | 1 | 1 | 0 |

Note that with logic operations, all events may be attributed to each memory sub-system component that provides a type bit back to the event generating hardware device.

Note that spaces may be created for each of these hardware components and compared to spaces for time, in some embodiments.

In some embodiments, there may be a requirement to maintain a constant cost gradient. The collection device (e.g., event agents) may cycle through all possible event vectors that are meaningful, or may collapse certain ones at collection, by not attributing those components of the memory sub-system. The collection device may request an event stream with a constant gradient from the hardware for each specific element of $\vec{Cost}$ that is being cycled through, in some embodiments.

In some embodiments, by normalizing the cost gradient via an alternate source, each cost element in $\vec{Cost}$ may be guaranteed to be constant and the statistical profiling paradigm may be maintained.

The event space S may include both time and event cost type. Hardware devices (event agents) may provide a count, c, of the event cost type over time. The event scalar Cost may be normalized by the corresponding dc/dt for every element in Event vector, $\vec{E}$.

By including more of these devices, more simultaneous attribution may be attained into the cost of the memory sub-system with the event space, S.

Note that in the tightly associated tuple, the virtual address, VA, may be just the process identifier (PID) and the address within that PID (PID+address). This address and cost may be arbitrarily descriptive: IPv6 address, port number, etc. A distributed application may thus be profiled.

$$E=\{PC, address, \vec{Cost}, time\}$$

As previously noted, software may include layers of structures similar to the memory sub-system cache hierarchy and user defined data-types. In some embodiments, a similar approach may be taken to profile the user-specified objects within an application with additional events and cost types, and the associated space definitions.

Note that because collection may be distributed and the operations may be implemented in parallel, the profiler may be easily scaled to arbitrarily large applications and arbitrarily large computer systems, for example, those employing the new generation of CMT processors.

Figure 15:
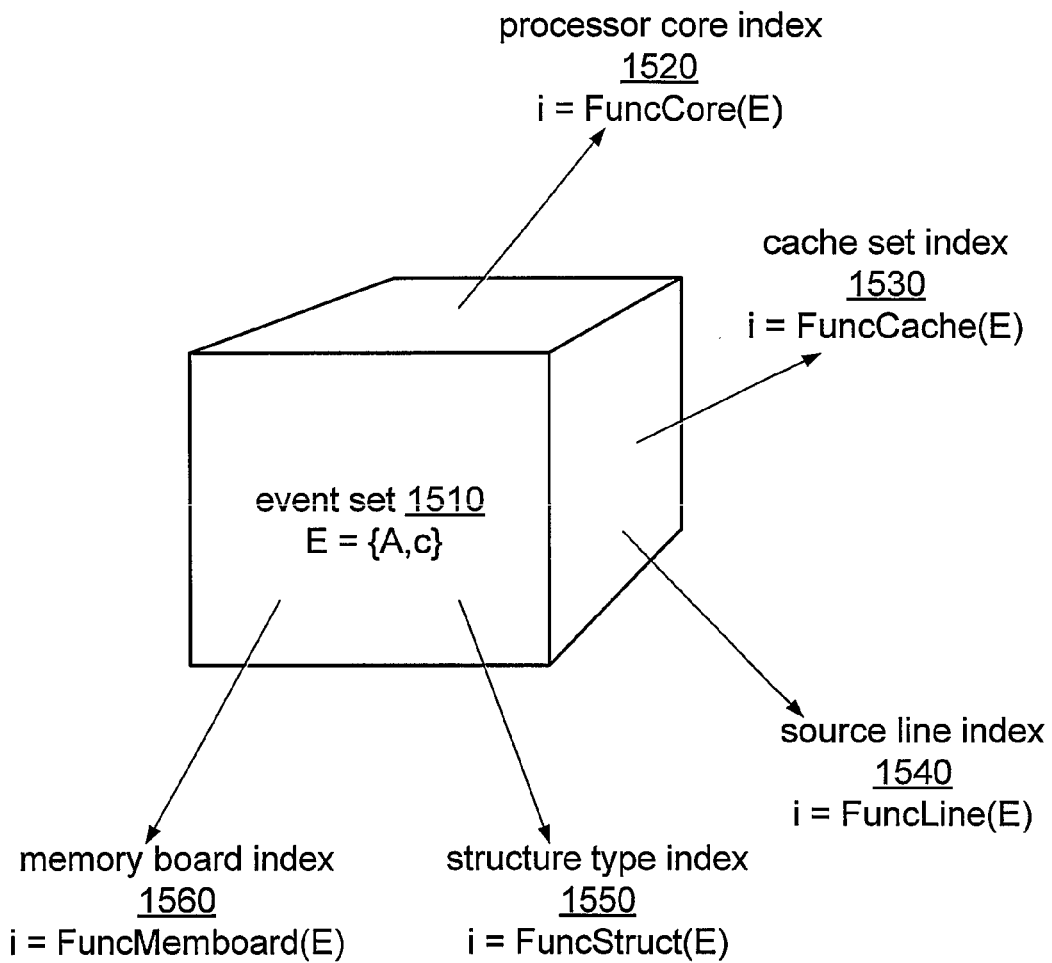
FIG. 15 is a conceptual diagram illustrating extracting profile data from an event space using multiple indices, according to one embodiment.

As discussed above, each member of the event space may be multiple-indexed, i.e., indexed according to each of the multiple data object addresses associated with the event. This is illustrated in FIG. 15. In this example, an event set 1510 includes multiple events, each including mappings between the cost of the event (c) and the extended address associated with the event (A).

The events in the event set, in this example, may be indexed according to the memory board accessed by the event (1560), the structure type of the event (1550), a source line associated with the event (1540), the cache set accesses by the event (1530), and the processor core associated with the event (1520). In this example, each index is dependent on the function defined by the relational agent corresponding to the data object. For example, each event may be associated with a source line index value n, where n is determined by a mathematical function dependent on the source code line number associated with the event. If a relational agent function defining source line index 1540 is applied to the events in the event space, the value of the source line index 1540 may be returned for each event, along with the cost of the runtime event associated with the source code line data object.

Applying multiple relational agents to the events in the event space may provide filtering and aggregation of the events with respect to one or more data objects and may display data object costs associated with the filtered and aggregated data, in some embodiments. This filtering and aggregation method is analogous to the application of multiple set operation functions and other functions to an event set, as described above.

User Model

The user model for the data space profiling tools may be thought of as consisting of three steps: compiling the target program, collecting the data, and analyzing the data. These steps are discussed in detail below.

Compiling the Target Program

The user may compile the target program (i.e., the application to be profiled) just as he or she would for production use, in some embodiments. In some embodiments, command line switches or flags may be set at compilation to enable data space profiling. In some embodiments, these flags may cause changes to the symbolic information recorded with the executable: first, by ensuring that symbolic information about data references are written into the symbol tables; second, by cross-referencing each memory operation with the name of the variable or structure member being referenced; third, by adding information about all instructions that are branch targets; and fourth, by associating each instruction (PC) with a source line number.

In some embodiments, enabling data profiling may cause the compiler to suppress optimizations, while in others it may not. When data profiling is enabled, the compiler may change the generated code slightly, in some embodiments. For example, it may add NOP instructions between loads and any join nodes (labels or branches) to help ensure that a profile event is captured in the same basic block as the triggering instruction. In another example, the compiler may avoid scheduling load or store instructions in branch delay slots. The impact of these modifications on performance may be highly application-dependant, but may be generally minor For example, the runtime for a particular application, as compiled with profiling enabled, may be approximately 1-2% greater than the runtime of the application compiled without enabling data profiling.

Initiating Collection of Profile Data

Data collection may be initiated using a collect command, in some embodiments. The collect command may specify data collection parameters along with the target program and any arguments the target program requires. For example, clock and hardware-counter profiling may be specified, independently of or along with tracing of synchronization delays, memory (heap) allocation and deallocation, or MPI messages, in different embodiments. In some embodiments, the result of a collect run (referred to herein as an experiment) may be stored in a file-system directory with a log file giving a time-stamped trace of high-level events during the run, a load objects file describing the target executable and any shared objects it uses, and additional files, one for each type of data recorded, containing the profile events and the call stacks associated with them.

To profile using hardware counters, the collect command may include one or more flags, which may specify one or more counters to be used. In such embodiments, if multiple counters are requested, they may be required to be implemented on different registers. Counters may be specified by name, and an overflow interval may be specified as "on", "high", or "low" or as a numerical value. The settings may be chosen to give overflow intervals corresponding to approximately 10 ms, 1 ms, and 100 ms for the counter named "cycles", for example. For other counters, the time corresponding to the overflow value may depend on the program behavior. In some embodiments, the intervals are chosen as prime numbers, to reduce the probability of correlations in the profiles.

Event Agents

As noted earlier, event agents may be implemented in hardware, in software, or in a combination of hardware and software, according to various embodiments. One example of a hardware event agent is a hardware counter. Modern processors may include one or more hardware counter registers, each of which may count one of a number of events. For example, the members of the UltraSPARC-III™ family of chips each include two counter registers. In some embodiments, each counter may be preloaded with a value, and when the counter overflows, an interrupt may be generated. The interrupt may be translated by the operating system into a signal delivered to the process being profiled. In some embodiments, when the signal is received by a handler that is part of the data collection system, it may cause a data record to be written by that handler for the event.

In various embodiments, hardware counters may be usable for counting cycles, instructions completed, instruction cache (I$) misses, data cache (D$) read misses, data-translation-lookaside-buffer (DTLB) misses, external cache (E$) references, E$ read misses, E$ stall cycles, and other runtime events. Some of the counters may count actual events (i.e., the number of times the particular trigger occurred), but others may count cycles. For example, cache counters that measure cycles may be especially useful, since they may count the actual time lost because of the events, not just the number of events. The collect command, if run with no arguments, may in some embodiments generate a list of available counters for the machine on which it is run.

Each proprietary processor may implement hardware performance counters tailored for its particular architecture, with considerable variation in the number of counters supported, the events counted, whether an interrupt is provided on counter overflow and whether such an interrupt is precise or not, or a detailed history is available for sampled instructions. The Alpha™ 21264 processor and Pentium™ 4 processor are examples of processors which provide hardware counter support that may be used in implementing data profiling, as described herein.

Some processors employing hardware counters may not always deliver a precise trap when a hardware counter overflows. Since a counter may overflow quite late in the pipeline, the logic to deliver a precise trap may be complex, and may significantly affect the performance of the chip in normal operation. Therefore, the trap signal may be delivered after the event that caused the counter overflow and may arrive quite a bit later.

At the time the signal arrives, the program counter (PC) value that is delivered with it may represent the next instruction to issue, which may not be the instruction following the one that caused the counter overflow. The data space profiler may in some embodiments take this "skid" into account in recording and interpreting the data. The hardware may not capture the address of the data whose reference causes a memory-related counter overflow event, in these cases. Instead, only the register set at the time of the signal delivery may be reported.

Therefore, although a PC may be reported when the profile interrupt is delivered, the instruction at the location pointed to by the PC may not be the one triggering the event; that instruction may not yet have been executed. The instruction immediately preceding it in execution may be the one causing the event, but counter skid may add a great deal of uncertainty. To address this problem, the data space profiler may in some embodiments include an apropos backtracking search. In one embodiment, this backtracking search may be specified by the user by pre-pending a "+" to the name of a memory-related counter used for profiling. If the backtracking search is specified, then during data collection, the event agent may "walk back" in the address space from the PC reported with the overflow until it finds a memory-reference instruction of the appropriate type. In this example, the actual PC of the instruction causing the event may be called the trigger PC, while the PC determined by apropos backtracking may be referred to as the candidate trigger PC.

The first memory reference instruction preceding the PC in address order may not be the first preceding instruction in execution order. In particular, if there is any instruction that is a branch target, there may be no way to determine which path to the PC was taken, so the true trigger PC may not be able to be determined In some embodiments, it may be too expensive to locate branch targets at data collection time, so the candidate trigger PC may always be recorded, but it may need to be validated during data reduction.

Once the event agent has backtracked to find the candidate trigger PC, it may be configured to disassemble the instruction and determine which registers are used to compute the effective address. However, as previously noted, the contents of the registers may have been changed by intervening instructions while the counter is skidding, so that even if the expression to compute the effective address is known, in some embodiments it may not be computable. The event agent may make this determination, and may either report a putative effective address, or may indicate that the address could not be determined. In other embodiments, a method for determining the effective address in these situations may be included in the data space profiler.

Some processors may not include hardware performance counters or may not include enough hardware performance counters to capture all of the information desired by an analyst. In some embodiments, a software version of one or more hardware performance counters may be implemented. This event agent may consist of multiple software counters located in machine addressable storage. Each of these counters may be modified based on data collected from a hardware instruction sampling device, in some embodiments. The hardware instruction sampling device may in some embodiments be configured to return instruction sampling information based on a constant instruction rate. Each event packet from the sampling device may be scanned by the event agent. In some embodiments, if the event contains data associated with the counter device, the event agent may increment one of the counters by an amount equal to the instruction rate detected between events. This instruction sampling method may be used in systems where no hardware counters are present or to supplement existing hardware counters, in different embodiments. In some embodiments, it may provide libcpc (and cpustat) functionality on systems that lack hardware performance counters and have instruction sampling.

In some embodiments, clock-based profiling may be used as a basis of statistical sampling, and may use a fixed count of previous instructions for identifying an instruction associated with a detected event, rather than the backtracking technique described above. In such embodiments, the fixed count may be any value (including zero) and may be a processor-specific or chip-specific predetermined number of instructions. In various embodiments, the instruction may be decoded, after being identified, and if it includes a memory operation, a memory sub-system packet may be created, similar to those created when using hardware counter based profiling.

Figure 16:
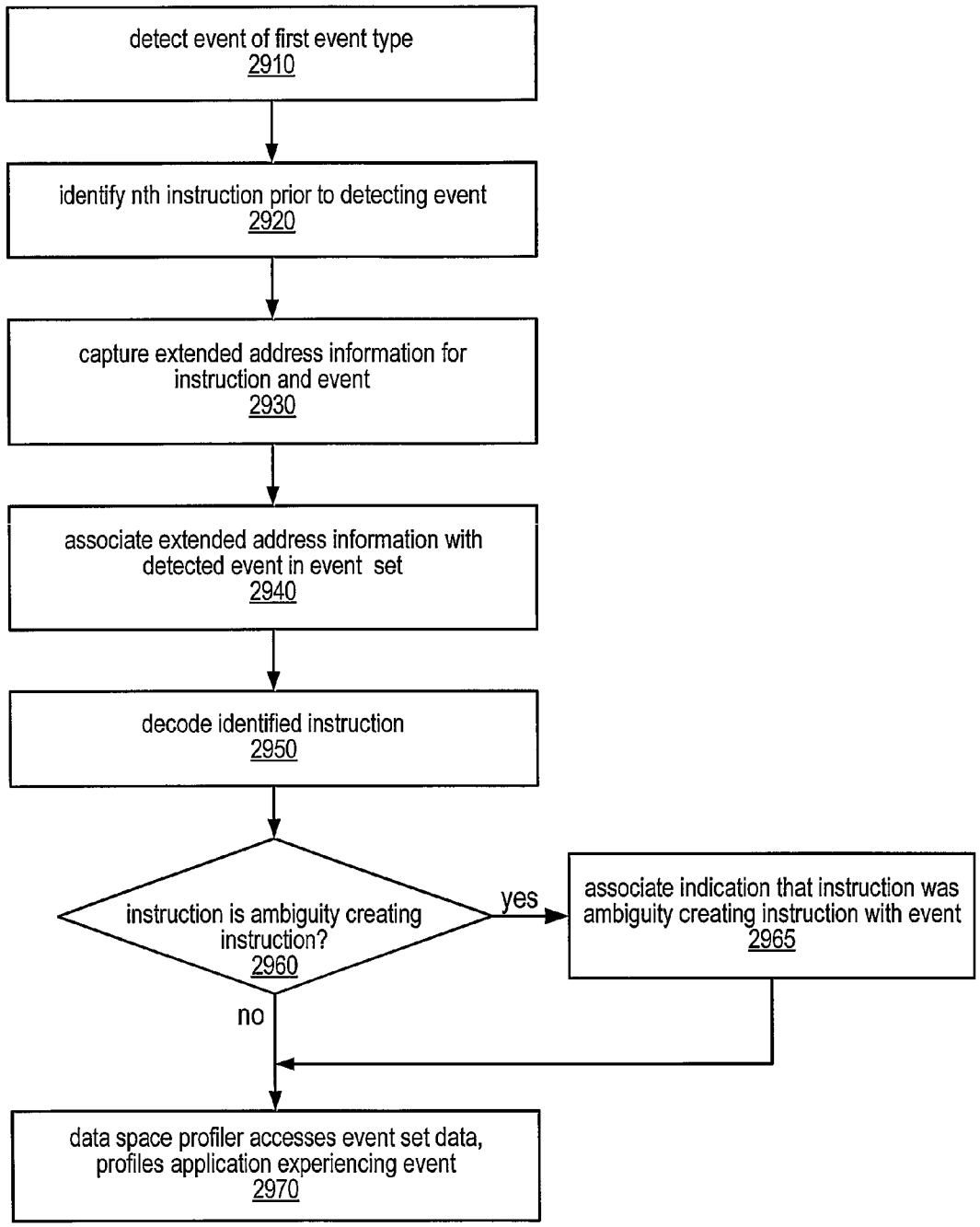
FIG. 16 is a flow chart illustrating a method for associating an instruction with a detected runtime event, according to one embodiment.

A method for identifying and associating an instruction with a detected event, according to one embodiment, is illustrated in FIG. 16. In this example, an event of a first type is detected at 2910. This event may be of any type described herein (e.g., a cache hit or miss, a memory reference, a counter overflow or underflow, branch misprediction, etc.) or may be any other type of runtime event of interest in application profiling, according to different embodiments.

An instruction to be associated with the detected event may be identified at 2920. This instruction may be referred to as a "trigger instruction", although it may or may not have actually caused the detected event. In this example, the trigger instruction may be the instruction that executed n instructions prior to the instruction identified by the program counter value when the event was detected, where the value of n is specific to the processor architecture. In some embodiments, the value of n may be the same for all detected event types, i.e., the lag between a trigger instruction and a detected event associated with the trigger instruction may be the same for all event types being detected. In other embodiments, the lag between a trigger instruction and an associated event may be different for different event types. For example, the program counter may always be advanced four times between execution of an instruction associated with a cache miss and detection of the cache miss. Therefore, the value of n for detection of a cache miss may be −4. In another example, the program counter may always be advanced twice between the execution of an instruction that triggers an instruction counter overflow and detection of the overflow, so the value of n for detection of an instruction counter overflow may be −2. As previously noted, in some embodiments and for some event types, the value of n may be 0, indicating that the current program counter value at the time of the event detection identifies the instruction to be associated with the event.

Once the trigger instruction has been identified, extended address information may be captured related to the identified instruction and/or the detected event, as in 2930. In various embodiments, this extended address information may include any identifiers and corresponding values for any or all of the extended address elements described herein (e.g., extended address information corresponding to software constructs, data allocations, hardware components, or hardware or software context). The captured extended address information may in some embodiments be associated with the detected event in an event set, as illustrated in 2940.

The identified instruction, once located in the program code sequence, may be decoded, as in 2950. In this example, if the identified instruction is an ambiguity-creating instruction (e.g., a branch or branch target), the instruction may not have triggered the event and profile data collected for the identified instruction may be discarded. In some embodiments, if the identified instruction is an ambiguity-creating instruction, as illustrated by the positive exit from 2960, an indication that the identified instruction was an ambiguity-creating instruction may be associated with the event, as in 2965. In some embodiments, profile data corresponding to the identified instruction that was captured and associated with the event may not be discarded, but may be associated with the event along with the indication of ambiguity. As previously noted, an ambiguity-creating instruction may be a branch instruction, a branch target location, an entry point location, a jump target location, an indirect branch target location, a trap handler location, an interrupt handler location, or any other instruction or instruction target that may have disrupted the program sequence.

If the identified instruction is not an ambiguity-creating instruction, as illustrated by the negative exit from 2960, the captured profile data may be stored in an event space database and may be accessed by a data space profiler, as in 2970. The data space profiler may profile the application and/or system that experienced the detected event using the extended address information and/or other profile data, as described herein. In some embodiments, an optimizing compiler, a runtime interpreter (e.g., JVM™), or a code generator may use the profile data and/or profiling results to improve performance of the application. In some embodiments, the profile data may be stored in an event space database and may be accessed by a data space profiler even if the identified instruction was an ambiguity-creating instruction, as shown by the path from block 2965 to block 2970 in FIG. 16.

In some embodiments, the operations illustrated in FIG. 16 may be repeated whenever a runtime event of interest is detected. In some such embodiments, the method may only be applied to one type of detected event, while in other embodiments, it may be applied to two or more different event types, using the same or different values of n to identify a trigger instruction to be associated with each of the detected events.

The method illustrated by FIG. 16 may in some embodiments be implemented using hardware and software event agents and relational agents, as described herein. For example, the event of the first type may be detected by a software event agent or a hardware event agent, depending on the event type and the configuration of the processor. In some embodiments, operations 2920-2940 may be implemented by a software event agent, while various relational agents may be used by the data space profiler to access and analyze profile data, as in 2970. In another embodiment, identifying the nth instruction prior to detecting the event (as in 2920) and decoding the identified instruction (as in 2950) may be implemented in or supported by hardware, while other operations are implemented in software. In still other embodiments, the operations illustrated by FIG. 16 may be implemented using any combination of hardware and software elements suitable for detecting events, identifying particular instructions in an instruction stream, decoding instructions, capturing extended address information, and associating extended address information with detected runtime events. In one embodiment, a hardware event agent (e.g., an agent that detects a counter overflow) may generate a trap request, and the operations illustrated in FIG. 16 as elements 2920-2965 may be executed by trap handling software when a corresponding trap is taken.

As noted above, the method illustrated in FIG. 16 may in some embodiments be applied to a system implementing clock-based profiling as a basis of statistical sampling. In one example, a system may include a counter that counts instructions executed. In this example, the counter may be initialized so that it will overflow after counting a predetermined number of instructions. A runtime event may be detected when the counter overflows and the instruction causing the overflow (i.e., the instruction that was executing when the counter overflowed) may be identified using the techniques described in FIG. 16. Extended address information may be captured for this identified instruction and associated with the detected event (i.e., the counter overflow). The counter may then be reset to its initial value and the operations may be repeated. In this way, the instruction stream may be sampled at a rate dependent on the predetermined initial value of the instruction counter. For example, if the counter is initialized so that it overflows after 10,000 instructions, this method may be used to sample every 10,000$^{th}$ instruction. In some embodiments, the profile data captured and associated with the event may be attributed to the identified instruction at a frequency determined by the sample rate. For example, if one of every 10,000 instructions is sampled, the event may be associated with an indication that the identified instruction executed 10,000 times.

In some embodiments, a similar sampling technique may be applied to systems in which multiple performance monitoring counters are implemented and active. For example, in one embodiment, a processor may include an instruction counter configured to overflow after counting m instructions and a cache miss counter configured to overflow after counting p cache misses. Thus, every m$^{th}$ instruction and every p$^{th}$ cache miss may be sampled. In this example, when one of the counters overflows, hardware or software agent(s) may be configured to determine which counter overflowed, and to identify a trigger instruction to be associated with the event (i.e., the counter overflow) using the techniques illustrated in FIG. 16. For example, the trigger instruction may be in a different location in the program code relative to the current program counter depending on which counter overflowed, and thus, on the event type. In one embodiment, if the instruction counter overflows, the value of n may be zero, indicating that the current program counter value identifies the instruction causing the overflow. In some embodiments, the identified instruction may be attributed with m occurrences of the instruction causing an instruction counter overflow, or with p data cache misses, on a cache miss counter overflow.

As described above, a hardware counter mechanism may be used in some embodiments as the basis for statistical sampling. In other embodiments, execution time may be used as an estimate of the cost to attribute to the memory sub-system as a whole. When execution time is used as an estimate of cost attributable to the memory sub-system, an association may be made between execution time and a sampled runtime event, and this association may be included as a code behavior attribute in the event space, in some embodiments. In addition, this association may enable mapping of execution time costs to any data profiling object (e.g., any hardware device, software construct, or data allocation construct involved in a sampled runtime event), when used in conjunction with the data profiling system and method described herein.

While the descriptions of runtime events included above primarily involve local runtime events, in some embodiments system-level events, such as cache-to-cache transfers and remote NUMA accesses, may be identified and profiled in much the same manner as local runtime events. In some embodiments, these system events may be the most costly runtime events in a modern multi-processor system. Precisely identifying these system events and associating them with computation objects and storage objects may in some embodiments enable observation, and optimization for these objects (e.g., through page migration or through another re-organization and/or re-allocation of the memory sub-system and hierarchy).

In some embodiments, in order to analyze these and other system events, the profiler (e.g., using one or more event agents) may be configured to maintain an identifier between a requesting thread and the request to the system. When the request is satisfied and returned, the source type of the data may be propagated into performance instrumentation for the requesting thread. The event agent may include the conduit between the memory sub-system and the performance instrumentation. In one embodiment, the source types defined may include: remote memory reference, local memory reference, cache-to-cache transfer, and others.

Figure 17:
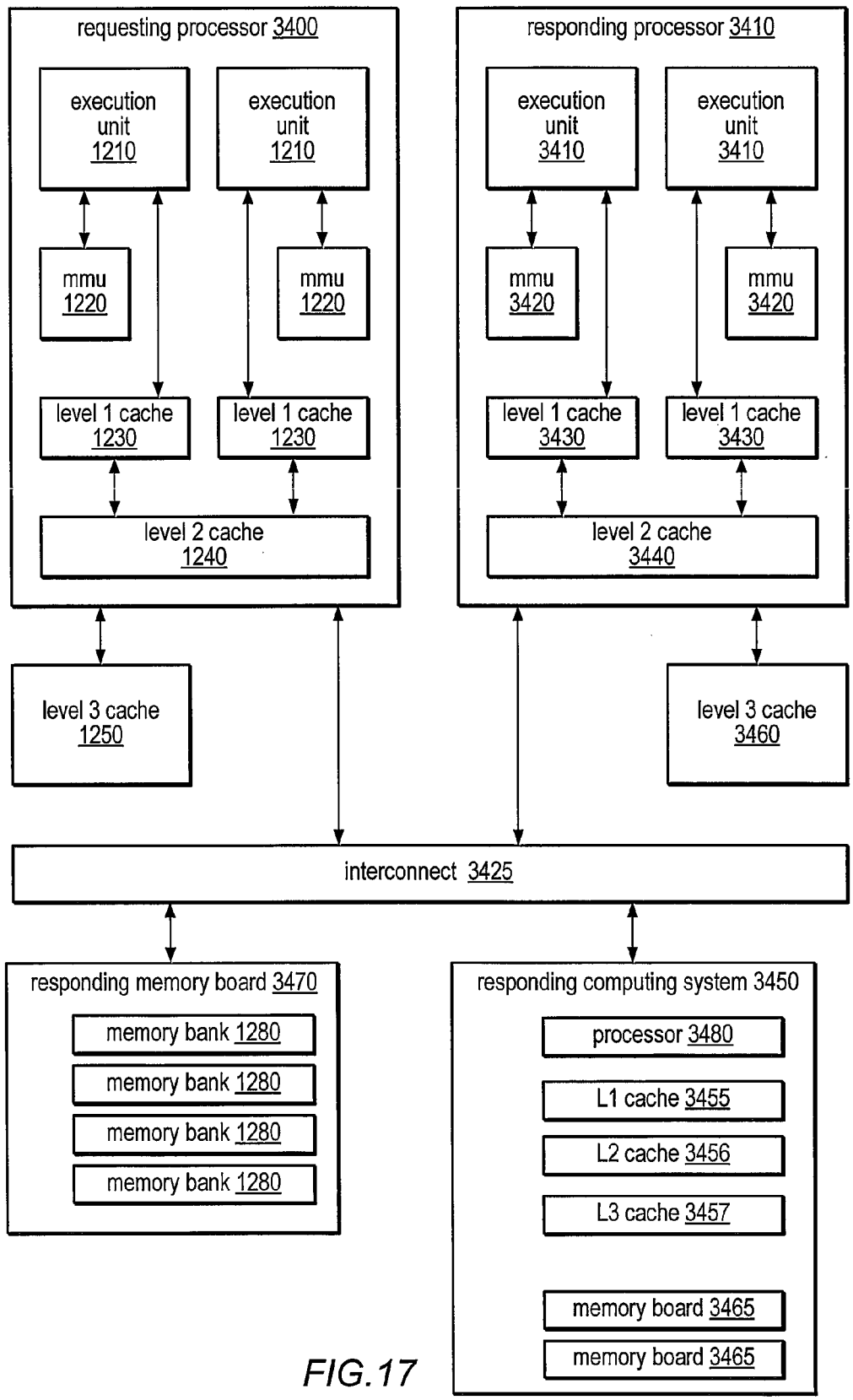
FIG. 17 is a block diagram illustrating various hardware components of an exemplary computer system that may send a message containing data and data source type information to requesting processor, according to one embodiment.

An exemplary computer system in which such system-level events may be identified and profiled is illustrated in FIG. 17. In this example, a requesting processor 3400 may send out a data request on behalf of a process, which may be propagated to one or more other components of the system and/or to one or more components of another computing system. For example, the request may be propagated to one or more local caches (e.g., L1 cache 1230 and L2 cache 1240) and one or more local memory controllers (e.g., MMU 1220), as well as to components of processor 3410 and/or computing system 3450. The data request may be sent out according to any of various communication protocols and on any of various physical and/or virtual networks, such as a broadcast, multicast, request, or response network, in different embodiments. Interconnect 3420 may provide an interface between the system components of a single computing system and/or an interface to other computing systems, such as responding computer system 3450.

The data request may in some instances be satisfied locally by L1 cache 1230 or L2 cache 1240, or by another system component of a computing system including requesting processor 3400, such as L3 cache 1250 or responding memory board 3470 (accessed through MMU 1220 and interconnect 3420). In other instances, the data request may be satisfied by an L1 cache 3430, L2 cache 3440, or MMU 3420 of another processor of the same computing system (e.g., responding processor 3410), or by a processor 3480 or memory sub-system of another computing system (e.g., responding computing system 3450), in this example.

When the data request is satisfied, the responding system component may send a reply to the requesting processor that includes the requested data and an indication of the source type of the responding component. For example, if the data request is satisfied by L1 cache 1230, the reply may include an indication that the source of the data is local, rather than remote. In another example, if responding processor 3410 satisfies the data request with data from L2 cache 3440, the reply may include an indication that the source of the data was an L2 cache (e.g., an indication of an L2 cache hit), and/or an indication that it was a remote access. In yet another example, if processor 3480 of responding computing system 3450 satisfies the data request with data from one of its memory boards 3465, the reply may include an indication that the source of the data is a remote non-uniform memory access (NUMA) access. In some cases, the requesting processor may receive multiple replies in response to the data request, some indicating that a given component cannot satisfy the request (e.g., an indication of a local L1, L2, or L3 cache miss) and one or more others including the requested data and indicating a source type for the supplied data.

The indication of the source type may be added to a reply packet by a hardware or software event agent of a responding component, or by an intermediate component through which the reply passed, in different embodiments. For example, a memory controller (e.g., MMU 1220 or 3420) that is able to satisfy the data request may tag a reply packet by adding or modifying a field in the reply packet with an indication that the source of the reply was a local component (in the case of MMU 1220) or a remote component (in the case of MMU 3420). In some computing systems, a hardware directory cache in a memory controller may be configured to keep track of outstanding requests, cross node events, etc., as part of its normal operation, and to provide this information in a reply packet. In some embodiments, such a directory cache may also be configured to keep track of additional information about the supplier of the data (i.e., the responding component), such as the source type and any other extended address information, as described herein. Therefore, in such embodiments, the source type and any or all of the extended address information for the responding component may be added to the reply packet built by the memory controller when responding to the request. In another example, an intermediate component, such as interconnect 3425, may be configured to build or supplement a reply packet so that it includes the source type information and/or other extended address information for the responding data source. In other embodiments, a responding processor or operating system software executing on a responding processor of the same or a different computing system (e.g., processor 3410 or 3480) may be configured to build or supplement a reply packet so that it includes the source type information and/or other extended address information for the responding data source. When the originating processor (e.g., requesting processor 3400) receives the reply packet, a software agent may be configured to extract the source type information and any other extended address information from the reply packet and to associate them with the request, the reply, and/or an instruction or process on whose behalf the request was made in an event set, according to various embodiments.

If the data request is satisfied by a component other than a local component, the reply may include one or more indications of intermediate components through which the request and/or reply passed on its way between the requesting processor and the satisfying component. For example, as the request is propagated across the system, each component that receives the request and/or relays the request to another component may tag the request with an identifier of the component, such as by adding or modifying a field in a request packet. In another embodiment, the reply message may be tagged by each component as it propagates back to the requesting processor, such as by adding or modifying a field in a reply packet. In some embodiments, rather than identifying each component through which a request or reply passed, the packet may be tagged to include an identifier of the source of the reply, a source type, and a value indicating the number of components through which the request or reply passed (e.g., a node or component hop count). This hop count may be incremented each time the request or reply is relayed to a next component when a receiving component is not able to satisfy the request, for example, or when a reply packet is propagated back to the requesting processor. Tagging a request or reply packet may in some embodiments be done by hardware or software event agents, which may also capture information about the request and/or reply and associate it with each component identifier.

In another example, an event agent associated with an originating thread (e.g., an event agent of requesting processor 3400) may tag a request packet with a thread identifier, which may be maintained as the request is propagated and may be included in the reply packet as well. This thread identifier may also be associated with the request, the reply, or an associated instruction or process (e.g., the instruction or process on whose behalf the request was generated) in an event set, in some embodiments. Maintaining the thread identifier in a request packet and a corresponding reply packet as they are propagated throughout the system may allow profiling data to be associated with a specific thread on whose behalf the request was made and to profile the behavior of the specific thread and any system events associated with the specific thread. In some embodiments, event agents included in operating system software may be configured to tag request and/or reply packets with information identifying the request, the reply, an associated instruction, a thread identifier, a source type, a component identifier, a hop count, or any other extended address information that may be useful in profiling system events.

In some cases, the data request may be satisfied by a component in a different coherency domain than that of the requesting process. For example, some computing systems include two or more coherency domains and operating system software may be configured to allocate memory from each of the domains to various processes. These processes may include memory accesses and other transactions that cross from one coherency domain to another during the course of execution. In such systems, a hardware component, such as a coherency controller, may be configured to manage coherency across the two or more domains. In such systems, additional latency may be introduced when crossing between coherency domains. Therefore, it may be advantageous to limit the amount of domain crossing, such as by avoiding domain crossings when accessing private storage locations, while supporting domain crossings for shared storage locations. Profiling domain crossings may allow a user or an automated optimization method (such as an optimizing compiler or code generator, or a runtime interpreter) to allocate and/or migrate data to a local coherency domain for private storage locations, while allowing domain crossings for storage locations shared with a process in a different coherency domain.

In some embodiments, interconnect 3420 may be configured to support cross-domain messages, such as by providing a coherency controller. In some embodiments, the coherency controller may be configured to track coherency domain crossings and to sample them to capture profile data that may be used to analyze system performance. In this way, private storage locations may be identified and may be allocated in (or migrated to) a local coherency domain, rather than a different coherency domain. For example, in some embodiments, operating system software may be configured to migrate an object (e.g., a variable instance, cache line, or whole page) to a local coherency domain if profiling data indicates that the object corresponds to a private object, rather than a shared object, but that it is associated with domain crossings. Similarly, operating system software may be configured not to migrate an object to a local coherency domain, despite detecting a large number of domain crossings, if it is determined that the object is a shared object.

In one embodiment, a coherency controller may be configured to sample instructions and to determine the number of domain crossings per sample (e.g., 1% of the sampled instructions may be associated with a domain crossing). The sampled instructions may then be analyzed to determine the objects associated with the domain crossings and an estimate of the frequency of the domain crossings for the objects. Analyzing a distribution of the objects and the respective frequency of domain crossings for the objects may result in identifying objects that should be migrated to a different coherency domain in order to reduce latency and/or improve performance. The method described above may be implemented in a combination of hardware and software, in some embodiments. For example, in one embodiment a hardware coherency controller may track the number of domain crossings, and a hardware event agent may support instruction sampling. In this example, a software event agent may capture extended address information corresponding to the sampled instructions (including source type information and/or an indication of whether or not the instruction resulted in a domain crossing) and may associate the extended address information with the instruction in an event set. In this example, profiling software may facilitate or perform analysis of the data in the event set and may recommend or implement changes to the system to improve performance, such as by providing data to operating system software, code optimizing software, a runtime interpreter, or a developer/user to indicate candidate objects for migration to another coherency domain. Such profiling software is described in more detail herein below.

In some embodiments, determining coherency domain crossings and identifying objects to migrate to a different coherency domain may be implemented largely in software, with little or no hardware support. For example, in computing systems that include software coherent memory, if a process references a page that is not in its local coherency domain, the system may be configured to take a trap and send a message to another coherency domain. A directory protocol may be used to bring the required page into the local coherency domain and then return control back to the process that referenced the page. In this example, the granularity of migration may be at the page level, while in other embodiments (i.e., other hardware and/or software embodiments), domain crossings may be observed and/or avoided through migration using a finer granularity (e.g., on a cache line basis).

Figure 18:
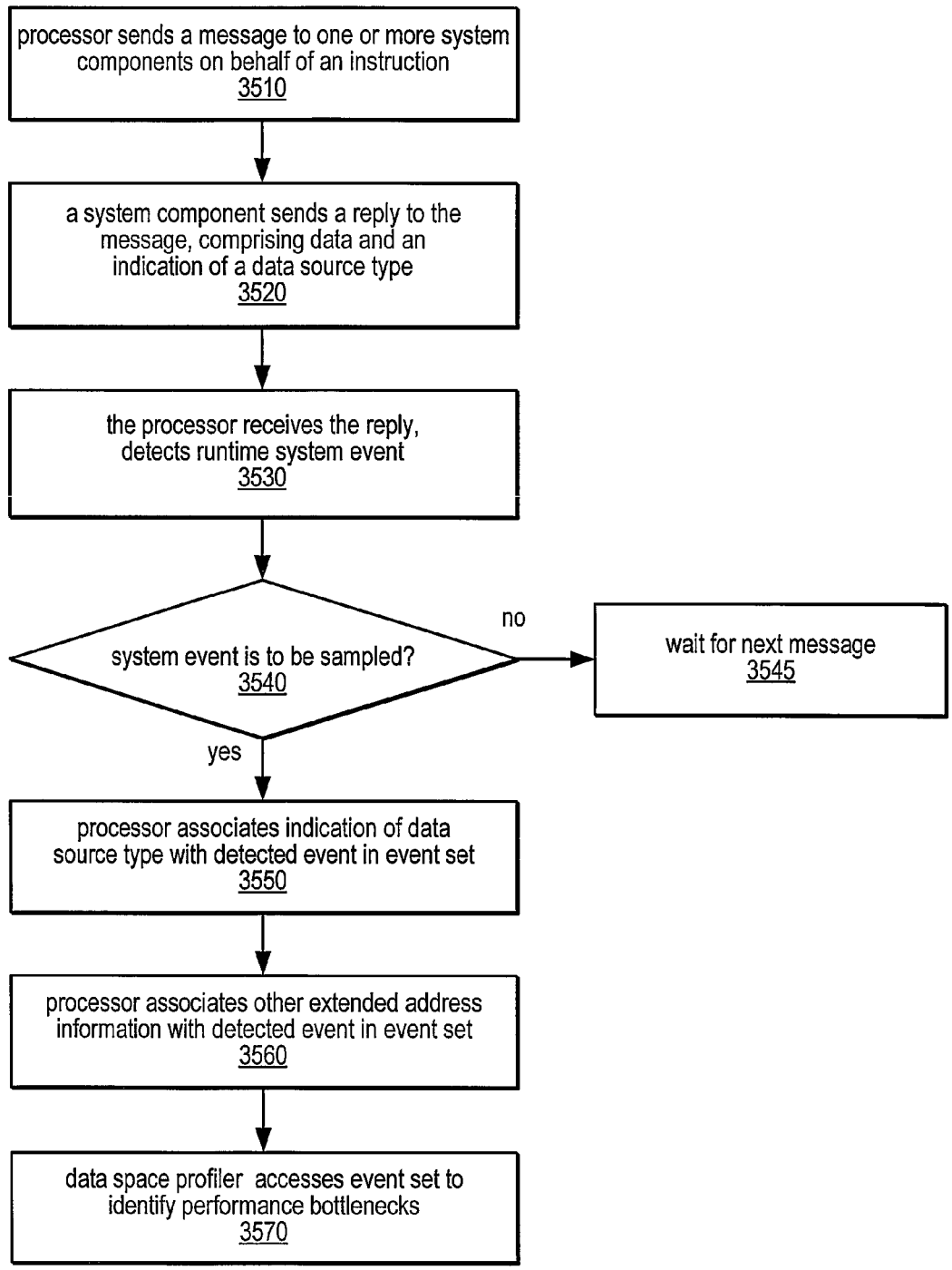
FIG. 18 is a flow chart illustrating a method for profiling system events in a multi-threaded multi-core processor.

One method for profiling system events in a multi-threaded multi-core processor is illustrated in FIG. 18. In this example, a processor sends a message to one or more system components on behalf of an instruction, as in 3510. As discussed above, the message may include a data request, in some embodiments. In other embodiments, the message may comprise any transaction request that may be communicated between the components of a computing system (e.g., between a processor and a memory component or another processor of the computing system) or between two computing systems.

At 3520, a system component may receive the message and send a reply to the message. The reply may be in the form of a reply packet that includes data and other information appropriate for a response to the message (e.g., a packet identifier, a request identifier, a message type, etc.), according to various embodiments. The reply packet may include data that was requested by the message (e.g., in a data request packet), or data provided in response to another type of transaction request. The reply packet may also include an indication of a data source type, as described above. For example, the reply may include an indication that the data included in the reply was supplied by a system component that is remote to the requesting processor, such as a cache of another processor, or a memory board of another computing system. In another example, the reply may include an indication that the data included in the reply comprises the value of a shared storage location, such as one allocated to a shared variable of a multithreaded application.

The requesting processor receives the reply packet, as in 3530, and as a result, may detect a runtime system event. The runtime system event may be generated by the processor in response to receiving the reply packet or in response to information detected in the reply packet, in various embodiments. For example, the detected event may be a cache miss or a coherency domain crossing. An event agent (e.g., a hardware event counter) may be configured to take action upon detecting the event, such as incrementing a performance monitoring counter configured to count events of the type detected. In another example, an event agent may be configured to scan received reply packets and to detect a system event by detecting a particular value or pattern of values for data or other information contained in the reply packets.

In some embodiments, not all detected events trigger the collection of profiling data, as indicated by the decision block 3540. In some embodiments, a detected system event may be sampled in response to a hardware counter overflowing. For example, a hardware counter may be configured to count received messages and to generate a trap request after a predetermined number of transactions or other messages have been received in order to sample the received reply packets. In another example, a hardware counter may be configured to count cache misses, coherency domain crossings, or another type of system event, and one of these events may be sampled after a predetermined number of the events are counted.

If the detected event is not to be sampled, as shown by the negative exit from 3540, there may be no additional action taken and event agents may wait for the next message, as in 3545. If the detected event is to be sampled, as indicated by the positive exit from 3540, an event agent of the processor may be configured to capture the data source type information from the reply packet and to associate the data source type information with the detected and sampled event in an event set, as shown in 3550.

Event agents of the processor may also be configured to capture other extended address information and to associate it with the detected and sampled event in an event set, as in 3560. For example, event agents may be configured to capture an identifier of an instruction on whose behalf the message was sent, an identifier of a requesting thread, an address associated with a data request, a transaction request identifier, an identifier of a responding system component, a cost, a time stamp, or any other extended address information such as that described herein corresponding to the message, the reply, or an instruction, process, or processor on whose behalf the message was sent, according to various embodiments.

As described in more detailed herein below, the source type indication and any other extended address information associated with the detected and sampled event may in some embodiments be used by profiling software to facilitate identification of performance bottlenecks, as in 3570. The analysis performed using the profiling software may also be used to recommend and/or implement changes to the system to improve performance dependent in part on the source type information captured as described above, in some embodiments.

While several of the examples above describe profiling exercises directed toward reducing latency due to coherency domain crossing, the techniques described may be used to identify other types of performance bottlenecks and to recommend and/or implement changes to the system to improve performance, using profiling techniques such as those described herein below. For example, a private variable may be associated with a large number of cache misses, which may be identified using the profiling techniques described herein. In some embodiments, the storage location allocated to the private variable may be modified in order to reduce the number of cache misses in response to the profiling analysis results. In another example, a shared variable may be accessed by one thread (e.g., a thread executing on a remote processor) more often than another thread (e.g., a thread executing on a local processor), according to the profiling analysis. In this example, the storage location allocated to the shared variable may be modified so that it is local to the processor accessing it more often.

As noted above, in some embodiments, enabling observability and providing optimization tools with identification of system objects that may cause the most overhead may allow the user or optimization tools to optimize these system objects. Determination of a local or remote object reference, as described above, may in some embodiments reduce the computation costs necessary to map memory locations based on operating system tables. This may also enable a quick determination of the volume of data movement, in addition to identification for optimization technologies. For example, this method may allow a user to identify stack pages that are remote to the execution unit and, thus, to enable migration with low overhead. In general, capturing data source type information for system events in an event set and analyzing this information using the analysis techniques described in more detail below may provide this observability. For example, in some embodiments, a graphical user interface (such as that described herein below) may allow an analyst to display source type information associated with system events, instructions, and/or costs, and to filter the information to identify performance bottlenecks.

As previously described, there may be many different hardware and/or software events agents employed during data space profiling. For example, some software event agents described earlier may be configured to monitor data movement packets to collect profiling information related to a data movement instruction, such as by capturing and/or computing different portions, or elements, of the extended address associated with the execution of the instruction.

As described above, identifying an effective address associated with an event that modifies a source register (for example: Id [r1], r1) may be difficult using conventional profiling methodologies. In some embodiments, the data space profiler described herein may include means to extract the effective address from instructions associated with performance counters. In some embodiments, the method for extracting the effective address includes preventing the retirement of instructions associated with performance counter events. In some embodiments, this method may enable data space profiling on any application without the requirement for recompilation or backtracking. It may also enable data space profiling on kernel code.

Analyzing the Profile Data

As mentioned above, the result of a data-collection run for one or more software threads being profiled may be referred to as an experiment. In some embodiments, each experiment may be analyzed by an analyzer that includes a GUI program or a command-line equivalent (e.g., one that prints a profiling report based on analysis criteria entered). These two types of implementations may access the same shared object (i.e., event space repository) to process the data, according to different embodiments.

For all experiments, the profiling data collected may be reduced to an annotated representation of the program graph, with performance metrics for each node in the graph, in some embodiments. The nodes may correspond to PCs (i.e., program counter values) and the graph may correspond to the dynamic call graph of the program. The reduced data may be used to show a function list, for example, or to show callers and callees of a function. In some embodiments the data may include information about how the performance metrics are attributed to the callers and callees, and/or to show annotated source or disassembly code of the target.

For hardware-counter based experiments, additional data structures may be built corresponding to the data objects referenced by the target. In these embodiments, the node in the program graph may corresponds to an instruction, and, for memory reference instructions, the symbol tables may be used to determine the name (e.g., the virtual address, physical address, or variable name) of the data object being referenced.

In order to validate a candidate trigger PC, the data reduction process may first verify that there were no branch targets between the next PC (as delivered with the counter overflow signal) and the candidate trigger PC determined at data collection time. If there was an intervening branch target, the analysis code may not be able to determine how the code got to the point of the interrupt, and so may not be sure which instruction caused the event. In some embodiments, if this happens, the data analysis tool may insert an artificial branch-target PC, and may attribute the events to that artificial branch target.

Relational Agents

Figure 19:
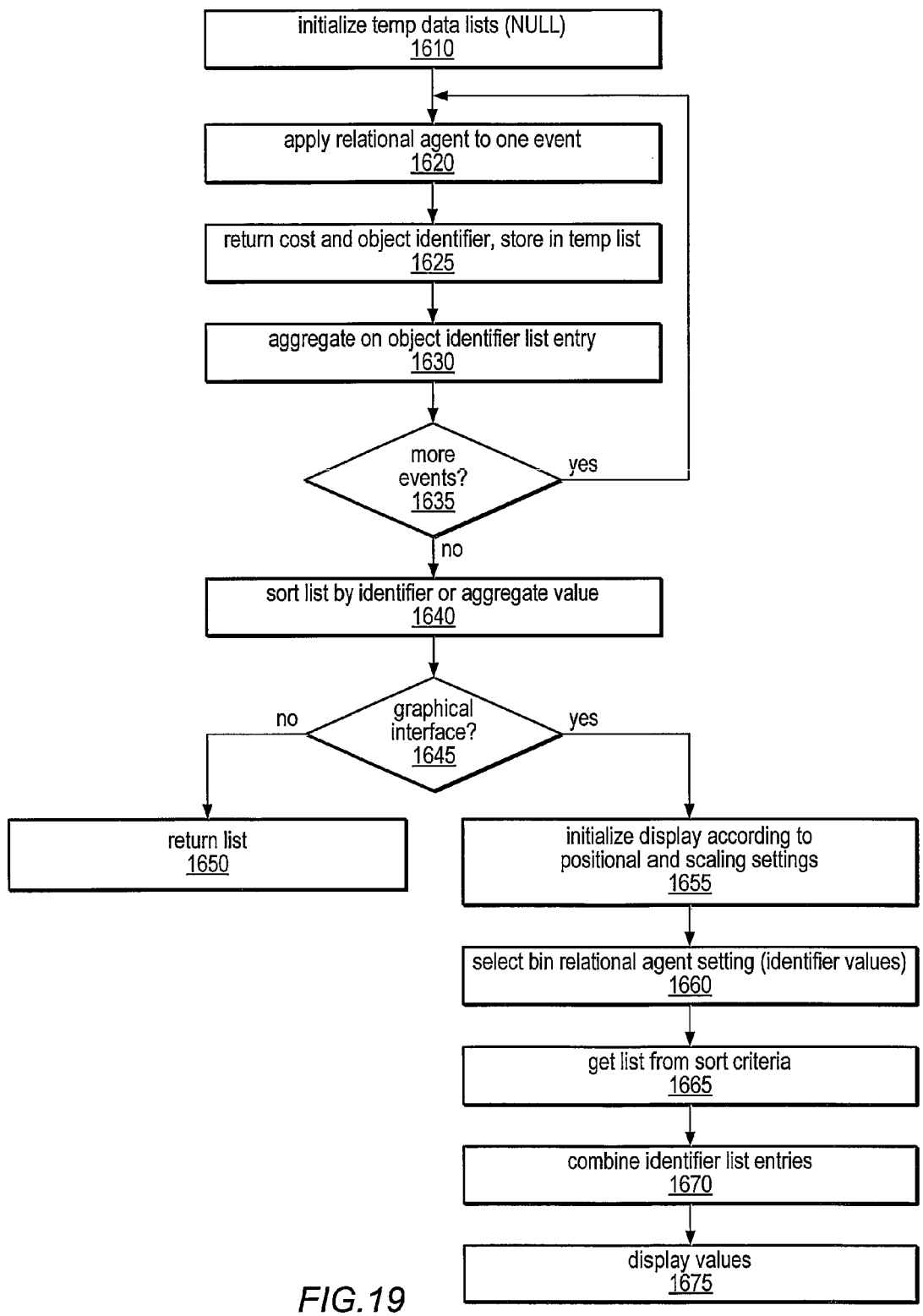
FIG. 19 is a flow chart illustrating a method for analyzing an event space by applying a relational agent to the events in the event space, according to one embodiment.

As previously mentioned, the data space profiler analysis (or OLAP) engine may include relational agents that map addresses (or identifiers) to profiling objects, including physical components and various software constructs. The relational agents map addresses to profiling objects by applying their functions to members of the event set and returning identifiers (addresses) of the events, as specified by their functions. FIG. 19 illustrates one embodiment of a method for analyzing the event space by applying a relational agent to the events in the event space and extracting event data corresponding to a particular profiling object.

In the example illustrated in FIG. 19, the analyzer may begin by initializing temporary event data lists (e.g., by clearing them, allocating memory for them, setting their values to NULL, etc.), as shown in 1610.

The analysis engine may then apply a relational agent to a first event in the event space and compute its value using the corresponding relational agent function, as shown in 1620. In different embodiments, the relational agent may be a standard relational agent included in all profiling exercises, may be a platform-specific relational agent, or may be a user-specified (custom) relational agent, defining a custom profiling object. As discussed earlier, relational agents may be used to define profiling object identifiers, so that cost data associated with the profiling objects may be extracted from the event space.

Some examples of relational agent definitions are listed below:
obj_define Vaddr VADDR
obj_define Paddr PADDR
obj_define Process PID
obj_define Thread (PID*1000)+THRID
obj_define ThreadID THRID
obj_define Seconds (TSTAMP/1000000000)
obj_define Minutes (TSTAMP/60000000000)
obj_define L1DataCacheLine (VADDR&0x1fe0)>>5
obj_define L2CacheLine (PADDR&0x7ffc0)>>6
obj_define L3CacheLine (PADDR&0x7fffc0)>>6
obj_define VA_L2 VADDR>>6
obj_define VA_L1 VADDR>>5
obj_define PA_L1 PADDR>>5
obj_define Vpage_32M VADDR>>25
obj_define Vpage_256M VADDR>>28
obj_define Ppage_32M PADDR>>25
obj_define Ppage_256M PADDR>>28
obj_define Processor CPUID&0x1ff
obj_define Core CPUID&0x3ff
obj_define Processor_Board (CPUID&0x1fc)>>2
obj_define CoreID CPUID>>9
obj_define Valid ((Error>0)? 0:1)

Some of the information needed to compute the value of each of these profiling objects may be captured by event agents during execution (e.g., by monitoring event data packets) or may be requested from the operating system by event agents during execution and data collection. For example, in some embodiments, the values of CPUID, PID, and TSTAMP may be requested of the operating system by event agents during data collection. In other embodiments, these values may be read from a register or memory location by the event agents during data collection. Similarly, the values of VADDR and/or PADDR may be captured by event agents during data collection. The values of some or all of these profiling objects and/or other profiling objects may computed and stored in the event space during analysis, in some embodiments. In other embodiments, some or all of these values may be pre-computed and stored in the event space during data collection or at some point between data collection and analysis.

When a relational agent is applied to the first event in the event space, its cost data and profiling object identifier (e.g., the address associated with the profiling object referenced by the relational agent) may be returned to the analysis engine and stored in a temporary data list, as shown in 1625. For example, if the analyst (user) requests costs related to the profiling object "Processor", the relational agent for the profiling object "Processor" (defined above) may apply the function CPUID&0x1ff to the profile data associated with the event (in this case, the CPUID) and may return the profiling object identifier value for Processor that is equal to the CPU identifier value AND-ed with 0x1ff, along with the cost of the event.

An aggregation, or binning, may in some embodiments be applied to the data extracted by the relational agent, as shown in 1630. For example, event data returned by the relational agent may be grouped with other event data having the same profiling object address, in some embodiments. In other embodiments, event data returned by the relational agent may be grouped by cost, by a range of costs, or by the value or a range of values for another code behavior attribute. In still other embodiments, sorting criteria may be applied to the extracted profile data by the analysis engine before it is presented. For example, sorting criteria may specify that the data be sorted in ascending value order or in descending value order. In another example, sorting criteria may specify an aggregation formula or a number of bins in which to distribute values. Sorting criteria may also specify that sorting should be done based a particular execution cost (e.g., if several cost metrics are to be displayed) or on the values of a particular profiling object identifier for each event. Sorting criteria may be specified using the graphical user interface in various ways in different embodiments. For example, the cost or profiling object on which to sort may be selected by highlighting a column header, selecting a radio button on the display or using other gestures. In another example, the aggregation rules or the number of bins may be selected by choosing an option from a pull-down menu or by entering an expression in a text window. In some embodiments, sorting criteria may be specified in a control file or on a command line, rather than through the GUI.

As illustrated in FIG. 19, the analysis engine may apply the relational agent to each of the events in the event space, by repeating the operations shown in blocks 1620-1630, until the relational agent has been applied to all events in the event space, as indicated at 1635. In some embodiments, if the function for a particular relational agent cannot be computed for a given event (e.g., if the function is undefined for the event or not enough information was captured for the event to allow computation) the relational agent may return a NULL value or a value indicating that the profiling object identifier is unknown. In some embodiments, events returning a NULL or INVALID indication may not be written to the temporary data list for further analysis, while in others, they may be written to the temporary data list along with their NULL or INVALID indicator.

Once the relational agent has been applied to all of the events in the event space, the temporary data list may be sorted according to any presentation options specified for the results, as in 1640. For example, a default presentation option may specify that events should be sorted in descending cost order before being presented, in one embodiment. In other example, a user may specify in a control file or command line option that events should be sorted in an alphabetical or hierarchical order by their profiling object identifiers (e.g., one of their associated extended address elements). In some embodiments the list may be ordered according to the data associated with individual events, while in others the list may be ordered according to aggregated data, e.g., the aggregated data may be presented by bin.

The extracted profile data may be presented graphically in some embodiments, or in other ways in other embodiments, as shown by the decision block 1645. In some embodiments, the user may specify the manner in which to present the data in a configuration or control file or by entering a command line option upon invocation of the profiler or analyzer.

If the data is not to be presented graphically, the sorted list may be returned to the user by being written to a report file or log file, or may be printed directly from the analyzer, in different embodiments. This is shown in block 1650. In some embodiments, the output of the analyzer may be used as an input to an automated optimization process, such as an optimizing compiler or code generator. In other embodiments, a developer may use the results of the profiling exercise to determine changes to the application code, operating system code, system configuration, memory hierarchy, or other system resources in order to optimize the performance of the application being profiled for its target execution platform.

If the results of the analysis are to be presented using a graphical interface, the display may be initialized according to initial positional and scaling settings, as in 1655. For example, default values for positional settings (e.g., settings specifying which profiling objects, menus, function buttons, etc., to display) may be used for the initial display, in some embodiments. Similarly, a default scaling setting (e.g., specifying the zoom level for the data display) may be applied to the initial display of the results. In other embodiments, the user may specify the initial settings in a control or configuration file or by using a command line option. The initial display of the extracted events may include the corresponding cost data and profiling object identifier(s) of the events in text form (e.g., displayed as a text listing with data for each event on a separate line) or in graphical form (e.g., with cost data displayed in a histogram, and with each cost data value displayed as a separate bar). In some embodiments, the data displayed may be aggregated data. For example, one bar of the histogram may represent the sum of the execution costs for all events accessing a given L2 cache line and, thus, having the same L2 cacheline address associated with them. In another embodiment, one bar on a histogram may represent the sum of the costs for the three highest cost event, whether or not they correspond to the same profiling object identifier.

The amount of aggregation may be dependent on the selected zoom level for the display and/or on aggregation rules applied to the profile data, in various embodiments. These aggregation rules may be specified by the user, in some embodiments, in a control or configuration file, on a command line, or using the graphical user input of the analyzer. In other embodiments, the analyzer may be configured to automatically determine a suitable zoom level and/or aggregation formula dependent on the amount of data to be displayed, the type of data to be displayed, the distribution of data displayed, or using some other criteria.

Using the graphical interface, the user may select a particular extracted event on which to perform further analysis, as in 1660. In one embodiment, for example, the user may select the profile data entry from the display that is associated with the highest cost for further analysis. In another embodiment, the user may specify a value or range of values for a particular profiling object for further investigation. For example, the user may wish to investigate all events for which the memory stall time was between 10 and 20 seconds and may select these events by highlighting them in the display. In another example, the user may wish to display all events accessing a particular virtual address, and may select an aggregated data entry corresponding to that particular address from the display.

Once a particular extracted event, or set of events, is selected, the analysis engine may access the previously sorted data list, as in 1665, and may filter the list according to the profiling object identifier value(s) selected, as in 1670. In some embodiments, the analysis engine may combine individual entries into one or more aggregated values by cost or by identifier, depending on the sort criteria and/or on one or more current presentation options (e.g., zoom level).

Finally, the extracted, sorted, filtered, and aggregated data may be displayed, as in 1675. The format, zoom level, and content of the display may again depend on the presentation options selected and any aggregation rules that may be applicable, according to various embodiments.

Some embodiments of the data space profiler do not use a graphical interface for presenting profile results at all, while others may provide the user with an option to present the results using a GUI or not. FIGS. 20-22 illustrate profiling results presented in tabular form, for example. Although any number of formats may be utilized to present the data gathered and analyzed as previously described, this tabular format may be used to aid in illustrating the described inventions without obscuring the described inventions. The tables illustrated in FIGS. 20-22 are exemplary and include example data, according to particular embodiments. In other embodiments, the profile data may be displayed differently. For example, the use of a graphical user interface will be described in detail later. The tables illustrated in FIGS. 20-22 are provided to aid in understanding the inventions and are not meant to be limiting upon the described inventions.

FIG. 20 is a table illustrating example profile data, according to one embodiment. In this example, the profile data may reveal an execution hindrance in terms of consumed execution times and may indicate a relationship between the execution hindrance and one or more addresses. In this example, three columns are illustrated. In other embodiments, more or fewer columns of data may be included. In this example, the first column of data indicates the amount of data stall, in seconds. The second column of data indicates corresponding addresses associated with each data stall event. The third column of data indicates the type of address indicated in column two. The first exemplary row in the table indicates the total number of seconds of data stall for the profiled code. The second exemplary row of the table indicates the amount of data stall attributed to the address "0x02000640", which is indicated as a physical memory address. In the example illustrated in FIG. 20, the third row indicates the number of data stall seconds attributed to the physical address "0x02000720." Another row within the table may indicate a virtual address. In another embodiment, an address column may indicate a tag and an address type column may indicate that the address refers to particular a cache line or cache sub-block, for example.

FIGS. 21A-21B are exemplary tables displaying profile data according to different embodiments. In these examples, execution hindrance is indicated in terms of consumed execution times and in relation to source-level data object language constructs. For example, FIG. 21A is an exemplary table of profile data with respect to various source-level data object language constructs, according to one embodiment.

The table illustrated in FIG. 21A includes five columns of profile data. Each row of profile data corresponds to a source-level data object language construct indicated in the fifth column of profile data, except for the first row of profile data. The first row indicates an aggregation of profile data for all source-level data object language constructs. The second and third rows of profile data respectively correspond to the source-level data object language constructs TREE and TABLE. The source-level data object language construct TREE is attributed with 166.402 seconds of external cache stall, 59.4% of data external cache read misses, 37.3% of data external cache references, and 70% of DTLB misses. The source-level data object language construct TABLE is attributed with 124.601 seconds of external cache stall, 39.5% of data external cache read misses, 41.4% of data external cache references, and 29.7% of data DTLB misses.

FIG. 21B is an exemplary table of profile data with respect to source-level data object language constructs, which represent members of a source-level data object, according to one embodiment. The columns of profile data in FIG. 21B are similar to the columns of profile data in FIG. 21A. In contrast to FIG. 21A, the first row of profile data in FIG. 21B corresponds to all of the sampled runtime events (or execution hindrances) attributed to the source-level data object language construct TREE (an instance of the code behavior attribute of FIG. 21A). The second row of profile data in FIG. 21B corresponds to a particular member of the source-level data object language construct TREE. The particular member is the source-level data object language construct TREE- .LEAFS, of data type integer. The source-level data object language construct TREE.LEAFS has been attributed with 29.1 of the 166.402 external cache stall seconds attributed to TREE, 8.2% of the 59.4% of data external cache read misses attributed to TREE, 3.7% of the 37.3% of data external cache references attributed to TREE, and 0.1% of the 70% of data DTLB misses attributed to TREE. The profile data presented in the table of FIG. 21B indicates that the source-level data object TREE is involved with a large percentage of DTLB misses, but that this large percentage is not related to the source-level data object LEAFS, which is a member of the source-level data object TREE. The use of the information presented in FIGS. 21A and 21B, along with other similar data profiling results, may facilitate more efficient optimization of the code then optimization based on traditional profiling, in some embodiments.

FIGS. 22A-22F are tables illustrating aggregated and filtered profile data, according to different embodiments. These tables include correlated execution hindrances (observed as external cache stalls) and code behavior attributes, according to different embodiments. FIGS. 22A-22C each illustrate profile data aggregated and filtered by different code behavior attributes. FIGS. 22D-22F illustrate profile data aggregated and filtered by an instance of a first code behavior attribute (time range) and further aggregated by a second code behavior attribute. In FIGS. 22A-22C, a table includes three columns of profile data. The first column of profile data indicates external cache stall time in seconds. The second column of profile data indicates a percentage of cycles spent accessing external cache. The third column of profile data indicates a filter parameter (e.g., source-level data object, function/method, time, etc.). For example, FIG. 22A is an exemplary table illustrating profile data aggregating sampled runtime events by function, according to one embodiment.

The table in FIG. 22A identifies profile data for the specified functions STACK_CONTROL and GARBAGE_COLLECT. Each of the rows in the table corresponds to a specified function, except the first row of the table, which indicates profile data from the perspective of all functions of the application being profiled. The second row indicates profile data across the columns from the perspective of the function STACK_CONTROL. The third row of the table indicates profile data across the columns from the perspective of the function GARBAGE_COLLECT. The profile data of the table in FIG. 22A reveals that the function STACK_CONTROL is responsible for the largest amount of stall time of all functions. In this example, the function STACK_CONTROL has caused 39.262 seconds of external cache (E$) stall seconds, or 5.00% of the total 785.235 seconds of E$ stall. The table of FIG. 22A also indicates that the function GARBAGE_COLLECT has caused 38.477 seconds of E$ stall, or 4.9% of the total E$ stall.

FIG. 22B is an exemplary table illustrating profile data aggregated by source-level data object language constructs, according to one embodiment. The table in FIG. 22B is similar to the table in FIG. 22A, except that the third column of profile data indicates source-level data object language constructs. The first row of profile data indicates profile data for all source-level data object language constructs in the application being profiled. The second row of profile data indicates profile data for the source-level data object language construct TOS. The third row of profile data indicates profile data for the source-level data object language construct NUM_ENTRIES. The profile data in table 20B reveals that the majority of stall caused by source-level data object language constructs corresponds to the source-level data object TOS. The source-level data object language construct TOS is attributed with 117.785 seconds of E$ stall, or 15% of the total E$ stall. The source-level data object language construct NUM_ENTRIES accounts for 94.239 seconds of E$ stall, or 12% of total E$ stall.

FIG. 22C is an exemplary table illustrating profile data aggregated by time range, according to one embodiment. The table of FIG. 22C indicates profile data filtered by time range. In this example, 2% of E$ stall cycles persisted for 0-10 seconds, 3% of E$ stall cycles persisted for 10-20 seconds, and 25% of E$ stall cycles persisted for 20-30 seconds. In terms of E$ stall seconds, 15.704 stall seconds are attributable to stalls that persisted within 0-10 seconds, 23.557 stall seconds are attributable to stalls that persisted within 10-20 seconds, and 196.309 stall seconds are attributable to stalls that persisted within 20-30 seconds.

FIG. 22D depicts profile data aggregated and filtered by both time range and function, according to one embodiment. In FIG. 22D, the profile data has been filtered to include only stalls that persisted for 20-30 seconds, and then aggregated by function. In this case, the functions GARBAGE_COLLECT and STACK_CONTROL each contributed stalls of between 20-30 seconds. In this example, the function GARBAGE_COLLECT was attributed with 4% of all E$ stalls or 16% of the stalls that persisted for 20-30 seconds. The function STACK_CONTROL was responsible for 0.75% of all E$ stalls or 3% of the 20-30 second stalls.

FIG. 22E depicts profile data filtered by time for the function GARBAGE_COLLECT, according to one embodiment. In this example, a data structure H accessed in the function GARBAGE_COLLECT is responsible for 3.8% of E$ stalls, or 95% of the stalls attributable to the function GARBAGE_COLLECT. The data may be further filtered for finer granularity to determine which aspect of the structure H corresponds to the stalling in GARBAGE_COLLECT, in some embodiments.

FIG. 22F depicts profile data filtered by time for the structure H accessed in the function GARBAGE_COLLECT, according to one embodiment. In this example, the table includes statistics for members HEAD, TAIL, and VOLUME for the structure H. The members HEAD, TAIL, and VOLUME respectively correspond to 50%, 0%, and 50% of the stall related to the structure H. In terms of the total E$ stall, the members HEAD, TAIL, and VOLUME relatively correspond to 3.8% (29.839 seconds), 0% (0 seconds), and 1.9% (14.9195 seconds) of the stall. The table of FIG. 22F also indicates offsets associated with each of the elements of the structure H. Using the profile data filtered by the selected parameters and the offsets, a developer may determine that H.HEAD and H.VOLUME should be put together, for example.

In order to facilitate identification of performance bottlenecks and the causes thereof, data space profiler described herein may include means to specify custom filter expressions and to apply them to the event space in order to further filter the profiling objects of interest. This functionality may provide a name space for user-specified mapping of costs to any hardware device and/or any software construct, in some embodiments. The analyzer may in some embodiments implement this functionality using four components: a parser, an expression generator, a token evaluator, and an expression evaluator. The parser may accept code specifying a filter expression entered by a user, such as in a file or through a graphical or command line user interface, according to different embodiments. The language constructs that may be used in custom filter expressions may be defined in a filter language specification, in some embodiments. In one embodiment, the filter language may be defined according a Backus-Naur form (BNF) grammar and the parser may be generated using yacc. The parser may first validate the expression, and if the expression is valid, the expression generator may generate a corresponding mathematical representation of expression for use in evaluating the expression as applied to the events in the event space. The parser or the expression generator may also be configured to associate a name with the filter expression, in some embodiments. The mathematical expression may contain scalar and/or vector operators for operating on tokens (e.g., cost data and/or extended address elements or other code behavior attributes associated with the events in the event space), according to various embodiments. Tokens may in some embodiments be generated using Lex.

In some embodiments, the expression name corresponding to the custom filter expression may be added to the token space and may be used to build complex expressions for filtering. For example, one custom filter expression named "slow_memory" may be used to select events for which the memory stall time is greater than 20 seconds:
(MaxMemStall >20)

Using this expression name, another filter expression may be built to further filter the slow_memory events in order to select only those that also meet the criteria "L2CacheLine=2805" using this expression:
(slow_memory & (L2CacheLine IN (2805))

Filter expressions may be specified in terms of various combinations of vector and scalar operations, including set operations. For example, in the filter expression above, the set operator "IN" indicates that the filter should be used to select only events "in" the set (i.e., the subset of the event space) in which the L2CacheLine value (address) associated with the events is equal to 2805.

The token evaluator may return the values associated with the token name from the events selected by the filter expression, in some embodiments. Returning the values associated with the events selected by the filter criteria may involve providing the profiling object identifier (address) and cost data associated with the selected events. Each filter expression may be evaluated recursively by the expression evaluator, in some embodiments. This may involve evaluating operators and tokens to determine inclusion by the filter, in some embodiments. The use of custom filtering expressions is described later in conjunction with the detailed data space profiling example.

In some embodiments, the analysis (OLAP) engine may be configured to manage all bookkeeping of event data and relational information, and to report causal relationships between bottlenecks in physical objects and/or memory allocation and source-level objects. For example, the OLAP engine may be configured to receive event data from multiple repositories (e.g., per-thread or per-address-space repositories), directly from various hardware and software event agents, from operating system calls, etc. The OLAP engine may be configured to build the event space from these inputs and to keep it up to date during execution, data collection, and/or analysis. For example, in some embodiments, analysis may not begin until execution of the application to be profiled is complete, but in other embodiments, execution may continue during analysis, with or without additional data collection being performed. In some such embodiments, the OLAP engine may be configured to update or refresh the event space periodically or when explicitly requested to do so by the user.

In some embodiments, the event space may be implemented as a series of tables or as a collection of linked lists. In other embodiments, the event space may be implemented in a database, such as an Oracle™ relational database. The OLAP engine may in some embodiments be configured to manage these tables, lists, or databases in order to maintain the relational information contained therein and to extract cost and other profile data therefrom, according to various relational agents and filters applied to the profile data in the event space. The OLAP engine may also be configured to maintain a list of relational agents, in some embodiments, while in others, lists of relational agents may be distributed between multiple hardware components or software modules of the data space profiler. In some embodiments, such as in various Java™ implementations, relational agents may be dynamically generated and applied, while in other embodiments (such as in various C implementations) relational agents may be static functions compiled once and then used later to build the event space.

Figure 23:
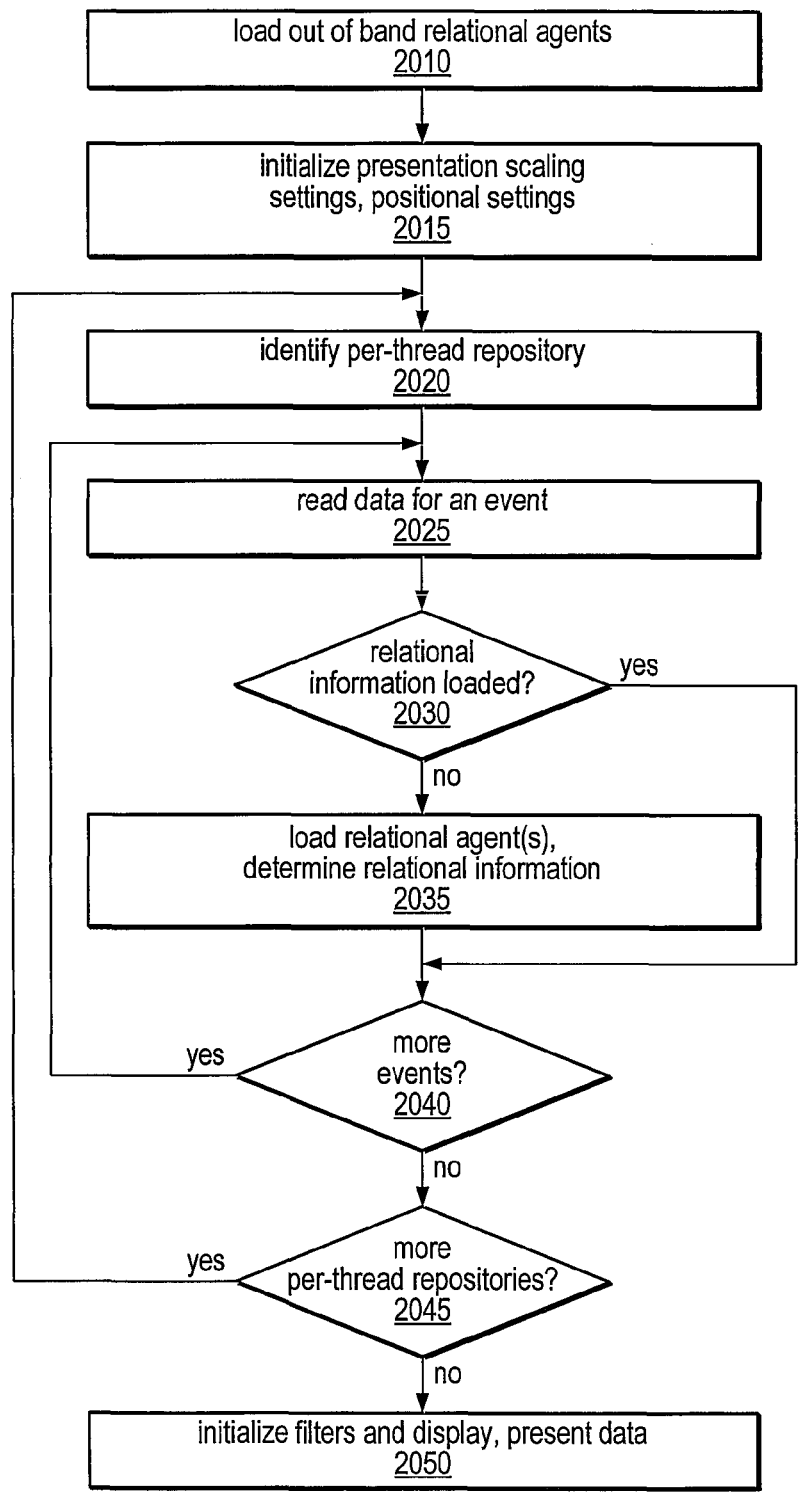
FIG. 23 is a flow chart illustrating a method for preparing for data space profiling analysis, including building an event space, according to one embodiment.

FIG. 23 illustrates an exemplary method for preparing for analysis, which includes building the event space, according to one embodiment. In this example, the analysis engine may first load any "out of band" relational agents, i.e., any platform-specific or user-specified relational agents that are not built into the standard profiler. This is illustrated at 2010. If a graphical user interface is included in the analysis engine, the presentation options for scaling and positioning of the initial display may be initialized, as in 2015. As described earlier, these options may in some embodiments be specified in a control file, by the user as a command line option, or as defaults settings of the analyzer.

The analysis engine may begin building the event space by identifying an event data repository from which to import event data, as in 2020. As previously noted, event data repositories may be allocated and populated on a per-thread or per-address-space basis, in some embodiments.

The analysis engine may read data associated with a first event in the first identified repository, as in 2025. If all of the relational information for the event is included (e.g., the extended address is completely specified and the cost is included), the analysis engine may proceed from 2030 to 2040. If not all of the relational information is included in the data set for the event, one or more relational agents may be accessed (i.e., loaded) and applied to the data that is included with the event record. In some embodiments, applying one or more relational agents to the data retrieved from the first repository may result in the remaining relational information being computed and the data associated with the event to be completely filled in. In some embodiments, not all elements of the extended address may be relevant or applicable to a given event. In such embodiments, the analysis engine may be configured to enter a NULL or INVALID value into the corresponding address field for the event. In some embodiments, after applying one or more relational agents to the data retrieved from the repository, some information may still be missing. In some embodiments, the analysis engine may be configured to access other event data records in order to determine the remaining values to be associated with the extended address of the event in question. The analysis engine may be configured to recursively compute values for the fields associated with the additional events and then to apply the results of those relationships in determining values for the remaining address fields of the event in question.

In one example, a runtime event may represent a cache miss associated with a known (i.e., captured) PC value, VA, and PA. The PC value may translate to a function foo. If the extended address element values for function foo have already been loaded into the event space, they may be filled in for the cache miss event of interest. If they have not yet been loaded, the analysis engine may be configured to locate these values elsewhere (e.g., in an event data repository) and to load the appropriate values into the event space for the cache miss event. In some embodiments, the analysis engine may access an event data table entry for foo to extract some of the extended address element values, such as a data type associated with the function. Recursively loading event data from a series of event data tables may be implemented as a join function for different forks of a file system.

At decision block 2040, if there are more events to be imported, the analysis engine may be configured to repeat the operations illustrated in blocks 2025-2035 until all events in the first repository have been imported and the relational information for each has been loaded into the event space. At decision block 2045, if it is determined that there are more repositories from which to import data, the analysis engine may be configured to repeat the operations illustrated in blocks 2020-2040, until all the data from the relevant repositories has been imported and the relational information for each has been loaded into the event space.

While in this example, the event space is built from multiple event data repositories sequentially, in other embodiments the event space may be built from multiple event data repositories in parallel. For example, the build process may spawn different threads, each of which may build a portion of the event space from a separate per-address-space event data repository.

Once the event space has been populated, the analyzer may be configured to initialize any filters and displays, and to present initial results of the profiling exercise, such as by displaying the costs associated with each function of the application being profiled. This is illustrated in block 2050. In some embodiments, the initial results displayed may always include the costs in view of each function, which may be a default result. In other embodiments, the user may specify the initial results to display using a control file, command line option, or other means. Similarly, as previously noted, initial presentation settings may be based on default values, user-specified values, or on the data to be displayed, in various embodiments. For example, the analyzer may be configured to initially display cost in view of the application's functions, and aggregated (binned) according to a zoom level that allows all of the data to be presented at once using a default number of bins.

Graphical User Interface

Figure 24:
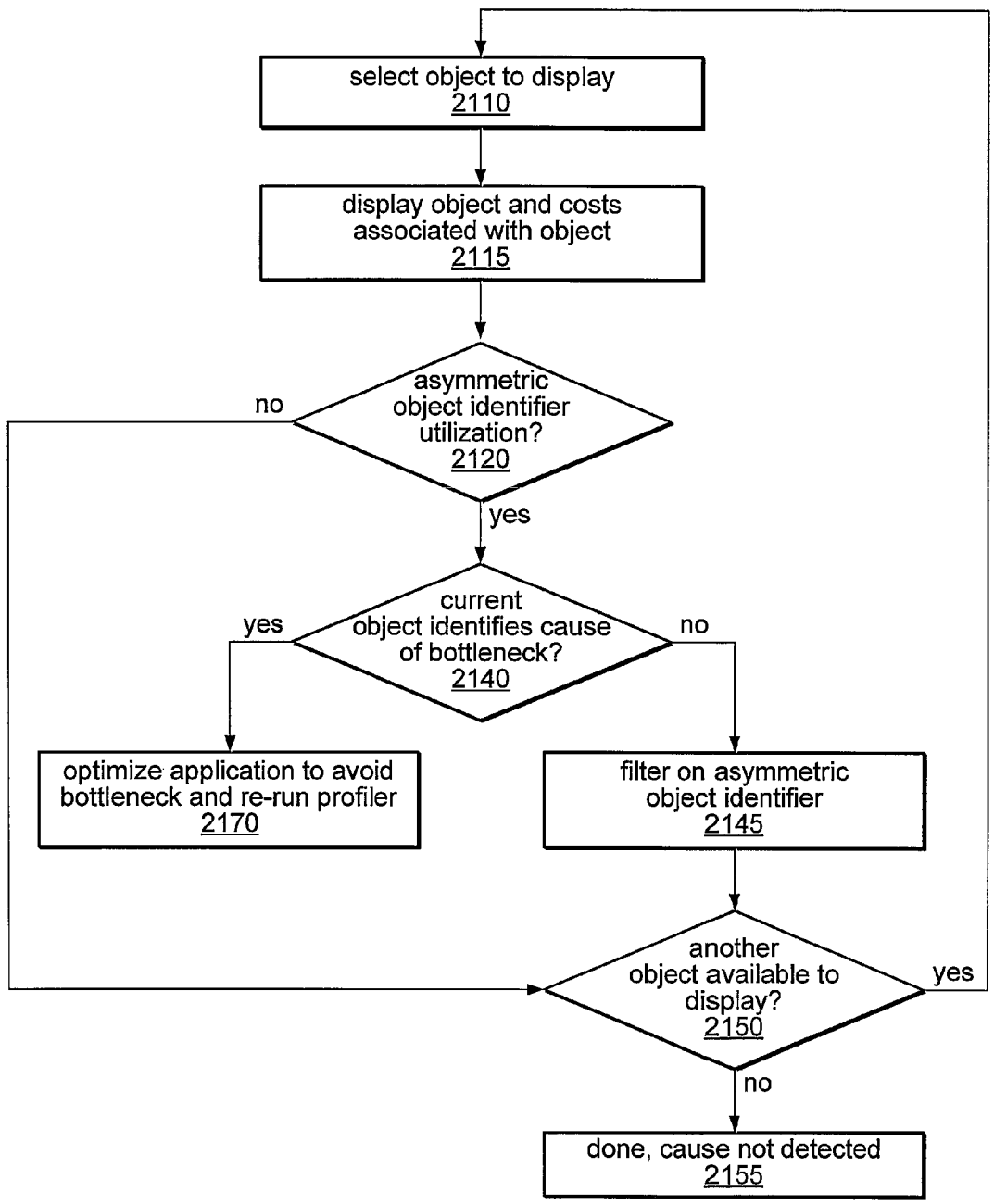
FIG. 24 is a flow chart illustrating an exemplary method of identifying an asymmetric resource utilization and its cause, according to one embodiment.

The data space profiling analyzer may in some embodiments include a graphical user interface, which may facilitate identification of asymmetric resource utilization and identification of the cause thereof. The flow chart of FIG. 24 illustrates an exemplary method of identifying an asymmetric resource utilization and its cause, according to one embodiment.

In this example, the user (analyst) may select a profiling object to display, as in 2110. For example, the user may choose to display cost as related to the functions of an application. The user may select the object to display by selecting one of several tabs above a main data display window, in some embodiments. In such embodiments, each tab may correspond to a profiling object that may be viewed. In some embodiments, not all profiling objects may have associated tabs. For example, the user may be able to select which profiling objects to display and the analyzer may provide tabs only for those selected profiling objects.

After the user selects a profiling object to display, the analysis engine may be configured to apply the corresponding relational agent to extract cost data and corresponding profiling object identifiers from the event space, as described earlier, and to display the extracted data. This is illustrated in block 2115. As described earlier, the data may be displayed in various formats, including text formats (e.g., one or more lists or tables) and graphical formats (e.g., bar graphs or histograms) and may be ordered and/or aggregated according to current presentation options and/or aggregation guidelines.

At block 2120, the user may observe an asymmetric utilization of the profiling object being displayed. For example, if the cost of each function (represented by memory stall time) is being displayed, the user may detect that one of the functions is responsible for an inordinately large percentage of the total memory stall time of the application by observing the data in a histogram. If such an asymmetric utilization is detected, the user may investigate further in order to determine the cause. At 2140, for example, the user may determine if the currently displayed profiling object is the cause of the observed performance bottleneck. For example, the memory stall time of each instance of the function associated with the largest cost may not be inordinately long compared to the memory stall time of other functions, but the number of instantiations of the function may be very large. Thus, the performance bottleneck may not be due to a data motion issue, but may be an artifact of repeatedly calling an otherwise efficient software function.

If it is determined that the currently displayed profiling object is not the cause of the observed performance bottleneck, the user may filter on the object identifier associated with the observed bottleneck (e.g., the function name), as in block 2145. The user may then determine if another profiling object view is available that might facilitate identification of the cause of the performance bottleneck, as in block 2150. If another profiling object view is available, the user may repeat the operations illustrated in blocks 2110-2045 until the cause is identified, as indicated by the positive exit from decision block 2140, or until there are no additional profiling objects to display, as in 2155.

If, at any time, the cause of the observed performance bottleneck is identified, the user may optimize the application, platform configuration, memory hierarchy, or other hardware and/or software components to correct or avoid the bottleneck, as in 2170. In some embodiments, the user may attempt to correct the bottleneck and may re-run the profiling exercise, collecting a new profiling data set and analyzing the results, in order to verify that a correction was successfully implemented.

Data Profiling Example Using Graphical User Interface

As described above, a graphical user interface (GUI) for data space profiling may in some embodiments provide insights into understanding complex performance issues and problems. This GUI may be a component of the data space profiling analyzer, or may be a separate application for displaying data returned from the data analysis engine, in different embodiments. The GUI may support arbitrarily large profile data sets, without losing resolution of a sparse bottleneck. For example, when displaying a virtual address map address of a process, it may be possible to easily identify a hot virtual address causing a scaling bottleneck by using various sorting, aggregation, and presentation options available through the GUI, whereas it may be difficult to identify a hot virtual address by looking at many hundreds or thousands of individual data values in a histogram or printed list of individual cost values. In some embodiments, artificial intelligence may be used to facilitate data presentation and/or identification of asymmetric object utilizations. In one example, the analysis engine may be configured to pre-compute one or more cost metrics and to determine exceptional values (outliers) in the set.

The GUI may, in some embodiments, include three main components for effectively presenting profile data: a display component which can pan values, a "zoom-in" and "zoom-out" apparatus which modifies the density of the display, and a sorting apparatus which selects from a histogram view or an object order display view, and sorts the data appropriately for display in that format. In some embodiments, the display component may group the data in aggregate form, providing buckets or bins from which to form the displayed values. The display component may include scroll bars to pan across the objects being displayed, i.e., to select different data profiling objects to display. The "zoom-in" and "zoom-out" apparatus may change the aggregation function for the displayed objects, in some embodiments. A default formula or user-specified formula may be used to determine how the data is aggregated according to the zoom level. The sorting apparatus may change the group order for the aggregation objects, in some embodiments. For example, in some embodiments when grouping data in cost order the GUI may provide a histogram, while when grouping data in object order it may provide an ordered list of data (in a tabular, text-based format) in which each line includes an object description (e.g., specifying the cache line). The GUI described herein may allow zooming and panning in a graphical environment across multiple profiling object views of profile data for a profiled application, and may present the data according to specified presentation and profiling object selections independent of metrics and costs. For example, in some embodiments the GUI may be configured to present cost data on a vertical axis no matter what profiling objects and/or metrics are selected for display. Graphical navigation of the multi-dimensional event space, as described herein, may in some embodiments facilitate a "Look, filter, and look again" approach to data space profiling.

The data space profiler and graphical user interface described herein may in some embodiments facilitate identifying an asymmetric, exceptional, or otherwise unsatisfactory resource utilization or resource bottleneck that may hinder performance. The data space profiler and GUI may also facilitate identifying a cause of an observed performance bottleneck. FIGS. 25A-25P illustrate the use of a data space profiler, and graphical user interface thereof, to identify a performance bottleneck and its cause, according to one embodiment.

In this example, the "analyze" command may be invoked, bringing up a graphical interface for analyzing the profile data collected during execution of a software application. In this example, the default configuration for the first displayed window may be a function-based view of the profile data, as in FIG. 25A. FIGS. 25A-25P illustrate simulated screen shots of various windows displayed during use of the data space profiler, according to one embodiment. In this example, FIG. 25A illustrates a main data display window 2210 in which profile data is displayed, and a series of tabs 2220. Each tab 2220 corresponds to a data profiling object for which costs may be displayed. In this example, costs may be displayed by function, data structure (e.g., by data array or data array element), by 8K virtual page, by 8K physical page, by L1 cache line, by L2 cache line, by core, etc. In other examples and other embodiments, more, fewer, or different data profiling objects may be selected, as described herein. In some embodiments, not all profiling object tabs may be visible at the same time. In such embodiments, the user may be able to pan or scroll the tab display across the top of the main display window in order to view more or different profiling object tabs from which to make a selection for display.

In the example illustrated in FIG. 25A, the "functions" tab has been selected. Therefore, the data display window 2210 displays cost data by function. In this example, the cost data is presented in terms of CPU execution time and memory stall time. In some embodiments, the default or initial display presented by the analyzer may include displaying cost data in terms of CPU time and/or memory stall time, while in other embodiments, a different display may be the default display or a user may specify initial display options when invoking the analyzer, such as through a configuration file or one or more command line options. Similarly, in some embodiments displaying cost in terms of an application's functions may be a default condition of the analyzer, while in others the default display may include a different data profiling object view or the user may specify the initial data profiling object view to display.

In the example shown in FIG. 25A, data display window 2210 displays profile data in 3 columns with each column having a heading at the top of the column. In this example, the data in the first column represents CPU time for each function of the application (in seconds). The data in the second column represents the memory stall time (in seconds) incurred during execution of each function. The third column displays the name of each function, task, or other programming structure of the application being profiled. Therefore, in this example, each line of profile data displayed in the data display window corresponds to the costs, in terms of CPU time and memory stall time, of one function, task, or other programming structure of the application being profiled.

In the example illustrated by FIG. 25A, the total memory stall time for the application being profiled is 24,834.612 seconds. Portions of this stall time are attributable to many different functions, as shown in data display window 2210. For example, the function function4 accounts for 6,785.924 seconds of the total stall time, and the function function2 accounts for 4,396.145 seconds of stall time. The data displayed in FIG. 25A may or may not help a user identify any bottlenecks causing memory stall in this application.

To continue looking for bottlenecks, a user may choose to display a different view of the cost data for the application. In this example, the user may suspect that cache misses may be contributing to the stall time, and may choose to view costs by L2 cache line. To view the cost data by cache line, the user may select the L2CacheLine tab (e.g., by moving a cursor, using a mouse, etc.).

Figure 25B:
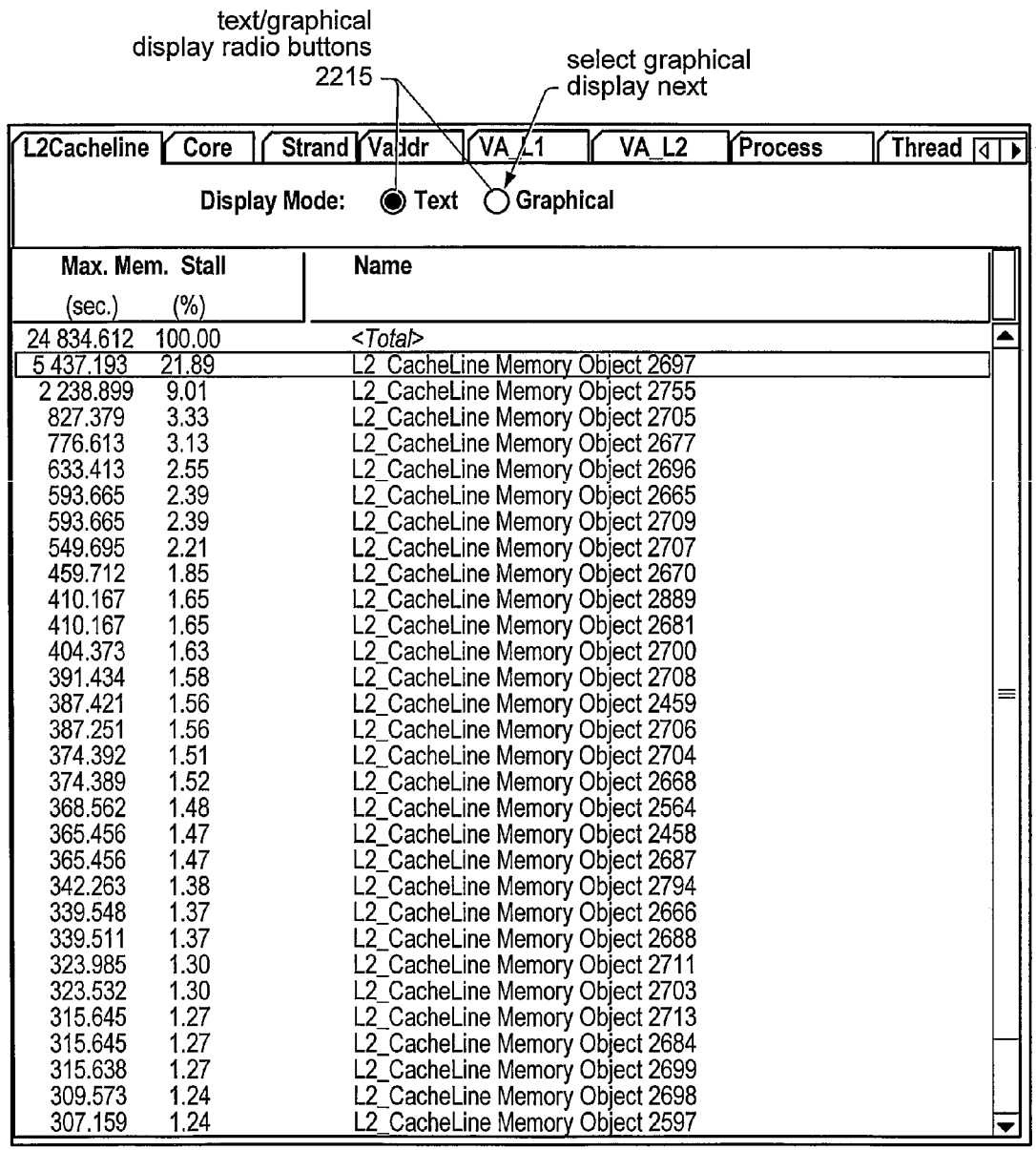
FIGS. 25A-25P illustrate simulated screen shots of a graphical user interface of a data profiler, according to one embodiment.

FIG. 25B illustrates a display of cost data in terms of memory stall time for each line of the L2 cache, such as may be displayed following the selections described above, in some embodiments. In this example, the memory stall time is presented for each line of the L2 cache in seconds and as a percentage of the total stall time for the application. As shown in FIG. 25B, 21.89% of the memory stall time is attributable to a single cache line, in this case, L2_CacheLine Memory Object 2697. This data may in some embodiments indicate a bottleneck hindering execution.

Note that in FIG. 25B, the current display mode is a text mode, as indicated by radio buttons 2215. In some embodiments, the user may choose to display profile data in either a text mode or a graphical mode. In some embodiments, the profile data may be ordered differently, depending on the presentation mode. For example, profile data may be displayed in order of cost (e.g., ascending or descending cost) in a graphical mode, but may be displayed in order of object (e.g., ascending or descending order of object name) in a text mode. In other embodiments, profile data may always be displayed in cost order or always in object order. In still other embodiments, a user may specify the display order in a configuration file or may change the display order during analysis, such as by selecting a column header in the data display window and/or an indicator of ascending or descending order.

In FIG. 25B, for example, data is presented in a text format and in a descending cost order.

Figure 25C:
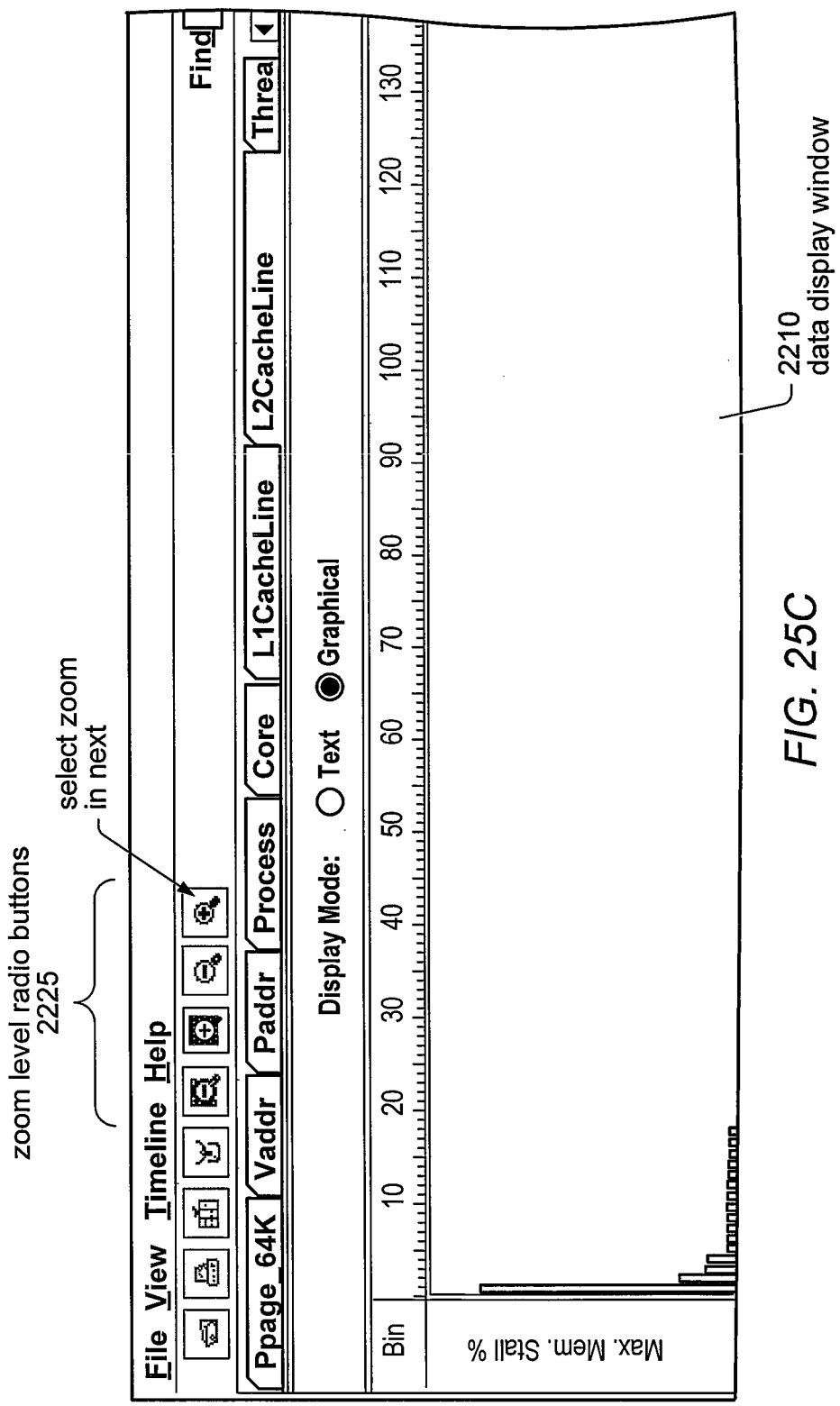

In this example, the user may choose to display the profile data in a graphical mode next. In some embodiments, such as the one illustrated in FIG. 25B, the user may switch between a text mode and a graphical mode by selecting a radio button 2215 of the display. FIG. 25C, for example, illustrates memory stall time (as a percentage of the total memory stall time for the application), by L2 cache line, in a graphical format. In this example, data for all cache lines is not displayed individually, but is aggregated according to the scaling option (i.e., the zoom level) selected. In some embodiments, there may be a default zoom level for the analyzer, while in other embodiments, an initial zoom level for a graphical display may be determined by the analyzer at run time (e.g., based on the amount and range of data to be displayed), may be specified in a configuration file, or may be selected by a user at run time (e.g., using a command line option.) In some embodiments, the user may change the zoom level in order to get a closer look at the data or to better observe trends, patterns, or the "big picture" illustrated by the profile data.

In some embodiments, such as the one illustrated in FIG. 25C, the user may change the zoom level by selecting zoom-in, zoom-out, minimum zoom level, or maximum zoom level radio buttons 2225. In other embodiments, the zoom level may be selected by other means, such as using other graphical input means or by entering a command on a command line interface. Zooming in and zooming out of a profile data display window may in some embodiments change the way data is aggregated and/or presented, in some embodiments. For example, with arbitrarily large data sets, a graphical display may easily lose resolution of a sparse bottleneck, e.g. when displaying a large number of cost values, where only a small number of them cause an execution bottleneck. In some embodiments, the analyzer may be configured to modify the density of the display according to the current zoom level and to change the aggregation function for the displayed objects. For example, if the maximum zoom level is selected, the analyzer may, in some embodiments, display profile data values individually in data display window 2210 (a portion of which is illustrated in FIG. 25C), although not all of the data may be visible at one time. In this example, the user may be able to observe all of the data values by panning across data display window 2210 using a scroll button, a mouse, etc. In another example, if the minimum zoom level is selected, the analysis engine may be configured to aggregate and display the data so that all of the data may be displayed in data display window 2210 at the same time, with a standard number of bins (e.g., the values corresponding to 40 bins may be displayed, evenly distributed across data display window 2210, and the data may be aggregated into those 40 bins in descending cost order or in another order specified by the user.) In some embodiments, all bin values may be displayed, while in others only non-empty bins are displayed.

If the selected zoom level is other than the minimum or maximum zoom level, the analysis engine may be configured to combine two or more profile data values into each of one or more groupings, or bins, and display a single profile data value for each grouping. In such embodiments, the number of groupings may be dependent on the selected zoom level and the number of data values to be displayed. The single profile data value displayed for each grouping may be determined according to different formulas, in different embodiments. For example, the aggregated value may represent a sum of the two or more profile data values, an average of the two or more profile data values, a logarithmic aggregation, a standard deviation for the profile data values, a median of the two or more profile data values, etc. In some embodiments, a default aggregation formula may be used, while in others a user-specified formula (e.g., one specified in a configuration file or input through a graphical or command-line interface) may be used.

Figure 25D:
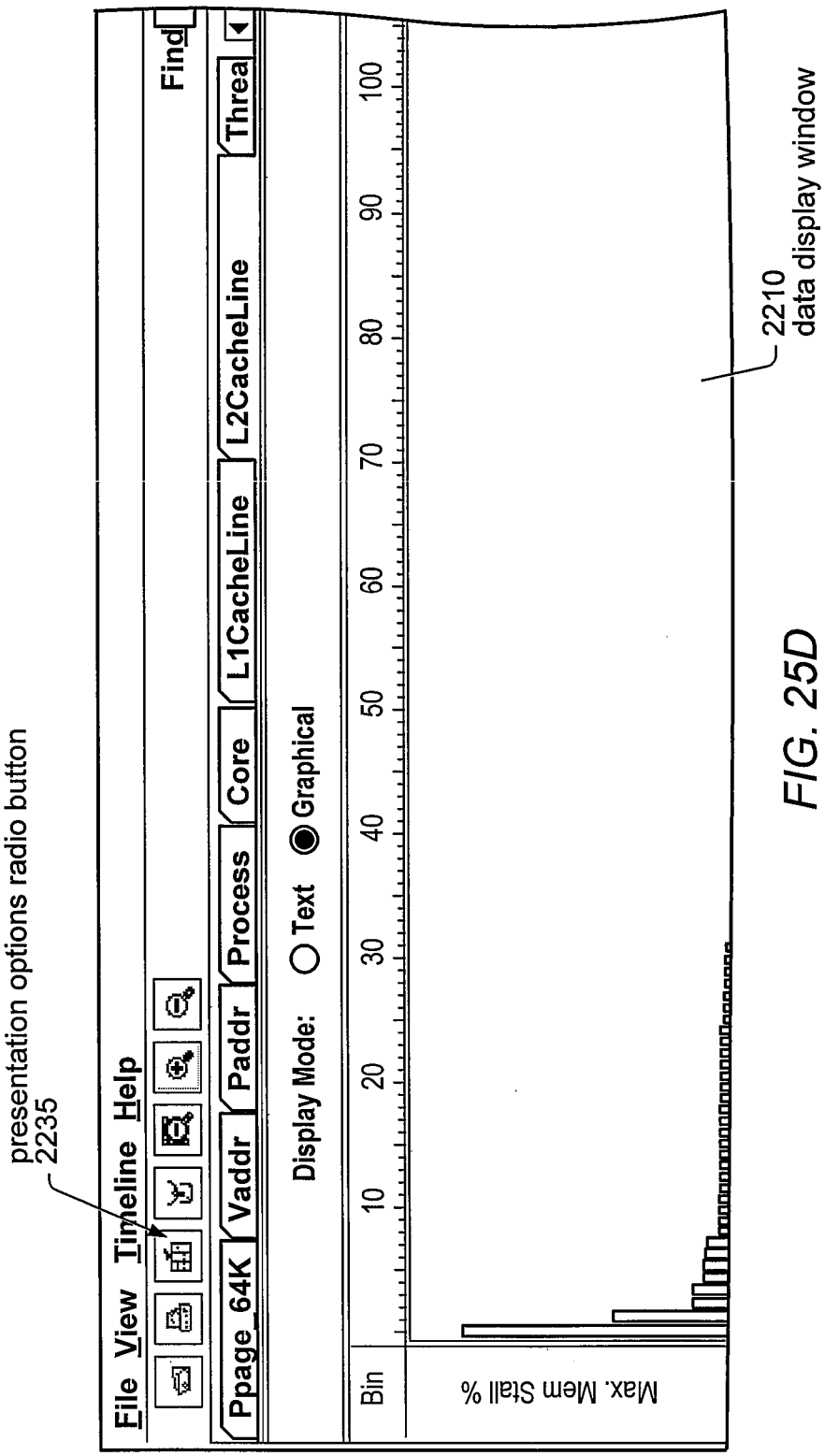

An example of a zoom-in function that changes the aggregation and display of profile data is illustrated in FIGS. 25C and 25D. In this example, each data value displayed in FIG. 25C may be an aggregation of two or more profile data values that were combined into a "bin" before being presented. For example, the data displayed for bin 1, indicated by the first bar on the left, may represent the sum or average of two or more individual profile data values. By selecting the zoom-in function radio button, the user may choose to display the data according to a new zoom level, as illustrated in FIG. 25D. In this example, each bar displayed in data display window 2210 (a portion of which is illustrated in FIG. 25C), may correspond to a single profile data value. In other words, each bin may contain data for a single data profiling object. In this example, the bar on the far left may represent L2 cache line memory object 2697, which is associated with 21.89% of the total memory stall time of the application.

Note that in FIGS. 25C and 25D, the cost data represents the memory stall time attributable to L2 cache lines as a percentage of the total stall time for the profiled application. In FIG. 25A, cost data was presented in terms of CPU time in seconds and memory stall time in seconds. In FIG. 25B, memory stall time was presented in terms of both seconds and as a percentage of total stall time. If other tabs illustrated in FIGS. 25A-25P are selected, cost data would be presented in view of the profiling objects referenced by those tabs (e.g., as attributable to each process, thread, etc.). In different embodiments, different profiling tabs may be selected for display, based on the available data profiling object data in the event space.

In some embodiments, the user may select the manner in which cost data is presented during analysis. In the example illustrated by FIGS. 25A-25P, the user may invoke a "presentation options" function, which may be used to specify presentation options. In this example, this function is selected using one of the radios buttons, presentation options function 2235, illustrated in FIG. 25D. In some embodiments, invoking this function may cause another window and corresponding set of tabs to be displayed, and each tab of the second window may represent different attributes of the presentation that may be configured by the user.

Figure 25E:
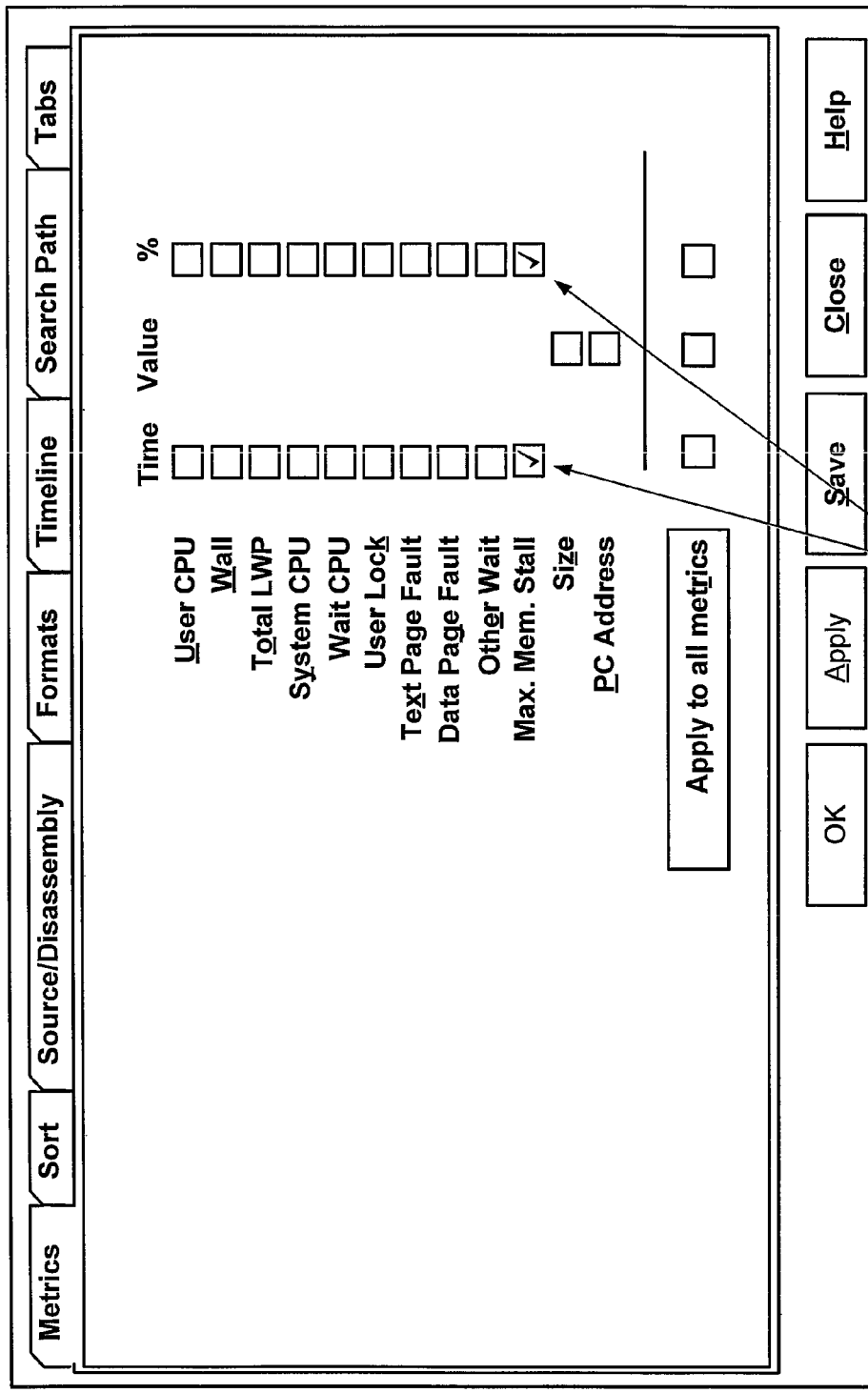

FIG. 25E illustrates one window that may be displayed when the presentation options function is invoked, in one embodiment. In this example, the "metrics" tab has been selected and the user may select the cost metrics to be displayed. In this example, "Max. Mem. Stall" has been selected and both "time value" and "%" have been selected. If these selections are applied to the profiling data, the display in data display window 2210 may resemble that illustrated in FIG. 25B.

Figure 25F:
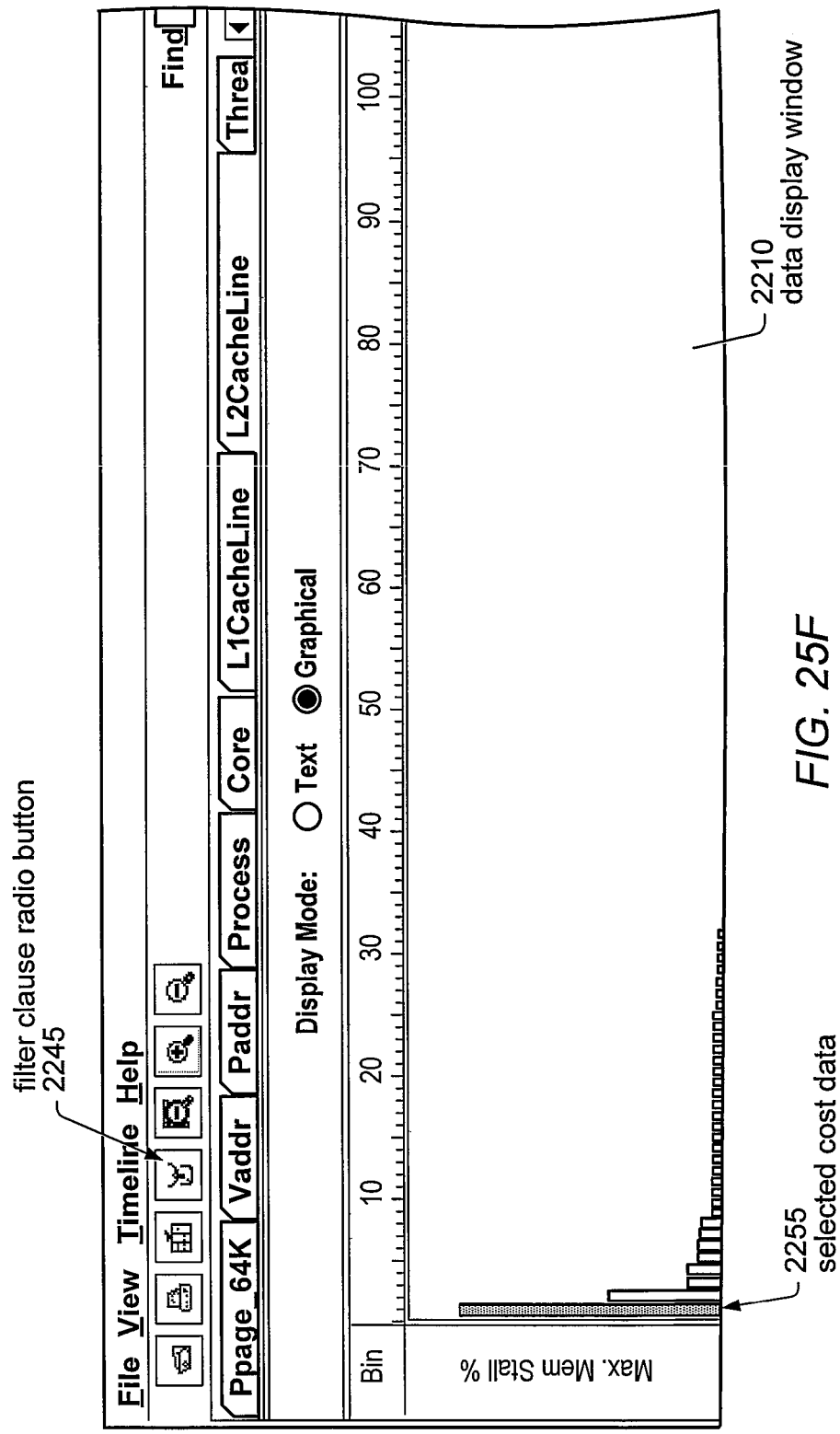
Figure 25G:
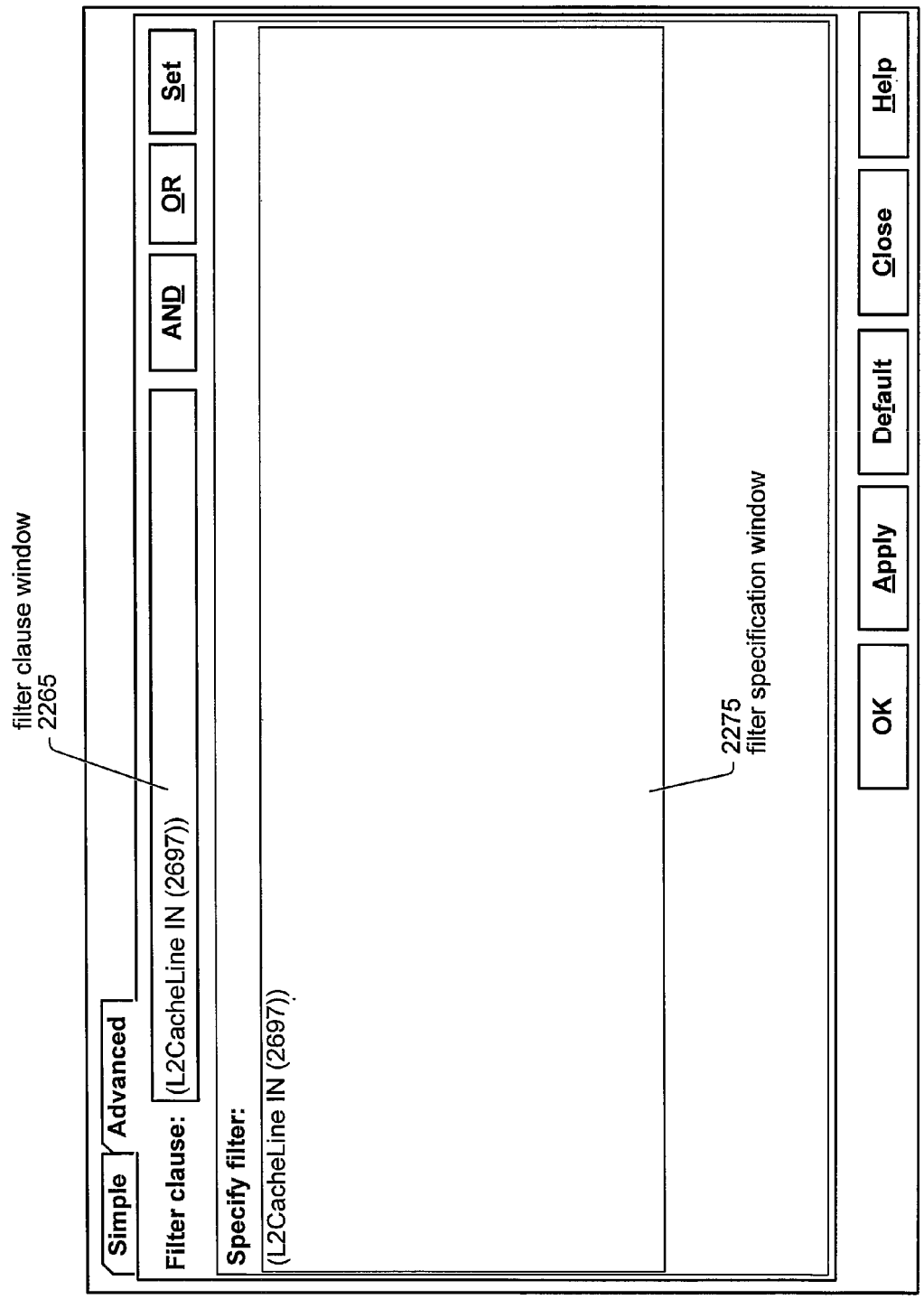
Figure 25H:
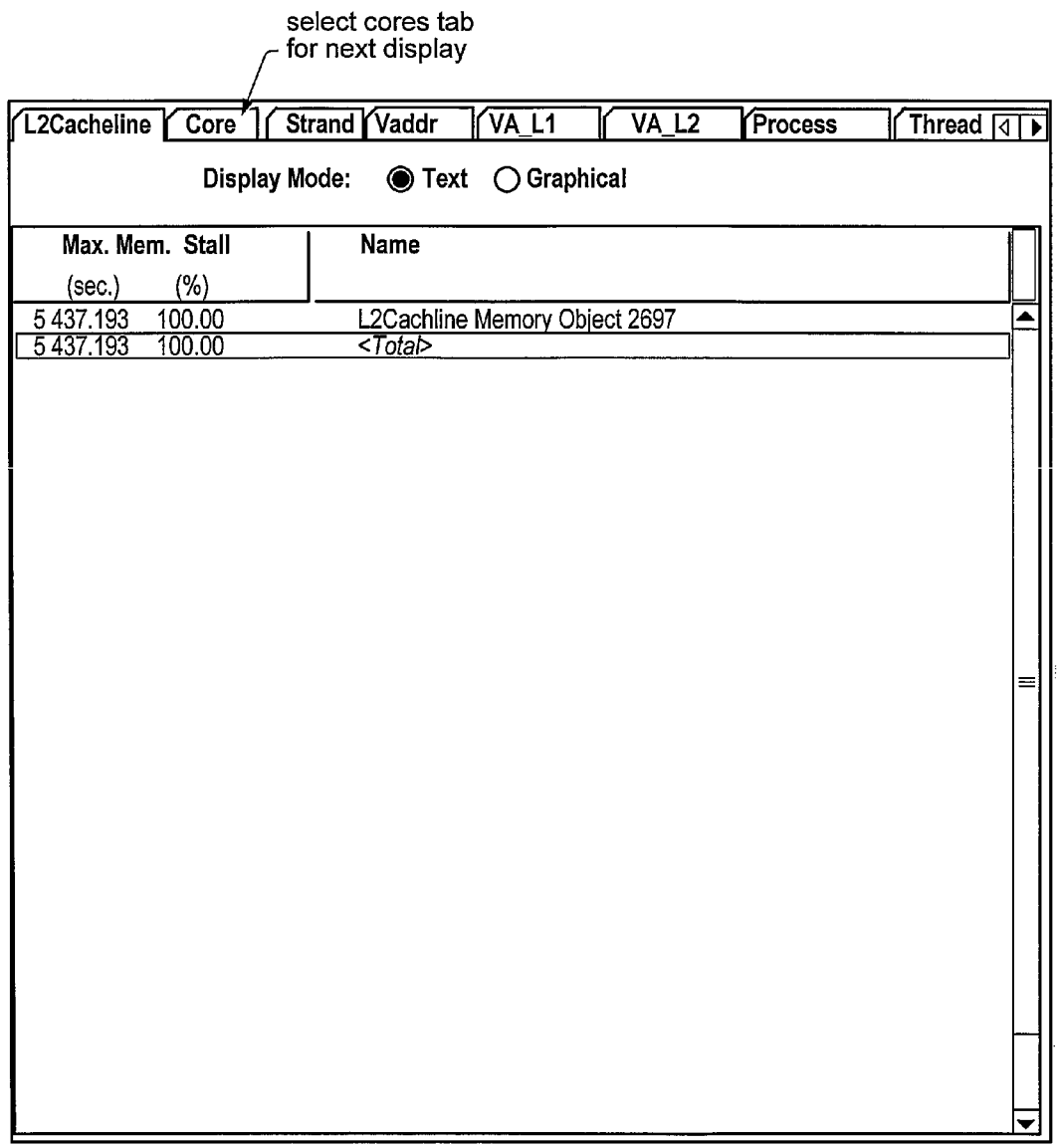

In order to look for a cause for the large contribution to memory stall time of the single L2 cache line memory object 2697, the user may filter the profile data in the event set to focus in on this single L2 cache line. To that end, FIG. 25F illustrates the selection of the cost data corresponding to L2 cache line memory object 2697 and the invocation of the "filter clause" function radio button 2245. When these two elements are selected, the analyzer may display a window in which a user may specify a filter clause for the profile data, as shown in FIG. 25G. In this example, filter clause window 2265 may be pre-loaded according to the data selected in the previous display. In this case, the filter clause is pre-loaded with "L2Cacheline IN 2697" because the L2CacheLine Memory Object 2697 entry was selected in the previous display. FIG. 25H illustrates an example data display resulting from applying this filter to the profile data set. In this example, only the data corresponding to L2 cache line 2697 is displayed. Therefore, as shown, 100% of the memory stall time being investigated is attributable to this cache line. In some embodiments, when a filter has been applied to profile data, the applied filter expression may be displayed along with the filtered data in the same window or in a separate window displayed at the same time as the data display window (not shown).

In some embodiments, a user may add additional criteria to the pre-loaded filter clause, such as by selecting other data profiling objects or code behavior attributes, specifying a value or range of values (e.g., specifying a start value and an end value) for one or more data profiling objects or code behavior attributes, applying a set operator to one or more data profiling objects, etc. This will be described in more detail later.

Figure 25I:
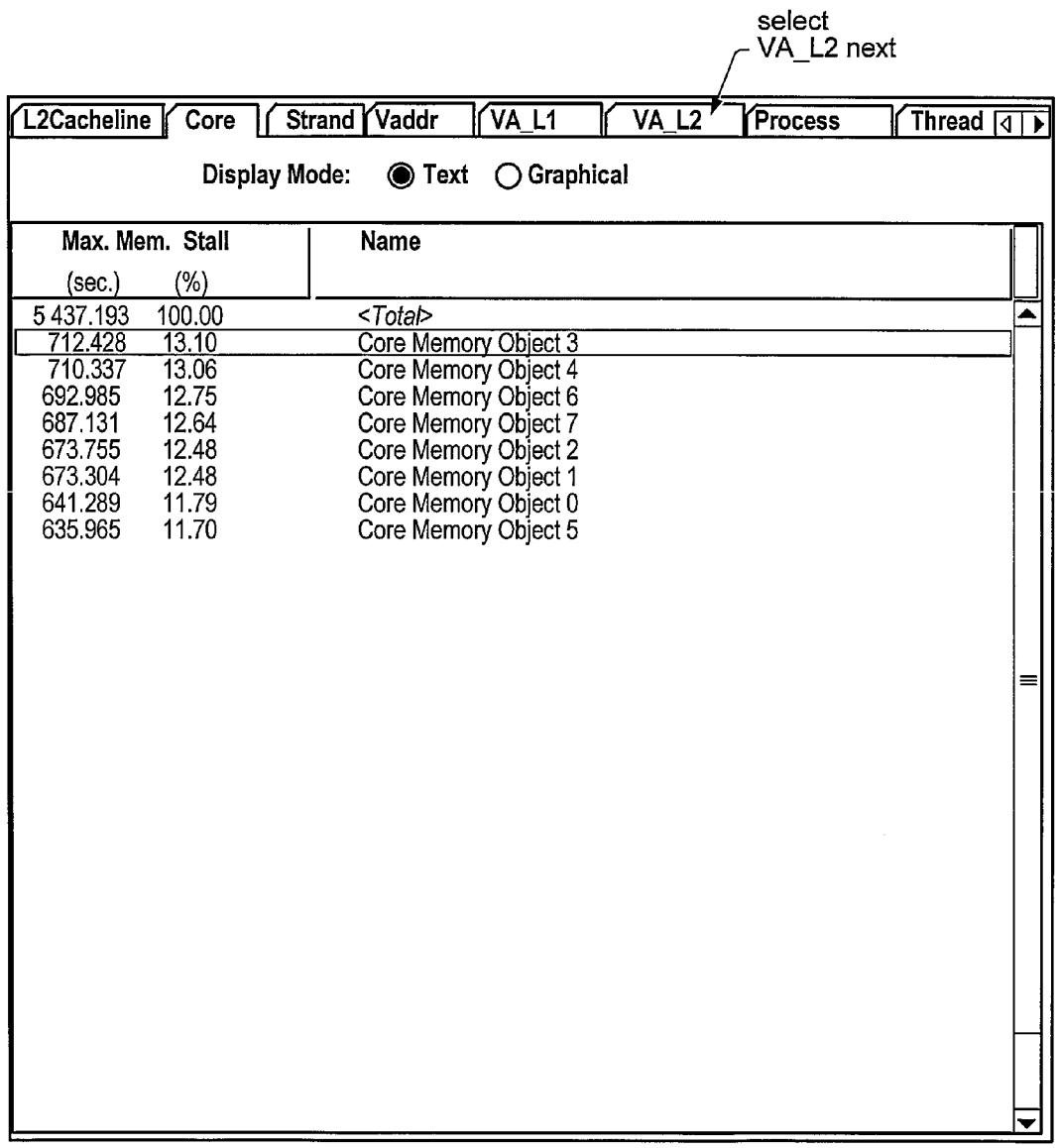

In this example, the information displayed so far may not be enough to determine the cause of the large memory stall time attributable to L2 cache line 2697. Therefore, a user may choose to display cost data associated with other data profiling objects with respect to this cache line. For example, a user may select a "core" view of the profile data associated with this cache line, as shown in FIG. 25H. In this example, the results of this selection are illustrated in FIG. 25I. FIG. 25I illustrates that eight cores, each represented by its "address", access L2 cache line 2697 during the execution of the profiled application. In this example, accesses of this cache line by each of the eight cores contribute roughly equally to the total stall time attributable to the cache line.

Another profiling object view that may be useful for determining a cause of the observed bottleneck, in this example, is a view of the virtual address mapping or mappings for the L2 cache line in question. The VA_L2 tab may be selected, as shown in FIG. 25I, with the resulting display illustrated in FIG. 25J. FIG. 25J illustrates a display of the memory stall time attributable to each virtual address mapping to L2 cache line memory object 2697. As shown in FIG. 25J, one virtual address mapping is associated with almost all of the stall time attributable to this L2 cache line.

Figure 25K:
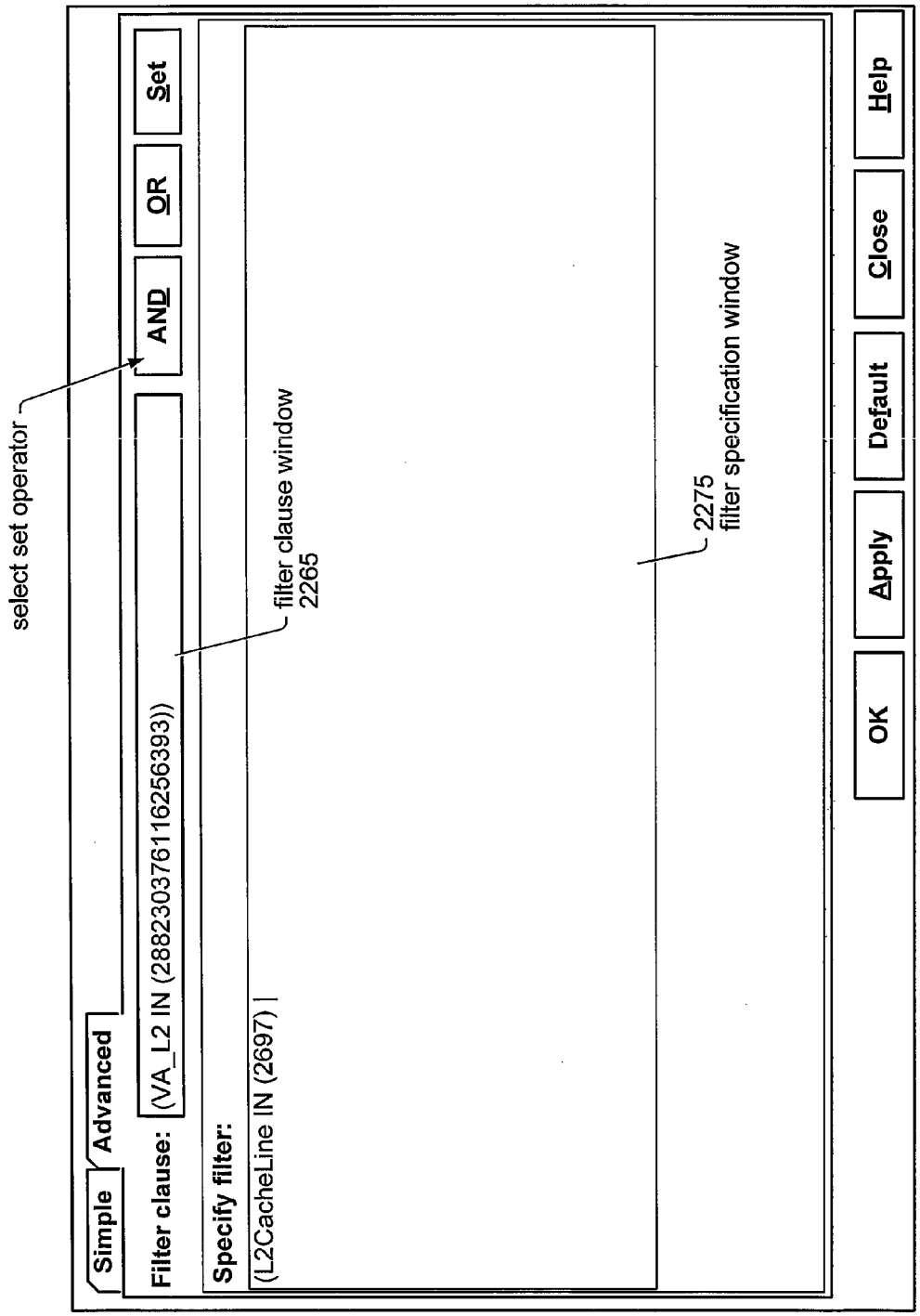
Figure 25L:
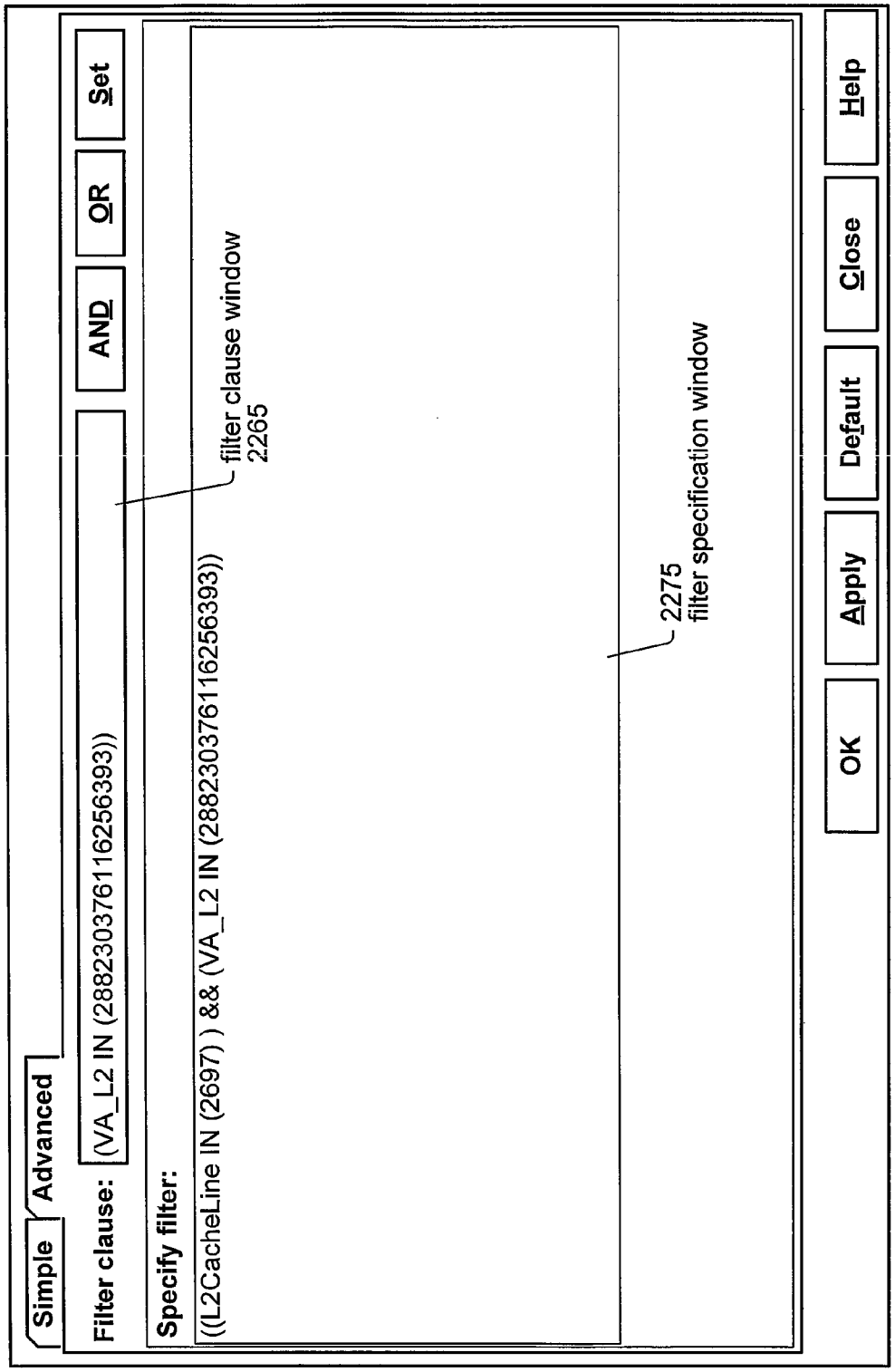
Figure 25M:
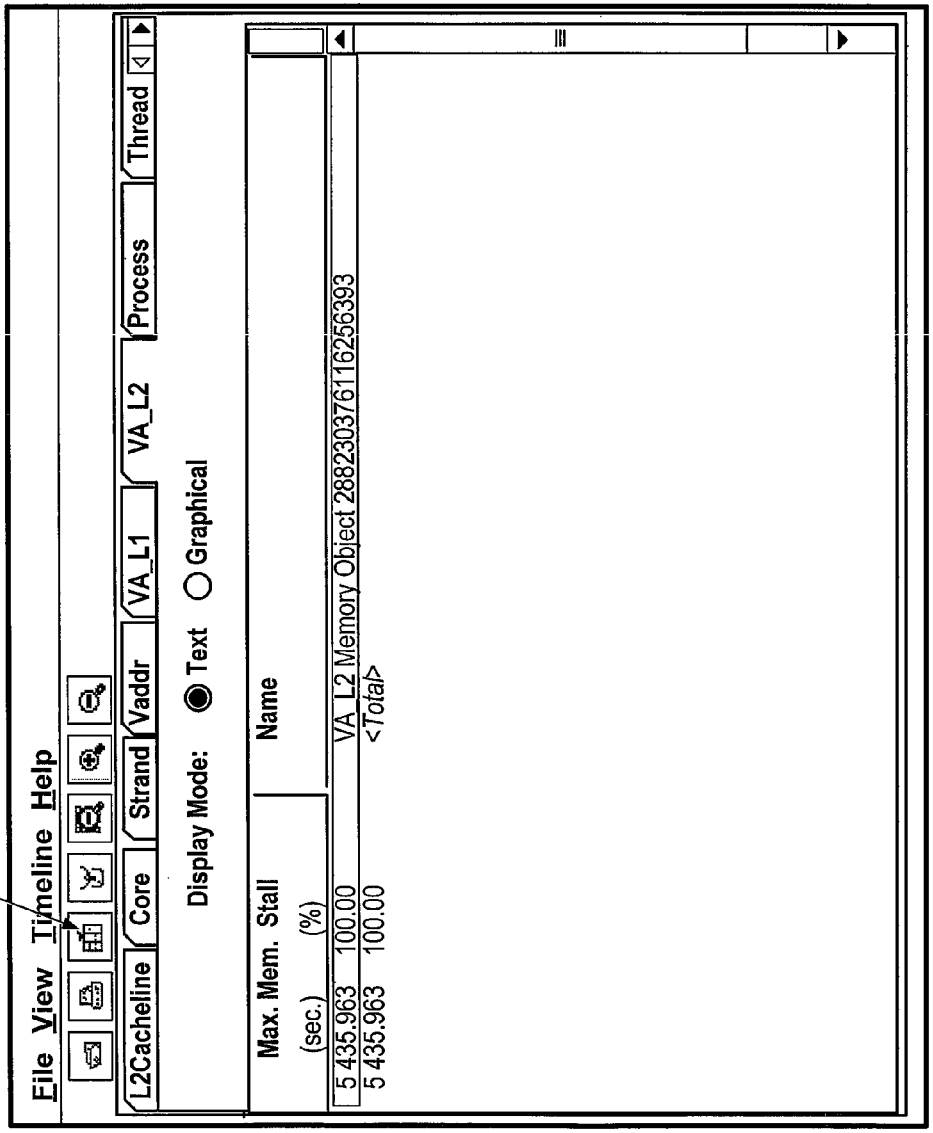

Using the filter clause function, the user may focus in on the one virtual address mapping at the root of the observed bottleneck. FIG. 25K illustrates the filter clause window 2265 pre-loaded with the previously selected filter in the data display window "L2CacheLine IN (2697)" and the newly selected filter clause element "VA_L2 IN (288230376116256393)" in the specify filter window 2275. By choosing the set operator "AND" from the set operator radio buttons of the display, the user may construct a filter expression for the profile data of interest. This filter expression is shown in FIG. 25L, as "((L2CacheLine IN (2697)) && (VA_L2 IN (288230376116256393))". The analysis engine may apply this filter to the profile data resulting in the display illustrated by FIG. 25M, which depicts the cost (memory stall time) for only this combination of data profiling object identifiers and/or code behavior attribute values.

Note that the relational agents return a different extended address element for each runtime event dependent on the profiling object from whose perspective the costs are extracted. Filter criteria, on the other hand, determine a subset of the event data for which to display this extended address element, in some embodiments.

Figure 25N:
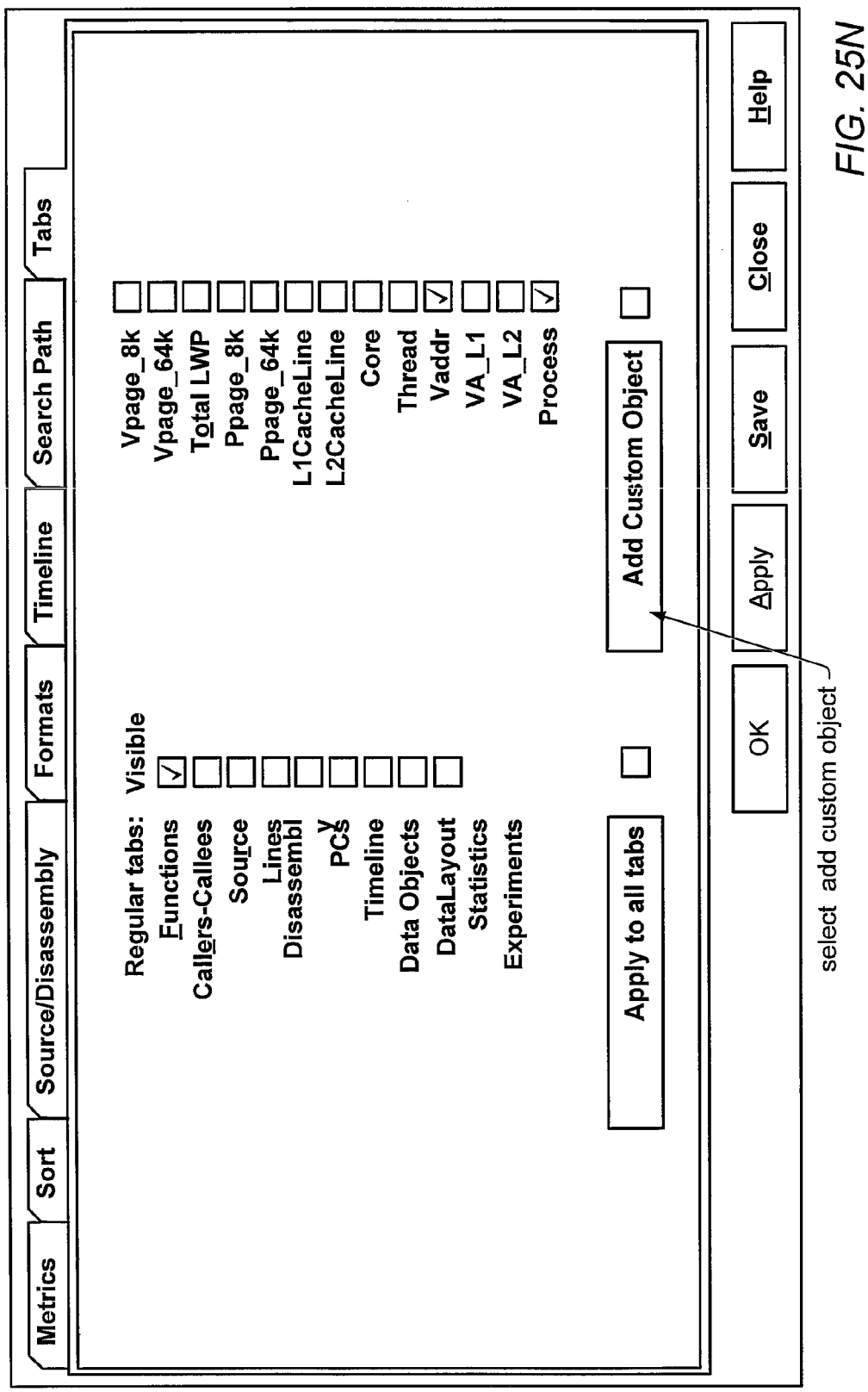

In order to determine if the single virtual address mapping corresponds to one physical memory location or multiple locations, the user may wish to view the profile data with respect to the physical address(es) associated with this virtual address. In some embodiments, the physical address for the L2 cache line may be one of the profiling objects defined and selectable using one of the tabs in the analyzer display. In other embodiments, the user may be able to view this information by constructing a custom profiling object during analysis. In this example, the user may invoke the presentation options function and select the "tabs" tab, bringing up a window in which profiling objects may be selected for display. This window is illustrated in FIG. 25N. As shown in this example, different types of profiling objects may be selected for display in the analyzer GUI. For example, some profiling objects may be built-in profiling objects, standard in any instantiation of the analyzer, in some embodiments. These may include the profiling objects on the left side of the window, such as "Functions", "Callers-Callees", "Source", etc. Other profiling objects may be specific to a particular system configuration, processor, operating system, or compiled application, in some embodiments. These may include profiling objects similar to those depicted on the right side of the window, such as Vpage_8K, L2CacheLine, Core, etc. As shown in this example, data profiling objects may correspond to hardware elements of the system, such as cores, registers, or memory boards, or may correspond to elements in the programming view of the system, such as functions, threads, data segments, etc. Each of these data profiling objects corresponds to a relational agent (function) mapping the profiling object name to a formula for calculating its identifier, or address, according to various embodiments. In some embodiments, relational agents for custom profiling objects may be specified in a control file or included in an event data repository and loaded at invocation of the analyzer, rather than being specified during analysis.

In some embodiments, the analysis engine may be configured to compute costs that are impractical or impossible to capture in hardware, but that may be extremely useful for performance analysis. For example, as threads are increased in a computer system, it may be useful to know how the cycles-per-instruction costs increase for instructions that reference frequently accessed cache lines. In some embodiments, the analyzer may allow profiling of any hardware device that is address-indexed, and any software construct, via user-specified cost metrics. For example, the analyzer may include means to profile cache lines by the cycles-per-instruction cost for instructions accessing the cache line by specifying what cost is requested for the hardware device or software construct.

In order to compute user-specified cost metrics, the analyzer may include a parser and an expression evaluator, in some embodiments. A language description may specify names for computed costs (i.e., a cost metric identifier) and expressions for computing names and intrinsic cost metrics (i.e., a cost function). In some embodiments, the parser may translate the cost function from a description language to executable code and the expression evaluator may compute the user-specific costs for various profiling exercises.

The technique for using a custom cost metric may in general involve applying a query against an event set using a relational agent, identifying profiling objects that satisfy the query, and applying a respective cost function against profile data extracted from the event set and corresponding to the identified objects. The profile data extracted from the event set may include one or more respective profiling object identifiers and one or more respective costs associated with each of the one or more events. The cost function may apply a mathematical formula to the profile data extracted from an event set to calculate a respective cost metric value for each of one or more events in the event set.

Figure 26:
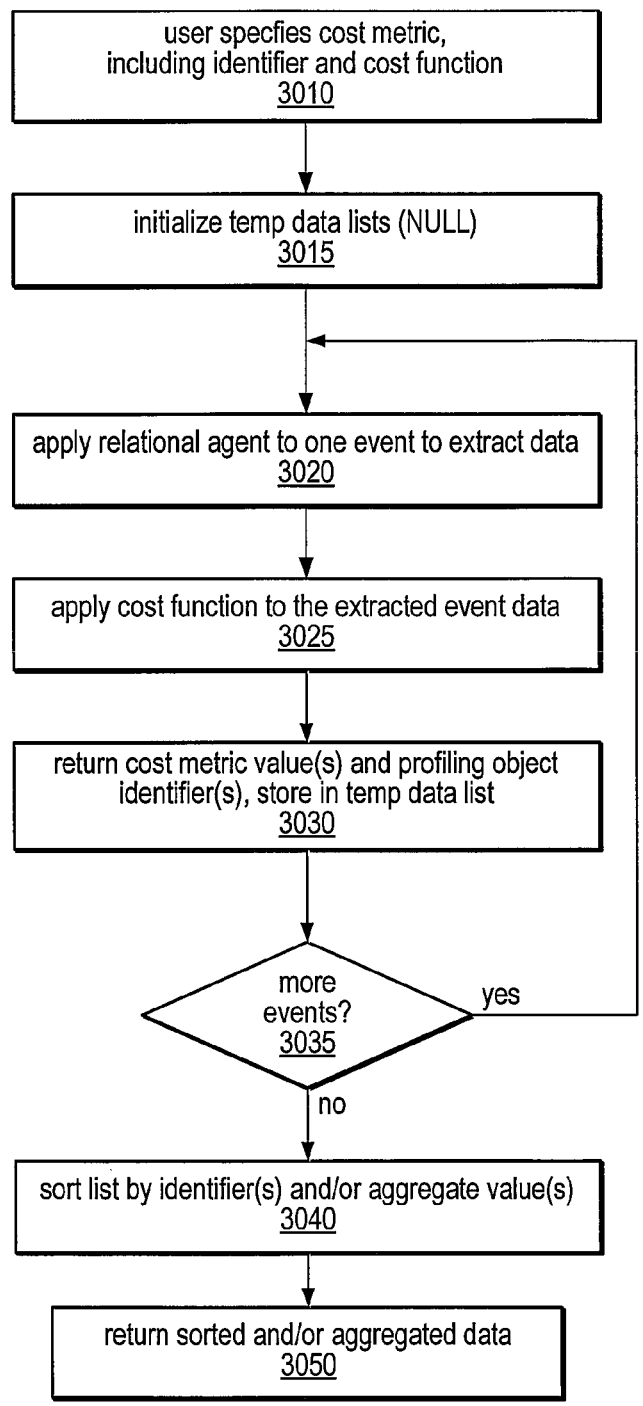
FIG. 26 is a flow chart illustrating a method for including user-specified cost data in a data profiler, according to one embodiment.

A cost associated with an event in the event space may in some embodiments be associated with a function or basic block of instructions rather than with a single instruction or operation. In such embodiments, the cost function may include a distribution formula for attributing at least a portion of the cost associated with a function or basic block to each of the instructions comprising the function or basic block. One method for including user-specified cost metrics in a data profiler is illustrated in FIG. 26 and described in detail below.

In some embodiments, specifying a user-defined cost metric may involve defining a custom profiling object in terms of available cost metrics and/or other code behavior attributes (e.g., values of other profiling objects) and filtering the event data so that costs associated with the custom profiling object may be displayed. One example of the use of a custom profiling object in data space profiling is described below.

As shown in FIG. 25N, custom profiling objects may be added to the list of profiling objects to be displayed, in some embodiments. In such embodiments, a new custom profiling object may be defined as a function of one or more already available profiling objects. Invoking the "add custom object" function may cause the analyzer to open a window in which a user may define a custom object, in some embodiments. In the example involving an identified bottleneck of L2 cache line 2697, as mapped to virtual address 288230376116256393, the user may wish to view the physical address(es) mapped to this virtual address to get a better understanding of the bottleneck. In this example, a custom relational agent (function) may be defined to map the profiling object name PA_L2 (i.e., physical address of an L2 cache line) to a formula for computing physical addresses for each cache line from the physical addresses previously captured by the event agents. In this example, the physical address mapped to each L2 cache line is the physical address shifted to the right by 6 bits. This formula may be based on the particular system configuration being profiled and in some embodiments may be different for different systems on which the same application may be profiled. For this example, the user may enter the object name PA_L2 and the formula (PADDR>>6) in the custom object creation window illustrated in FIG. 25O to create the desired custom data profiling object.

As a result of defining the custom profiling object, a new tab labeled PA_L2 may be displayed by the analyzer, in some embodiments. This is shown in FIG. 25P. In some embodiments, creating a new custom object may cause the analysis engine to automatically calculate values for the new profiling object for each of the events in the event set for which the new profiling object is relevant (i.e., for those involving an L2 cache access, an L2 cache miss, etc.) In other embodiments, the analysis engine may not calculate values for the new profiling object until explicitly directed to do so by the user or until the user selects the new custom profiling object for display.

When the new custom profiling object is selected, the cost data for the new profiling object may appear as illustrated in FIG. 25P. In this example, cost data previously collected and associated with various physical addresses may be mapped by the new relational agent according to the PA_L2 formula and displayed by PA_L2 memory object. The data displayed indicates that the single virtual address involved in the observed bottleneck is mapped to many different physical addresses, which are in turn mapped to a single L2 cache line. Therefore, this data indicates that the likely cause of the observed bottleneck is L2 cache misses due to conflicts between multiple physical addresses mapped to a single cache line.

Once the user (analyst) identifies the cause of a performance bottleneck, he or she may take steps to eliminate the bottleneck, thereby optimizing performance of the profiled application. In the example described above, the analyst may examine other profiling objects, (e.g., virtual pages, processors, or other profiling objects) in order to determine how best to reorganize the memory mappings so that the observed conflict misses are reduced or avoided all together. In the example described above, the analyst may be able to reduce the total memory stall time for the application being profiled by shattering the virtual page associated with the many different physical addresses (in other words, by repairing the data allocation conflicts).

While the examples above primarily illustrate the use of a GUI to display two-dimensional profile data (e.g., a cost on one axis and a profiling object identifier value on a second axis) the data space profiler and GUI may in some embodiments support the display of more than two event data dimensions at once. For example, the data may be displayed as a 3-dimensional object (e.g., a 3-dimensional histogram, drawn using perspective), in which cost may correspond to one axis and two different profiling object identifier values may correspond to the other two axes. In another example, a 3-dimensional object may be displayed as above, but a surface color on different portions of the object may represent a $4^{th}$ profiling data identifier value or other cost or code behavior attribute.

As shown in the example above, the data space profiler may allow custom data profiling objects and/or custom filter clauses to be specified by a user during analysis, in some embodiments.

As previously noted, the data space profiler may allow custom cost metrics to be specified by a user, in some embodiments. For example, a user may wish to display instruction frequency, the number of cycles executed per instruction, the average number of instructions executed per instruction, or the number or average number of cycles per memory (or data) reference. In some embodiments, the user may define a cost function to compute such user-specified costs from other costs and/or profiling data accessible in an event set. In some embodiments, the cost function may be defined according to a cost metric description language and may be included in an event agent or relational agent, or may be instrumented in the source code of an application. In other embodiments, the cost function may be defined using compiler directives or may be included as debugging commentary.

A language description of a cost metric may specify the name for the cost metric and one or more expressions for computing cost values for the cost metric dependent on other available profile data (e.g., other cost metrics, profiling object identifiers, associated extended address element values, and filter clause expressions.) In some embodiments, the language description may include one or more expressions for computing an identifier (name) of the cost metric corresponding to each of the computed values. The data space profiler may include a parser to translate the cost function from a description language to executable code and an expression evaluator to compute the user-specific costs for various profiling exercises, in some embodiments. For example, a relational agent may include an expression evaluator and may compute costs by operating on extracted profile data using the cost function.

User-specified cost metrics may in some embodiments be computed by relational agents that extract, filter, and/or aggregate cost data and other profiling data included in an event set. For example, if a user wishes to display the average number of cycles per data reference, a relational agent may be configured to extract the number of cycles associated with each data reference instance in the event set and the number of instances of each data reference, and to divide the number of instances by the number of cycles to determine an average number of cycles for each data reference. Similarly, if a user wishes to display the average number of cycles per executed function, a relational agent may be configured to extract the number of cycles associated with each function instance in the event set and the number of instances of each function, and to divide the number of instances by the number of cycles to determine an average number of cycles for each function. The values of other user-specified cost metrics may be similarly determined by applying an expression or procedure to other subsets of the event data extracted by relational agents. These user-specified cost metrics may be displayed or presented instead of, or in addition to, cost metrics collected by hardware or software event agents, according to different embodiments.

In some embodiments, determining values of user-specified cost metrics may involve instrumenting application code and/or compiler directives to capture additional information about the code that may be used in computing the cost metrics. For example, in some embodiments, hardware may report instruction frequency on a per-instruction basis, but the reported frequency may not be uniform for the flow of instructions through a pipeline (e.g., in a superscalar architecture). Instead, hardware and/or software event agents may attribute all costs (e.g., instruction rates, CPU execution times, or memory stall times) and other extended address information collected when an event is detected to only one of the instructions in a basic block of instructions (e.g., the instruction corresponding to the block's entry point or exit point). Therefore, even though all of the instructions in the basic block may be executed each time any one of them is, a hardware or software event agent may not associate a correct execution count, instruction rate, or cost with each of the instructions in the basic block.

In order to get a more accurate representation of costs per instruction, the cost recorded for a basic block or for one of the instructions in the basic block may in some embodiments be attributed to all of the instructions in the basic block by gathering a list of the program counter values for the block and modifying the event set to associate the recorded cost with the other instructions in the block corresponding to these program counter values. In such embodiments, instrumentation of the application code or compiler directives may include a relational agent including a cost function configured to map costs associated with the basic block to each of the instructions in the basic block. For example, one such cost function may be used to assign the total cost associated with an event detected during execution of a basic block to each (all) of the instructions within the basic block. In another example, a cost function may distribute a portion of the total cost associated with a basic block to each of the instructions in the basic block, either uniformly or according to a weighting formula based on a heuristic, a user's knowledge of the operation of the processor, or on data collected from other profiling exercises. In yet another example, an average cost may be computed by the cost function, and this average cost may be attributed to each of the instructions in the basic block.

In some embodiments, a compiler-created relational agent may gather information about one or more basic blocks (e.g., the program counter values for instructions executed in each block) and may use this information to associate portions of the block costs to each of the instructions in the block. For example, a relational agent may extract the event costs for each event associated with a basic block from an event set and may modify the event set to associate these costs with the program counter values of each of the instructions included in a basic block, either uniformly or according to a weighting formula.

One method for defining and using custom cost metrics is illustrated in FIG. 26. In this example, a user may specify a cost metric, including a cost metric identifier and a cost function, as in 3010. As noted above, the cost metric may be specified according to a cost metric description language and may be implemented as an event agent, a relational agent, a series of compiler directives, or as debugging commentary, in various embodiments. Memory may be allocated for temporary data lists that will be used to store cost data and these data lists may be initialized (e.g., to a NULL state) as in 3015.

A relational agent may be applied to a first event in an event set, as in 3020. This relational agent may be configured to extract cost data and/or values of other extended address elements associated with the event that may be inputs to the cost function. For example, the relational agent may extract a function name, basic block identifier, or other profiling object identifier and one or more cost values from the profile data associated with the first event. If a function name or basic block identifier is extracted, the relational agent may also be configured to extract a list of program counter values corresponding to the instructions executed by that instance of the function or basic block, in some embodiments. The relational agent may in some embodiments be configured to extract event data for the first event in accordance with a specified query, such as a query specified via the analysis engine. For example, the relational agent may be configured to extract one or more cost values (e.g., execution time and/or memory stall time) from each event and one or more profiling object identifiers, such as a program counter value and/or a memory address. Note that in some embodiments, the relational agent may also be configured to apply a filter expression to the event data, as described above, to extract only that profile data satisfying the filter criteria. For example, the relational agent may be configured to extract profile data from the event set only if it corresponds to a particular event type (e.g., a cache miss) or to a particular data reference (e.g., a specified variable name or memory address.)

If profile data for the event satisfies the query and is extracted from the event set, the cost function may be applied to the extracted data, as in 3025. In some embodiments, the cost function may be included as a module or function within the relational agent, while in other embodiments it may be implemented as a stand-alone function. As previously noted, the cost function may in some embodiments be configured to compute a value for the user-specified cost metric directly from extracted profile data for each event. In other embodiments, the cost function may be configured to accumulate data associated with two or more events in order to compute the user-specified cost metric, such as when computing the user-specified cost metric involves determining an average value, a median value, a total value, or another aggregated value from extracted profile data.

In some embodiments, the cost function may return the value of the user-specified cost metric for the first event and may store it in the temporary data list, as in 3030. If the cost function is configured to compute an average, a median, a total or another aggregated value, the extracted cost data may in some embodiments be stored in the temporary data list and may be accessed later to compute the aggregated value. The extracted or computed cost value(s) may be stored along with one or more identifiers of the event and/or associated extended address element values, which may be used later for sorting and/or displaying the values of the user-specified cost metric for each event and/or profiling object.

At 3035, a determination is made as to whether there are more events in the event set. If so, as indicated by the positive exit from 3035, the operations illustrated in 3020-3030 may be repeated for the remaining events in the event set. In this manner, the relational agent may be applied against each event in the event set to extract data that is relevant to the computation of the user-specified cost metric, and the cost function may be applied against the extracted data to compute a cost value or to accumulate data for a future computation.

Once the relational agent has been applied to each of the events in the event set, as indicated by the negative exit from 3035, the temporary data list of extracted and/or computed cost values may be sorted and/or aggregated for presentation and analysis, as in 3040. For example, if each entry in the list comprises computed cost data and one or more associated profiling object identifiers, the list may be sorted according to the cost or according to one or more of the object identifiers. In some embodiments, the list entries may be aggregated according to a display preference, such as the zoom level or binning criteria previously described. In other embodiments, the cost function may be applied to the list entries to compute one or more aggregated values of the user-specified cost metric. For example, the list may be sorted according to function or basic block identifiers and an average cost (e.g., the average number of cycles to execute the function or basic block) may be computed for each function or basic block. In another example, the list may be sorted according to memory addresses or registered variable identifiers, and an average or median cost (e.g., average execution time or memory access time) may be computed for each memory address or variable. In some embodiments, if an aggregated cost is computed for a function or basic block, the aggregated value (e.g., a total, average or median cost) may be associated with each of the instructions included in the function or basic block in the event set. In still other embodiments, the cost function may distribute a cost or an aggregated cost associated with a function or basic block to each of the instructions included in the function or basic block according to a weighting formula specified in the cost function. The values computed by a user-specified cost function may in various embodiments be added to the event set data and associated with corresponding data profiling objects and may be accessed for future analysis and/or extracted when computing other user-specified costs and/or defining custom profiling objects.

The sorted and/or aggregated cost data may be returned to the user by any suitable means, including those described herein for displaying standard cost data, as in 3050. For example, in some embodiments, a user-specified cost metric, once defined, may be included in a selectable list of cost metrics available for display in a GUI of the data profiler, such as the list of cost metrics illustrated in FIG. 25E. In such embodiments, if the user-specified cost metric is selected, it may be displayed as a column of cost data, similar to the columns displaying CPU time and/or memory stall time illustrated in FIGS. 25A-25B, 25H-25J, 25M and 25P. In some embodiments including a GUI, the user-specified cost metric, along with its identifier and cost function, may be defined using the GUI, such as by entering a cost metric identifier and cost function in one or more windows configured to receive the identifier and one or more statements (e.g., mathematical or logical expressions, or procedural statements) defining the cost function. The user-specified cost metric may in some embodiments be defined after the profiling experiment has been run, such as during the analysis of collected profile data, and may operate on previously collected profile data to display the new cost metric. In other embodiments, the user-specified cost metric may be defined in an event agent, relational agent, compiler directive or debugging commentary prior to execution of the profiling experiment and values for the new cost metric may be displayed along with standard cost metric values (e.g., those collected by hardware event agents and/or software event agents standard in an operating system) during analysis.

In embodiments that do not include a GUI, values for the user-specified cost metric may be presented in a tabular format similar to those illustrated in FIGS. 20, 21A-21B, and 22A-22F. For example, the user-specified costs may be included in an additional column having the cost metric identifier (name) in the header row and respective values of the cost metric corresponding to each data profiling object included in the remaining rows.

While several of the examples described above involve computing a user-specified cost associated with each of the instructions within a function or basic block, the techniques described herein for defining and using user-specified cost metrics in a data space profiler may be applied to any profiling objects or cost data, according to different embodiments. The technique may in general involve applying a query against an event set using a relational agent, identifying objects that satisfy the query, and applying a cost function against the identified objects. In the examples above, the identified objects may be the instructions within functions or basic blocks, but in other examples they may be any profiling objects represented in the event set data. For example, a user-specified cost function may be used to compute an average cost (e.g., an average memory stall time) associated with accessing a particular cache line or data reference. In another example, a user-specified cost function may be used to compute an average or total number of instructions executed on behalf of a particular thread or user, or for particular time periods. In yet another example, a user-specified cost function may be used to calculate the frequency of an event (e.g., a rate of execution for one or more particular instructions or a rate at which given memory locations are accessed.)

As noted above, the use of user-specified cost metrics in a data space profiler may in some embodiments allow a developer to identify performance bottlenecks or asymmetric resource utilization in complex computing systems, such as the chip multi-threaded processors described herein. For example, observing average or median costs for runtime events associated with particular hardware components, software constructs, or data allocations may allow a developer to identify trends in performance as the number of threads are increased, as memory configurations are modified, or as additional hardware devices are added to a computing system.

The data space profiler described herein may also include a method and apparatus to associate costs with a user-specified high-level data type, in some embodiments. In other words, it may provide a mechanism to operate on context specific data and costs. Context-specific data may in some embodiments include the values of one or more variables included in the application that are interesting to the developer for profiling purposes. For example, a developer may include program instructions in the application being profiled that define a variable representing the name of the user executing the program. In this example, the program instructions may prompt the user to enter his or her name or may capture the name of the user on whose behalf the application is being run through other means (such as through an operating system function). When a system event is detected, the user name may be included in the profile data collected and associated with the event, along with other extended address element values, as described above. In this way, the developer may be able to determine if the performance of the application varies between users (e.g., if there is anything about a particular user's inputs, data, or use model of the application that causes a difference in performance compared to other users.)

In other examples, a variable defined in the application may represent the name or type of the transaction on whose behalf operations are executed (e.g., a particular query or query type), the application name, a job name, a lock identifier, a semaphore identifier, or an identifier of a storage location (e.g., the row of a database being accessed.) These variables may be updated by the application as it executes and the current value of each variable may be captured and associated with an event when it is detected. Being able to examine the value of these variables when a system event is detected may in some embodiments allow a developer to determine performance bottlenecks of the application and/or their causes.

An apparatus for associating user-specified data with events may be employed as a part of an operation to translate application code to support data space profiling. This operation is described earlier in regard to FIG. 1, block 110. The apparatus for associating user-specified data with events may include two components: a descriptor apparatus and an event agent. The descriptor apparatus may allow input of a user-specified function defining a high-level data type, or may include user specified debugging commentary or another definition of the high-level data and/or data type of interest, according to various embodiments. The descriptor apparatus may be inserted into the source code of the application by the compiler or other automated tools, or by a developer, in different embodiments. For example, in one embodiment a descriptor function included in the application may register particular variables defined in the application as profiling elements (e.g., as additional extended address elements). The descriptor function may specify which variables should be tracked for profiling purposes and where their values are stored, in some embodiments. In other embodiments, a descriptor function in the application may specify the variables to be tracked and the compiler may include program instructions for determining where the values of the variables are stored, such as through a compiler directive or debugging commentary. In still other embodiments, compiler directives or debugging commentary may be used to specify both the variables to be tracked and the storage locations for their values. In some embodiments, storage locations for the variables of interest may be allocated on a per-thread basis.

The descriptor apparatus may specify one or more individual variables to be tracked or may specify a location at which a list of the variables to be tracked is stored, in different embodiments. For example, the descriptor apparatus may define a pointer to a data structure containing a list of variable identifiers whose values are to be included in the profile data and their respective storage locations. These variable identifiers may represent variables defined in the application or in any other program instructions executed along with the application, such as operating system variables, variables defined in other code linked with the application during execution, variables included in various run-time library functions, etc.

In some embodiments, a de-registration function may also be included in an application. This function may be used to indicate that a particular variable is no longer of interest or may be invoked when storage for the variable's value is de-allocated by the operating system and the value is no longer valid. A developer may in some embodiments customize the profile data collected during execution of different functions or methods of an application through the use of one or more descriptor/registration functions and one or more de-registration functions. For example, a particular variable may be of interest during execution of a first function or method of the application, but may not have anything to do with the execution of other functions or methods. A developer may, therefore, include a registration function call to register the particular variable at the beginning of the first method and a de-registration function call for the particular variable at the end of the method. In this way, an event agent may only capture the value of the particular variable if a system event occurs during execution of the first method. Similarly, each of a plurality of methods included in the profiled application may invoke one or more descriptor/registration functions and/or de-registration functions in order to customize the variables tracked and captured as profile data for the method.

The event agent may be implemented in hardware or in software, according to different embodiments, and may be configured to collect profile data related to the data type descriptions specified using the descriptor apparatus. In some embodiments, the event agent may be a function inserted into the source code of an application to be profiled. This function may be invoked when a system event is detected, and may include program instructions configured to capture the values of each of the registered variables and to associate them with the system event. In some embodiments, the event agent may be configured to maintain a list of registered variables and their locations. In embodiments in which the descriptor function defines a pointer to a list of registered variables, the event agent may access the list in order to capture the values of the registered variables. In some embodiments, an event agent may request allocation of space for a variable and/or registration of a variable at runtime, such as in response to a user entering a command line directive to track the variable when profiling is initiated.

Once the event agent has captured the values of the registered variables, it may be configured to associate the variables with the detected system event. In some embodiments, this may include storing the values of the registered variables in an event set (e.g., in an event space database) along with the values of other extended address elements captured by other event agents and associated with the event.

The event agent may enable users to monitor their user-specified data as it flows through an application, in some embodiments, and may enable a developer to associate costs with user-specified data and/or data types. For example, a developer may be able to view costs associated with an Oracle™ database row on behalf of a specific Solaris™ user that initiated an ODBC (Open Database Connectivity) Transaction.

It should be noted that the values of user-specified (registered) variables may be captured by a single event agent or by multiple event agents, according to different embodiments. For example, in some embodiments, one set of variables may be registered with a first event agent and another set of variables may be registered with a second event agent. The variables may be registered with different event agents dependent on their source (e.g., application code vs. operating system code; one method vs. another method; one thread vs. another thread), their type (e.g., global vs. local, string vs. numerical), their function within the application (e.g., as a flag, semaphore, loop counter, sensor reading), or on the type of event being detected, in different embodiments. For example, the value of a particular variable (e.g., a database row identifier) may be of interest when a cache miss is detected, but not when a hardware interrupt is detected. Therefore, an event agent capturing profile data when a cache miss is detected may be configured to capture the value of a database row being accessed, while an event agent capturing profile data when a hardware interrupt is detected may not capture this value. On the other hand, when a hardware interrupt is detected, an event agent may be configured to capture the value of a variable representing the value of a hardware sensor (e.g., a temperature sensor) read by the application.

Figure 27:
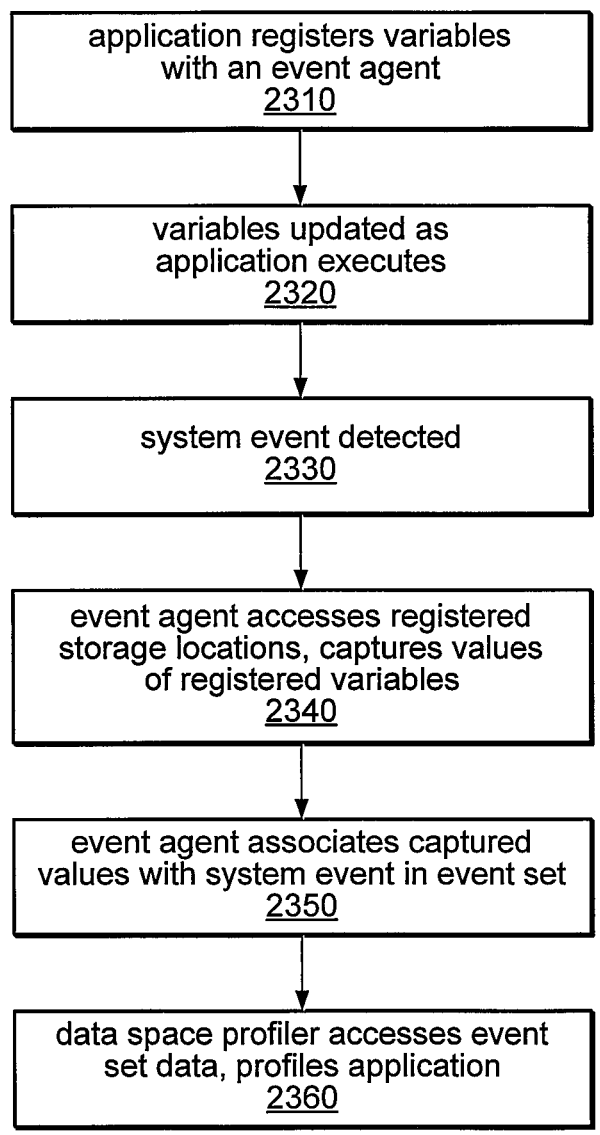
FIG. 27 is a flow chart illustrating a method of profiling using user-specified data associated with an event, according to one embodiment.

One method for using a descriptor apparatus and event agent to associate user-specified data with a system event is illustrated in FIG. 27. In this example, an application being profiled may register one or more variables with an event agent, as shown in 2310. As described above, these variables may be registered for the whole application or on a per-method or per-thread basis. Registering the variables may include conveying to the event agent an identifier of each variable to be registered and its location, in some embodiments. In other embodiments, registering the variables may include conveying to the event agent a pointer to a data structure containing a list of variable identifiers and their respective storage locations.

As the application being profiled is executed, program instructions may be configured to update the value of each of the registered variables, as in 2320. If a system event is detected, as in 2330, an event agent may be configured to access the storage locations of the registered variables and to capture the current values of each of the variables. This is illustrated at 2340.

The event agent may be configured to associate the captured values with the event and to store them in an event set, as in 2350. For example, the identifier and value of each registered variable may be stored as an extended address element in an event set, as described above. In some embodiments, a data space profiler may access this additional data in the event space when profiling the application, as in 2360. For example, relational agents may extract this data in order to associate costs of a system event with the user name on whose behalf the application is running when the system event is detected, the transaction executing an operation that caused the system event, or the database row being accessed when the system event was detected. The relational agents may extract cost data associated with the event and with a particular value of one or more of the registered variables by indexing on the value(s) of the one or more registered variables, as described above.

The data space profiler may in some embodiments include means to extend the profiling techniques for profiling network applications. Traditionally, in order to profile network applications, they needed to be booted in an artificial network with "nodes" in different network zones and the "network" encapsulated by the operating system. This technique may be limited in the number of nodes that may be supported and in the size of applications that may be profiled. The data space profiler described herein may in some embodiments include a tagging component, an event generating component, and a synchronization component to support data space profiling techniques as applied to network applications.

In some embodiments, the tagging component may associate network addresses, ports, protocols, source user-specified types, and other profiling objects and/or extended address elements with network event costs. The event cost through the protocol stack may be treated as a user-specified event within the operating system, in some embodiments. In this way, additional extended address elements representing a hardware context for a network application may be included in the profile data collected for analysis of the applications. Profiling data movement between two computing systems using these methods may involve profiling data movement between any two hardware and/or software systems that communicate with each other over a network, according to different embodiments. For example, these methods may be used to profile two instances of a network application executing on different hardware platforms that communicate with each other by sending messages over a network according to a client/server or peer-to-peer protocol.

In some embodiments, when a message is sent from one computing system to another computing system across a network, the message may be tagged with local extended address information by the first computing system. This extended address information may include contextual information for the message according to the configuration and/or operation of the first computing system. For example, a tagging component on the first computing system may tag the message with any or all of the extended address elements (i.e., their identifiers and their values) described herein and corresponding to software constructs, data allocations, hardware components, user-specified data (registered variable values), etc. In some embodiments, the message may be tagged with time stamp information corresponding to the time at which the message was sent and which may be considered yet another extended address element. In still other embodiments, the message may be tagged with information about how the message is sent via the network, such as an output port identifier, network protocol name or type, or a network address of the first computing system. This information may collectively be referred to as $A_{local}$ (the local extended address) of the message in the context of the first computing system.

When a second computing system receives the message, the extended address information received along with the message may be referred to as $A_{remote}$ (the remote extended address) of the message, in the context of the second computing system. In some embodiments, when the message is received, the second computing system may tag it with additional extended address information according to the configuration and/or operation of the second computing system. For example, the second computing system may tag the message with its own $A_{local}$ information, corresponding to a software construct, data allocation, hardware component, user-specified data value (registered variable value), time stamp (e.g., indicating the time that the message was received), an input port identifier, network protocol name or type, or a network address of the second computing system. In other embodiments, the second computing system may not tag the message with additional $A_{local}$ information until or unless a system event is detected.

In some embodiments, sending or receiving a network message may be considered a network event of interest for profiling and information corresponding to this event may be captured by one or more event agents of the first and/or second computing systems. For example, a network message may correspond to a transaction between two computing systems, such as a query message or a reply message sent in response to a query. In such embodiments, when a message is sent from a first to a second computing system, an event agent of the first computing system may capture $A_{local}$ information corresponding to the message and associate it with the event (e.g., sending a network message or initiating a transaction request) in an event set of the first computing system. In this example, when the message is received by the second computing system, an event agent of the second computing system may capture the $A_{remote}$ and/or additional $A_{local}$ information corresponding to the message and may associate it with the event (receiving a network message or transaction request) in an event set of the second computing system. Similarly, if a reply message is sent back to the first computing system from the second computing system, an event agent of the first computing system may be configured to capture the information tagged by the second computing system ($A_{local}$ in the context of the second computing system) and received along with the message as $A_{remote}$ for the received message in the context of the first computing system. In some embodiments, $A_{local}$ and $A_{remote}$ information for a pair of network messages (e.g., a query message and a corresponding reply message) may be associated with each other and with both messages in an event set of the first and/or the second computing system.

In other embodiments, when a different type of system event (i.e., other than the sending or receiving of a network message or transaction request/response) is detected, event agents of the affected computing system or systems may be configured to capture $A_{local}$ and/or $A_{remote}$ information corresponding to a current or most recent network message. For example, if a transaction or message received by the second computing system causes a system event in the second computing system, event agents of the second computing system may be configured to associate $A_{local}$ and $A_{remote}$ of the message with the event. Similarly, if a system event is detected on the first computing system that was caused by the network message or transaction (e.g., a network addressing error event or negative response to a query), event agents of the first computing system may be configured to associated $A_{local}$ and/or $A_{remote}$ of the message, transaction, or a message or transaction pair with the system event.

In another example, if a system event is detected on the second computing system that is not caused by a message or transaction itself, event agents of the second computing system may be configured to associate $A_{local}$ and/or $A_{remote}$ information of the most recent message or transaction sent or received with the system event. Similarly, if a system event is detected on the first computing system that is not caused by a message or transaction itself, event agents of the first computing system may be configured to associate $A_{local}$ and/or $A_{remote}$ information of the most recent message or transaction sent or received with the system event. In some such embodiments, $A_{local}$ and $A_{remote}$ information may be considered general system context information rather than as information associated only with a particular message or transaction. In such embodiments, each computing system, application executing on each computing system, or thread of each application executing on each computing system, for example, may maintain a single set of current values for $A_{local}$ and $A_{remote}$ corresponding to the last message sent or received or the current state of the computing system, rather than maintaining and/or storing a unique set of $A_{local}$ and/or $A_{remote}$ values for each message sent or received. For example, in some embodiments, when a transaction between two computing systems is initiated, $A_{local}$ and $A_{remote}$ information may be stored on the first and/or second computing systems as described herein. In some embodiments, when the transaction is complete, the $A_{local}$ and/or $A_{remote}$ information may be cleared. In other embodiments, the $A_{local}$ and/or $A_{remote}$ information stored in response to a first transaction may be replaced with new information corresponding to a subsequent transaction, when the subsequent transaction occurs.

Note that in some embodiments, a subset of the extended address elements (i.e., their identifiers and values) associated with an event (e.g., a network transaction) may be conveyed along with a network message. In some embodiments, the network application may register the extended address elements with an event agent to be conveyed along with network messages, in much the same manner as variables of an application are registered with other event agents. In some such embodiments, an event agent detecting a network event may be configured to capture and/or convey registered extended address element identifiers and their respective values along with a message sent or to capture registered extended address element identifiers and their respective values of received messages. In still other embodiments, an event agent detecting a system event may be configured to capture and associate the current state of the computing system as $A_{local}$ for the event when the event is detected and to associate the most recent $A_{remote}$ information (i.e., corresponding to the most recent network message or transaction) with the event.

Figure 28:
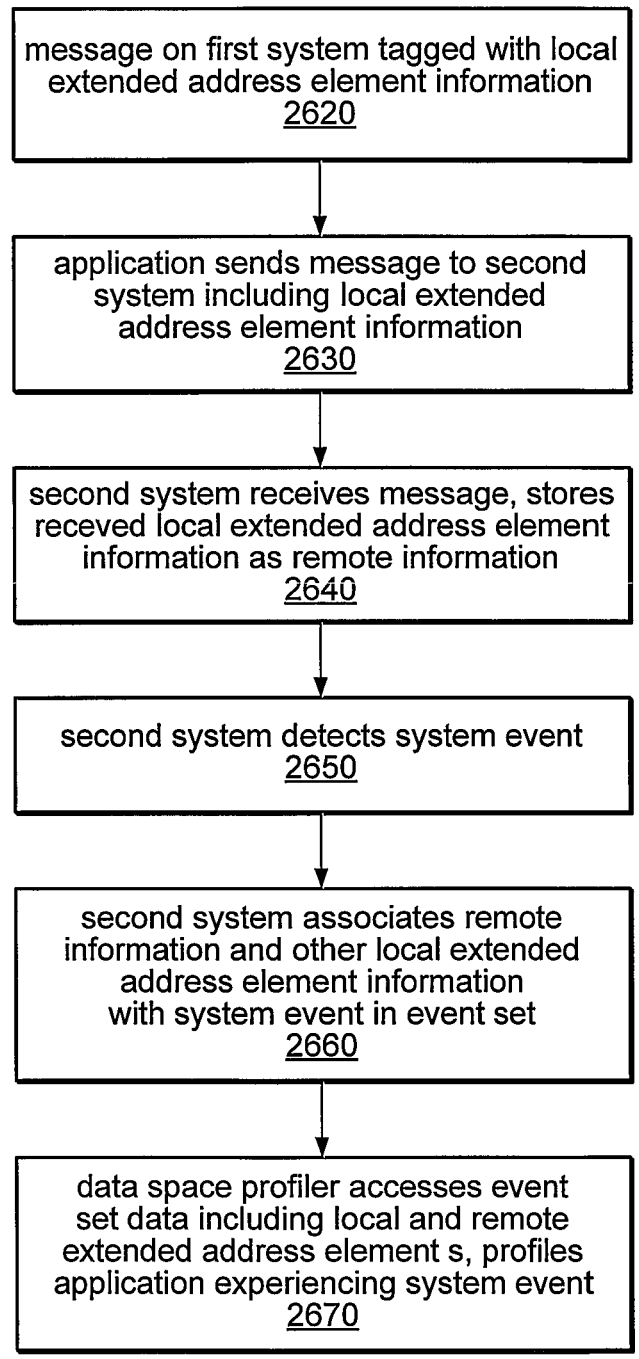
FIG. 28 is a flow chart illustrating a method of profiling an application across a network, according to one embodiment.

One method for associating network information with event costs is illustrated in FIG. 28. In this example, a message on a first computing system may be tagged with local extended address element information by a network application executing on the first system, as shown in 2620. The network application may send the message to a second computing system, including the local extended address element information, as in 2630.

In this example, the second computing system may receive the message along with the local extended address element information from the first computing system and may store the information as remote information of the second computing system. This is illustrated at 2640. As noted above, the local and remote extended address information may be associated with the message itself or may correspond to the most recent information associated with the application, a thread of the application, or a method of the application, in different embodiments. Also as noted above, the local and/or remote information sent and received/stored may correspond to a subset of available extended address information as specified in a registration of the subset of extended address elements with one or more event agents.

In the example illustrated in FIG. 28, the second computing system may detect a system event, as in 2650. As noted above, the system event may correspond to the sending or receiving of the network message/transaction itself, a system event caused by the network message/transaction, or another system event (i.e., one not caused by the network message/transaction). For example, an event agent may be configured to sample transactions between computing systems (e.g., by generating an event based on exceeding a predetermined count of the transactions) in order to profile the behavior of the underlying application(s), as previously described. In another example, an event agent may be configured to monitor the remote and/or local extended address information and to generate a system event in response to detecting a particular value or pattern of values in the information.

In response to detecting the system event, the second computing system may associate the remote information with the system event and may associate other local information with the event, as in 2660. As previously noted, the other local information (i.e., information that is local in the context of the second computing system) may be captured by an event agent at the time the message is received or may be captured by an event agent when the system event is detected, according to different embodiments. The remote and/or local information associated with the event by the event agent may be stored in an event set (e.g., an event space database) for later analysis.

In some embodiments, a data space profiler, such as the one described herein, may be configured to access the event set data, including the values of any or all of the local and remote extended address elements described herein, and may use the data in profiling the application experiencing the system event. This is illustrated at 2670. In some embodiments, relational agents may extract event data according to the values of one or more of the extended address elements, including the network information and/or time stamp information, and this data may facilitate the identification of performance bottlenecks and/or their causes. For example, the data may be used to identify an input or output port associated with an exceptional event cost or asymmetric resource utilization, such as an exceptionally slow input or output port or a port that is accessed disproportionately often within the system.

The event generating component (or event agent) may in some embodiments compute the latency for the network event, and based on required cost, may issue an event when the cost exceeds a threshold. Thus, the data space profiler may be configured to use statistical sampling for profiling distributed applications of any size, supported by the extensions described above.

Figure 29:
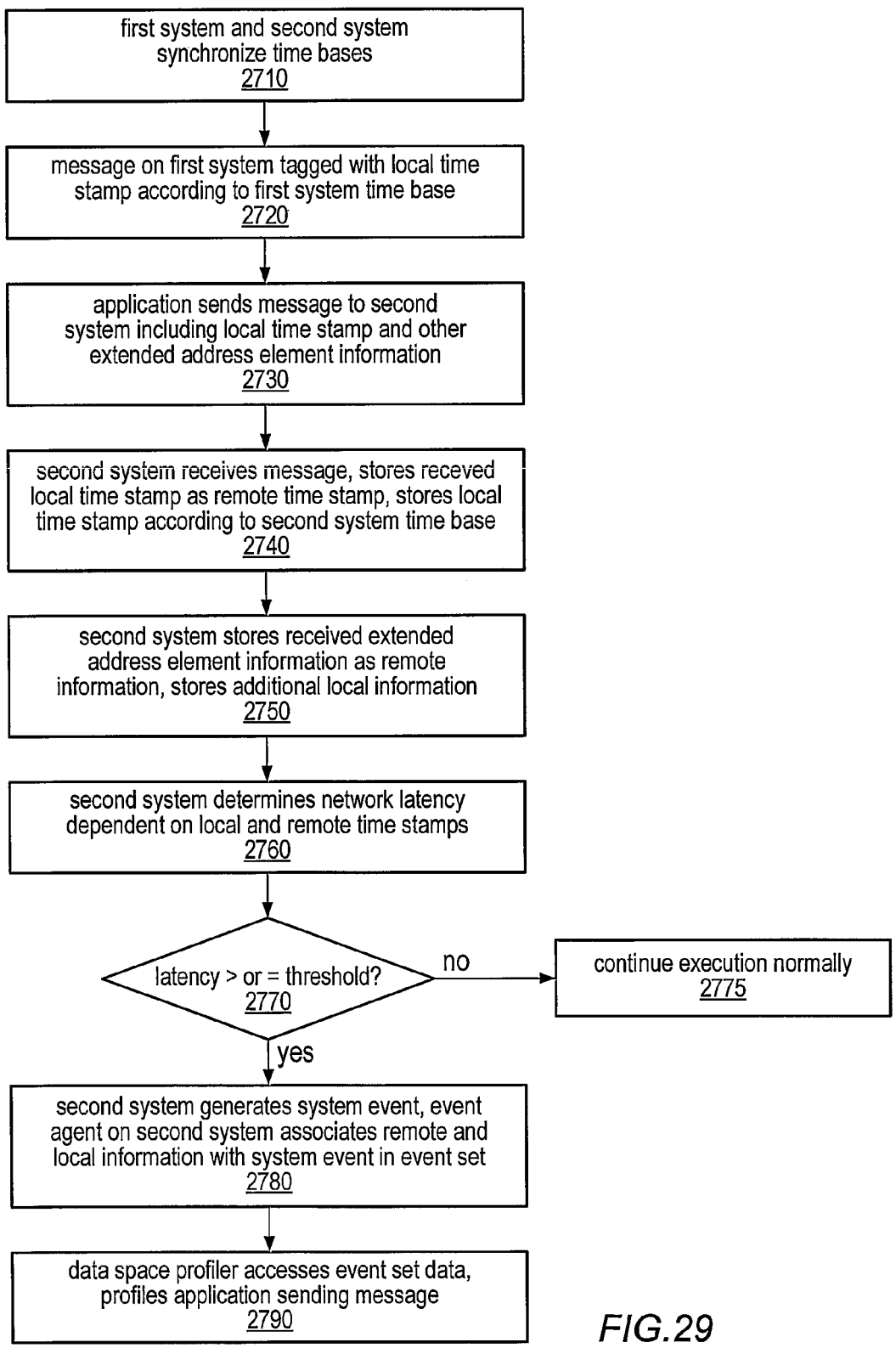
FIG. 29 is a flow chart illustrating a method of profiling an application across a network, according to a second embodiment.

One method for generating a system event based on computed network latency is illustrated in FIG. 29. In this example, a first computing system and a second computing system may each include one or more time bases. A time base of each of the computing systems may be synchronized with each other according to various known methods and within an acceptable margin (epsilon), as in 2710. For example, they may be synchronized using Network Time Protocol (NTP). The synchronization may be invoked by a network application running on the first computing system or by another means (e.g., the systems may be periodically synchronized by the operating system) in different embodiments.

In this example, a network message on the first system may be tagged with a local time stamp, according to the synchronized time base of the first system. This is illustrated at 2720. This time stamp may correspond to the time at which the message is sent and may be one of a plurality of extended address elements to be conveyed with the network message, as described above.

The network application executing on the first computing system may send the message to a second computing system including the local time stamp and any other relevant extended address element information. This information may collectively be referred to as $A_{local}$, in the context of the first computing system. This is illustrated at 2730.

The second computing system may receive the message and may store the received local time stamp (part of the first computing system's $A_{local}$) as a remote time stamp (part of the second computing system's $A_{remote}$). This is illustrated in 2740. The second system may also store a local time stamp (according to the synchronized time base of the second system) in response to receiving the message. In some embodiments, this local time stamp (part of the second computing system's $A_{remote}$) may correspond to the time at which the message was received.

As illustrated at 2750, other extended address element information (i.e., all or a portion of $A_{local}$ of the first computing system, including element identifiers and their values) received along with the network message may be stored as extended address elements of $A_{remote}$ on the second computing system. In addition, other local extended address element information (i.e., local to the second computing system) may be stored on the second computing system as part of $A_{local}$ of the second computing system.

In some embodiments, the second computing system may determine a value for network latency dependent on the time stamps in $A_{remote}$ (i.e., the time stamp when the message was sent) and in $A_{local}$ (i.e., the time stamp when the message was received.) This is illustrated at 2760. For example, the network latency may be calculated as the difference between these two time stamps, in some embodiments. In other embodiments, the network latency may be calculated as the difference between the two time stamps less any other time attributable to activities other than sending and receiving the message. For example, if an instruction or function of the network application that initiates sending the message includes an address calculation or translation, or if it must access data on the first computing system before sending it to the second system (but after tagging the message with a time stamp), the time to perform these operations may be subtracted from the time stamp difference to calculate the time spent in the network transfer. Similarly, if the instruction or function receiving the message on the second computing system includes other activities subsequent to receiving the message but before tagging the message with a time stamp, the time to perform these activities may be subtracted from the time stamp difference to calculate the network latency. In some embodiments, if the time bases of the first and second computing systems are calibrated to each other or to a reference time base rather than being synchronized to the same time, a calibration adjustment may be applied to the difference in the time stamps to calculate the network latency. In another example, the accuracy of the network latency calculation may be dependent in part on the accuracy of the synchronization of the two time bases (i.e., as a function of epsilon, described above.)

In some embodiments, the second system may be configured to determine if the calculated network latency meets or exceeds a pre-determined threshold, as shown in 2770. If not, illustrated by the negative exit from block 2770, execution of the network application may proceed normally, as in 2775. Network latency may be calculated for a single sampled message and/or may be calculated based on the accumulated latency across multiple samples during statistical sampling, in different embodiments. In one embodiment, the network latency values of multiple messages may be accumulated by an event agent and when the accumulated value (e.g., the total latency for multiple samples) meets or exceeds a pre-determined latency threshold, an event may be generated and/or a current message may be sampled. This event agent may be a software event agent or a hardware event agent, in different embodiments. In still other embodiments, the criteria for generating an event based on network latency may be defined in an expression that is evaluated against one or more collected and/or accumulated network latency values.

In some embodiments, if the threshold is met or exceeded, or if other criteria for generating a network latency event is met, as illustrated by the positive exit from block 2770, the second computing system may generate a system event. This is illustrated at 2780. In this example, when this event is detected, an event agent may associate $A_{remote}$ and/or $A_{local}$ information with the system event in the event set. This information may be accessed by a data space profiler, in some embodiments, and may be used to identify performance bottlenecks of the network application sending or receiving the message. This is illustrated at 2790. For example, when the network latency threshold is exceeded (indicating a slow network connection, stall, or other performance issue) the developer may extract other contextual information about the network activity at the time of this event, such as an identifier of the input and/or output port, the protocol being used, the network addresses of the sending and receiving computing systems, etc. This information may be extracted from the network message itself or from a statistical sample packet generated in response to detecting the event (i.e., that the threshold was exceeded), in different embodiments. Using this information the data space profiler may be configured to display information identifying, for example, that a particular port connection is down or is being accessed at a rate that is incompatible with its specified bandwidth. This information may in some embodiments be used by a developer or automatically (e.g., by an optimizing compiler) to improve the performance by re-configuring the computing system(s) and/or optimizing the network application code to correct a problem or avoid an observed asymmetric resource utilization.

While the example illustrated in FIG. 29 describes generating a system event in response to an observed network latency issue (e.g., a single or accumulated latency value exceeding a pre-determined threshold or meeting pre-determined network latency event criteria), in other embodiments, a computing system may be configured to generate a system event in response to other observed behavior of a network application by applying the system and methods described herein. For example, in some embodiments, the system and method described herein for capturing contextual information for a network application may be combined with the system and methods described herein for statistical sampling of system events and associating costs to these event to support profiling of distributed applications of arbitrary size and complexity. Accordingly, event agents of a computing system may be configured to generate system events (e.g., software traps) in response to detecting a value or pattern of interest for the values of any of the local or remote extended address elements sent, received, or otherwise determined during execution of an application being profiled. The techniques described above may be used to generate system events in response to a networking application meeting predetermined criteria related to network transaction metrics other than network latency, in some embodiments. For example, a system event may be generated in response to meeting event criteria defined by an expression dependent on a transmission rate, a number of transmissions, a re-transmission rate, a number of re-transmissions, a transmission failure rate, a number of transmission failures, a collision rate, a number of collisions, a transmission retry rate, a number of transmission retries, a transmission error rate, a number of transmission errors, or any other suitable networking performance metric or cost, in various embodiments. In some embodiments, the profile data associated with system events in an event space database may be filtered based on the value of one or more network performance metrics, stored as extended address elements associated with system events, when analyzing performance of a network application. For example, the data may be filtered such that only events in which a predetermined network latency threshold is exceeded are displayed during analysis.

Computing System and Data Flow

The described invention may be provided as a computer program product, or software, that may include a machine-readable medium having stored thereon instructions, which may be used to program a computer system (or other electronic devices) to perform the techniques of the present invention. For example, the various data space profiling methods described herein may be embodied in one or more of a data space profiling tool, a code optimizer, or a runtime library, according to different embodiments. In various embodiments, a machine-readable medium may include any mechanism for storing or transmitting information in a form (e.g., software, processing application) readable by a machine (e.g., a computer). The machine-readable medium may include, but is not limited to, magnetic storage medium (e.g., floppy disk); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 30:
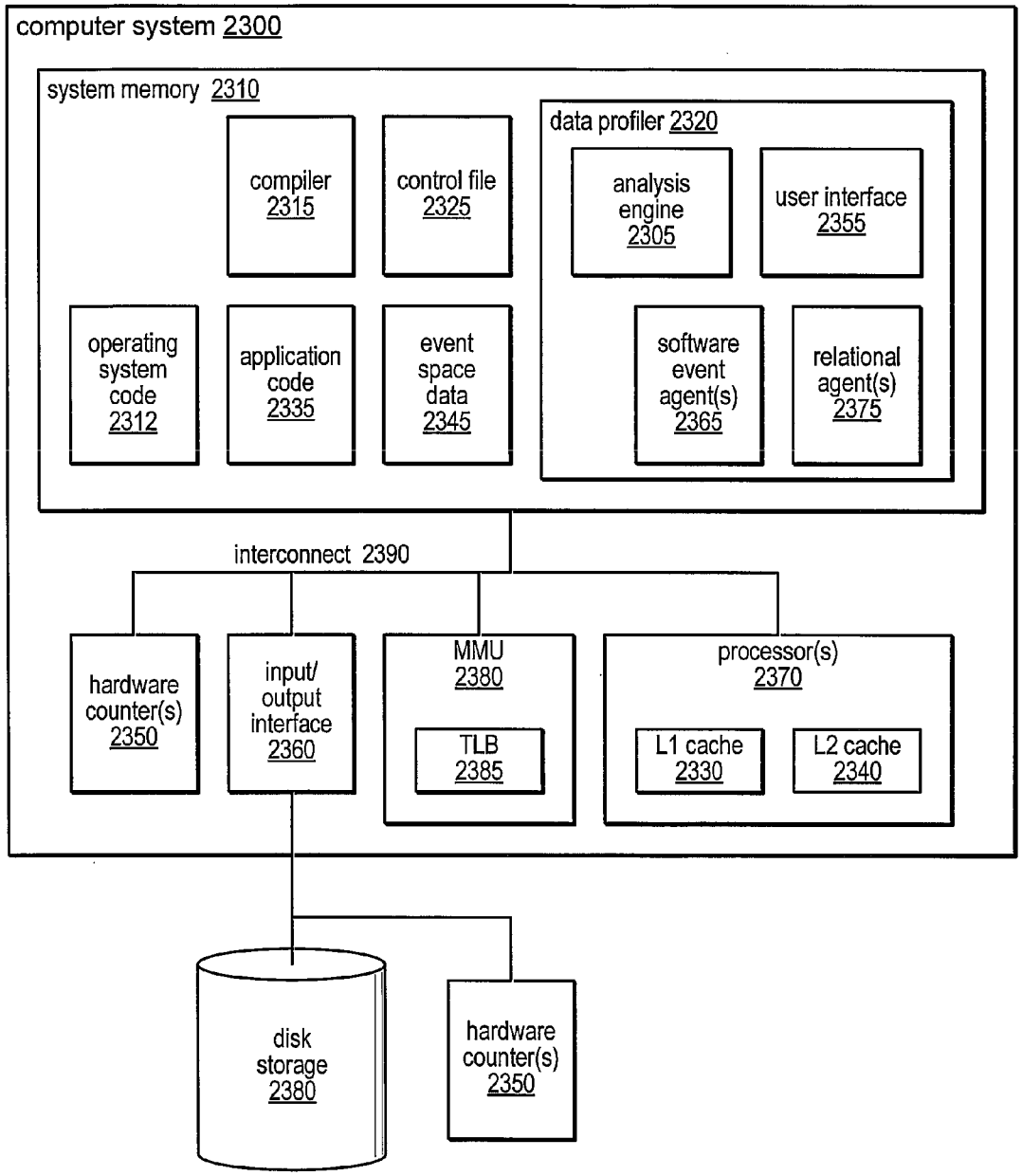
FIG. 30 is a block diagram of an exemplary computer system suitable for implementation of a data profiler, according to one embodiment.

An exemplary computer suitable for implementing the data space profiling system and methodology described herein is illustrated in FIG. 30. In this example, a computer system 2300 may include system memory 2310, one or more processors 2370, a memory management unit (MMU) 2380, one or more input/output interfaces 2360, one or more hardware counters 2350, and an interconnect 2390. Computer system 2300 may in some embodiments be communicatively coupled to one or more remote storage devices, such as disk storage 2380, and may also be coupled to one or more hardware event agents, such as hardware counter 2350.

System memory 2310 may in some embodiments include program instructions and data configured to implement data profiler 2320, which may perform the data space profiling operations described herein. Data profiler 2320 may include several software components including an analysis engine 2305, user interface 2355, one or more software event agents 2365, and one or more relational agents 2375, which may be configured to implement the operations for these components, as described herein. Software event agents 2365 may be configured to collect profile data associated with runtime events occurring during profiling of application code 2335, for example. In different embodiments, program instructions and data configured to implement data profiler 2320 may be partitioned into more, fewer, or different software modules than those illustrated in FIG. 30. For example, in some embodiments, the operations described as being part of user interface 2355 (e.g., GUI operations) may be integrated within analysis engine 2305. In other embodiments, one or more of event agents 2365 may be implemented on a different computer system and the profile data collected by them may be transmitted to computer system 2300 for analysis.

System memory 2310 may also include program instructions and data configured to implement compiler 2315, control file 2325, and operating system code 2312, in some embodiments. Control file 2325 may in some embodiments include configuration information to be used by the data space profiler. For example, it may include values for one or more presentation option settings (e.g., zoom level or profiling object tabs to display), aggregation (binning) rules, relational agent definitions, platform-specific options and definitions, etc. Operating system code 2312 may in some embodiments include one or more event agents 2365 and/or may be configured to received triggers, interrupts, event data packets, or other runtime-event-related information from various hardware event agents, such as hardware counters 2350. System memory 2310 may also include one or more application programs, such as application code 2335, which may be both executed and analyzed on computer system 2300. In other embodiments, application code 2335 may be executed on a computer system other than computer system 2300, but the resulting profile data may be analyzed on computer system 2300.

In some embodiments, system memory 2310 may also include a storage area for event space data 2345. Event space data 2345 may include any or all of the storage areas described herein for storing data space profiling data and/or results. For example, in some embodiments, event space data 2345 may include one or more per-thread or per-address-space event data repositories, one or more temporary data files used by the analysis engine, and one or more event space repositories, for storing the complete event space for an application profiling experiment. In other embodiments, these various event data storage areas may be partitioned into more, fewer, or different memory storage areas and/or may be distributed across multiple machines or computer systems. In one embodiment, one or more of these data event storage areas may be located on a remote storage device, such as disk storage 2380.

Processor 2370 may be configured to implement any of various instruction set architectures, such as x86, SPARC, PowerPC, etc. In some embodiments, processor 2370 may include a single CPU core, multiple CPU cores, or any combination of one or more general-purpose CPU cores and special-purpose cores (e.g., digital signal processors, hardware accelerators, co-processors, etc.) In various embodiments, processor 2370 may be configured to implement a superscalar architecture or may be configured to implement multi-threading. In some embodiments, processor 2370 may be a chip-multithreaded (CMT) processor, as described herein.

Interconnect 2390 may couple processor 2370 to memory 2310, as illustrated. In some embodiments, interconnect 2390 may be configured to couple processor 2370 directly to a computer system network. In some embodiments, interconnect 2390 and input/output interface 2360 may be configured to implement one or more of various interface or network standards, e.g., Peripheral Component Interconnect (PCI), Ethernet, HyperTransport (HT), Infiniband, or any variant or successor of these or other suitable input/output protocols.

Hardware event counters 2350 may in some embodiments be included in computer system 2300 to collect profiling data for runtime events occurring during profiling of application code 2335. In other embodiments, hardware counters 2350 and/or other hardware event agents may be included in other components of computer system 2300, such as in processor 2370. In still other embodiments, hardware counters 2350 and/or other hardware event agents may be located on computer systems separate from computer system 2300, such as if application code 2335 is executed on a different computer system and then analyzed on computer system 2300. For example, FIG. 30 illustrates an instance of hardware counter(s) 2350 located outside of computer system 2300 and coupled to disk storage 2380 and to input/output interface 2360. In this example, these hardware counters may by configured to capture events related to disk storage accesses. In embodiments including remote hardware event agents, triggers, interrupts, event data packets and/or other event-related profiling information may be transmitted from these hardware event agents to computer system 2300 for analysis by data profiler 2320 and/or analysis engine 2305.

Figure 31:
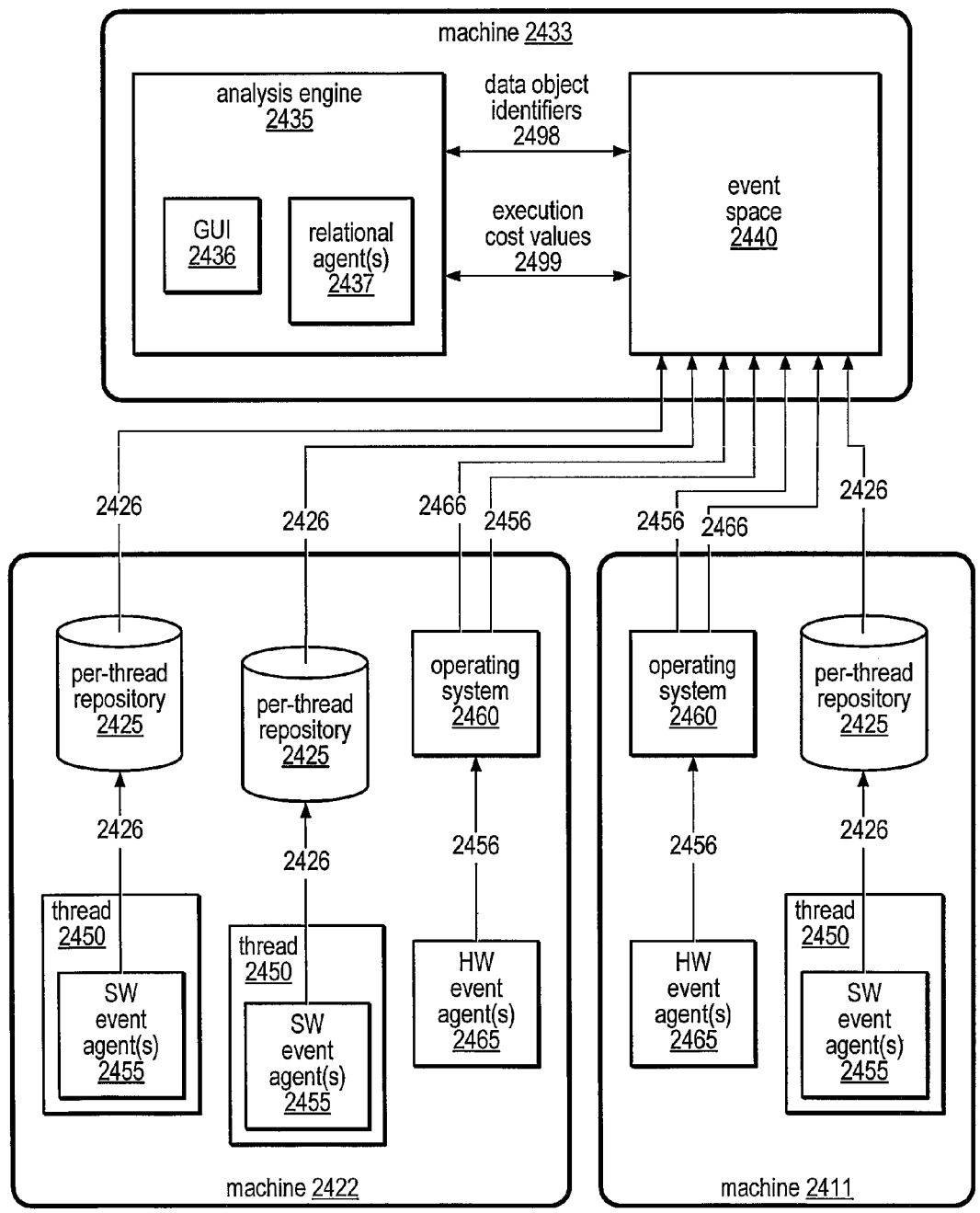
FIG. 31 is a data flow diagram illustrating data flow for an exemplary profiling experiment, according to one embodiment.

As noted above, the data space profiler described herein may be implemented on one machine but may be used to analyze profile data collected when an application runs on a separate machine or on multiple machines. FIG. 31 illustrates a data flow diagram for a profiling experiment involving a multi-threaded application executing on multiple machines.

In this example, two threads 2450 of an application execute on machine 2422 and another thread 2450 executes on machine 2411. Each thread 2450 includes one or more software event agents 2455, which transmit event data 2426 to a per-thread repository 2425, which is located on the same machine on which the thread executes. Each machine also includes one or more hardware event agents 2465, which transmit event data 2456 (e.g., a trigger or interrupt) to an operating system 2460 running on the same machine. Each operating system 2460 then transmits event data representing events detected by the hardware event agents (2456) and other event data 2466 (e.g., program counter values, physical addresses, etc.) related to runtime events of the threads operating on the same machine.

In this example, a third machine 2433 may include analysis engine 2435, which may include a graphical user interface, GUI 2436. Analysis engine 2435 may build event space 2440 on machine 2433 from event data received from machine 2422 and machine 2411 (e.g., event data 2426, 2456, and 2466 from per-thread repositories 2425 and operating systems 2460), in some embodiments. During analysis, relational agents 2437 of analysis engine 2435 may extract profiling object identifiers 2498 and event costs 2499 from event space 2440, as described herein. The filtered, sorted, and/or aggregated data may then be presented to a user (analyst) through GUI 2436.

Figure 32:
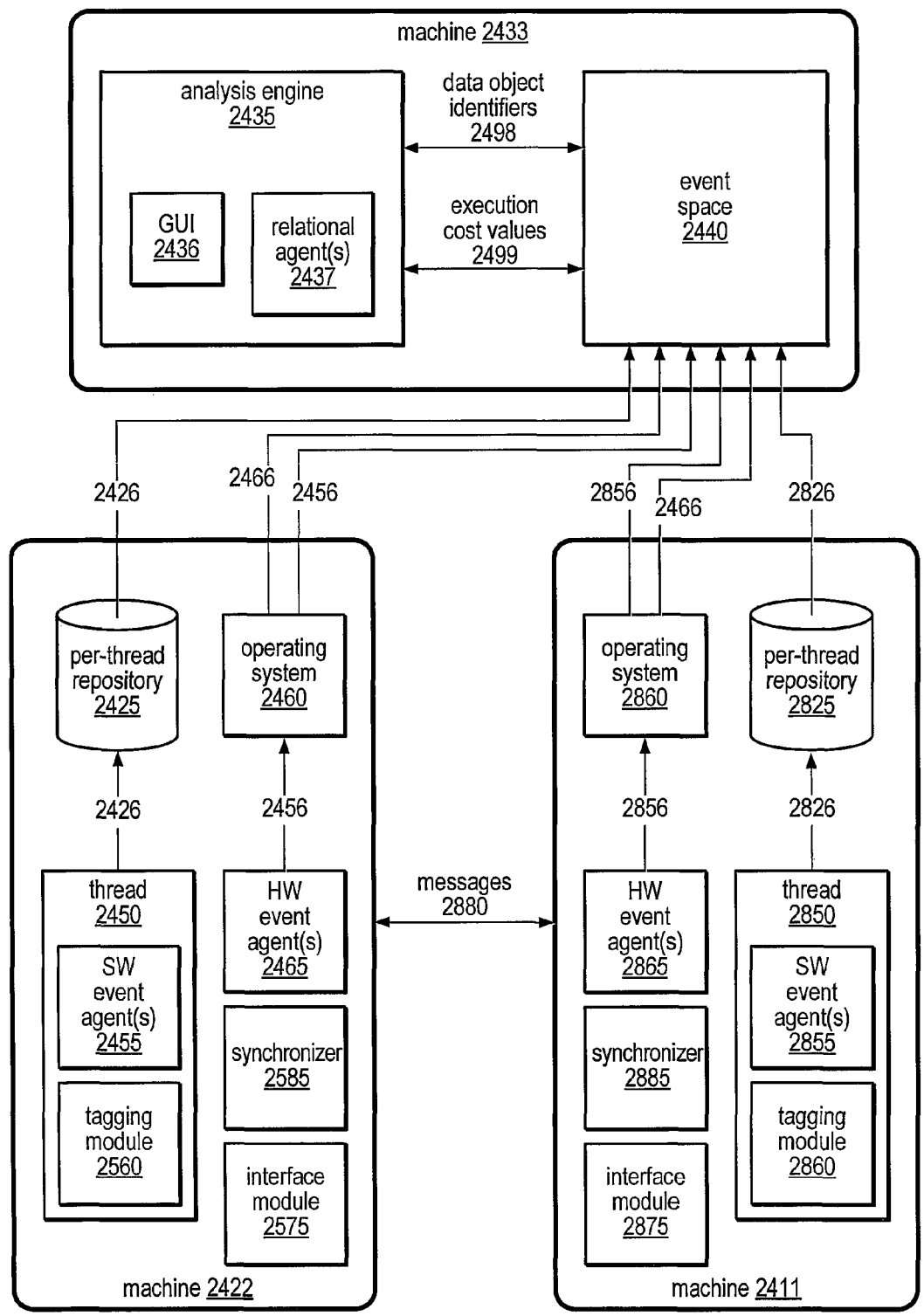
FIG. 32 is a data flow diagram illustrating data flow for an exemplary profiling experiment involving data movement between two computing systems, according to one embodiment.

As described above, data space profiling may in some embodiments be applied to network applications and may be used to profile data movement between computing systems, such as when transaction requests or other messages are sent between computing systems. As previously noted, data movement between two computing systems may involve data movement between any two hardware or software systems, including, but not limited to two similar software systems or applications executing on a same hardware platform (e.g., two Oracle databases on one machine), two dissimilar software systems or applications executing on the same or different machines, or two similar or dissimilar software applications operating on different machines. FIG. 32, for example, illustrates a data flow diagram for an exemplary profiling experiment involving data movement between two computing systems, according to one embodiment. In this example, a thread 2450 of a network application executing on machine 2422 may send a transaction request or other message to a thread 2850 of a different network application executing on machine 2411. In this example, the network applications executing on machines 2411 and 2422 may be similar, but threads 2450 and 2850 are threads of different applications. In another embodiment, they may be different threads of a same multi-threaded application distributed across the machines and configured to send and receive transaction requests or other messages from each other as described herein.

In the example illustrated by FIG. 32, each of machines 2411 and 2422 may include a synchronizer (2885 and 2585, respectively), which may be used to synchronize a time base on each of the machines, as previously described. In this example, thread 2450 and thread 2850 may send and receive messages 2880 between machines 2411 and 2422 according to a communication protocol of interface modules 2575 and 2875. Some messages 2880 may be used to synchronize time bases included in synchronizers 2885 and 2585, for example, while other messages may include transaction requests, transaction responses, status information, or any other type of data passed between network applications.

When a message 2880 is sent from thread 2450 on machine 2422, tagging module 2560 may be configured to tag the message with local extended address information, as described above. When the message is received by thread 2850 on machine 2411, the local extended address information received may be associated with the message by a software event agent 2855 on machine 2411 and stored as remote extended address information in per-thread repository 2825 on machine 2411.

A software event agent 2855 may tag the message with additional local extended address information (i.e., local in the context of machine 2411) when the message is received, in some embodiments. In other embodiments, a software agent 2855 may tag the message with additional local extended address information only when a system event (i.e., an event other than receiving the message) is detected by a hardware event agent 2865 or a software event agent 2855 of machine 2411. In still other embodiments, the received extended address information may not be associated with the received message, but may be stored on machine 2411 as remote extended address information corresponding to the current context of a network application executing on machine 2422. Similarly, additional local extended address information stored on machine 2411 may not be associated with a received message, but may correspond to the current context of a network application executing on machine 2411.

In some embodiments, when a system event is detected by a hardware event agent 2865 or a software event agent 2855 of machine 2411, the remote extended address information and additional local extended address information may be associated with the event and stored in per-thread repository 2825. This is illustrated in FIG. 32 as data 2826 being sent from thread 2850 to per-thread repository 2825. Similarly, a software event agent 2455 or hardware event agent 2465 of machine 2422 may associate local extended address information and/or remote extended address information with an event (e.g., sending or receiving a message to/from machine 2411 or another system event) detected on machine 2422 and may store this information in per-thread repository 2425. This is illustrated in FIG. 32 as data 2426 being sent from thread 2450 to per-thread repository 2425. As previously noted, local and/or remote extended address information on one or both of machines 2422 and 2411 may include one or more time stamps and/or various contextual information related to communication of the network applications executing on machines 2422 and/or 2411 (e.g., network addresses, port identifiers/addresses, protocol identifiers, etc.)

The local and remote extended address information, including any time stamps and/or other contextual information may be transmitted to machine 2433 for analysis by operating systems 2460 and 2860, in some embodiments. An analysis engine may then build an event space 2440, as previously described, and may access this event data to profile the one or more network applications executing on machines 2411 and 2422.

Note that although FIG. 32 and other examples described herein refer to message sent between two computing systems, the methods described herein may be applied to network application that send messages to multiple computing systems (e.g., using broadcast rather than unicast messages). In such embodiments, each of the computing systems receiving the messages may store the received extended address information as remote extended address information and may add its own local extended address information at the time the message is received or in response to another system event being detected. Similarly, hardware or software event agents on any of the receiving machines may be configured to generate a system event dependent on the behavior of the network application in its own context. For example, each computing system may determine if a network latency calculated between it and the sending system exceeds a predetermined threshold, and may generate a system event indicating a latency issue independent of a network latency calculated by the other computing systems. Alternatively, in some embodiments a first computing system may receive messages from network applications of multiple other computing systems. The receiving system may receive extended address information as remote extended address information for each of the other computing systems and may add its own local extended address information to the message and/or associate local information with a system event, as described herein.

Using the above-described techniques, the data space profiler may be applied to network applications of arbitrary size and complexity, executing on an arbitrary number of computing systems, according to various embodiments. Thus, the data space profiler may in some embodiments use the additional contextual information provide by these techniques to profile the execution of the application across these computing systems to identify performance bottlenecks and their causes.

While the invention has been described with reference to various realizations, it will be understood that these realizations are illustrative and that the scope of the invention is not limited to them. Many variations, modifications, additions, and improvements are possible. For example, while much of the description herein has focused on the illustrative context of memory reference related runtime events, applications to other runtime events and related profiling are also envisioned. Similarly, although instruction instance level profiling has been presumed, techniques described herein may be more generally applied to operations of a processor, pipeline or execution unit, whether such operations correspond one-to-one with instructions of an instruction set or are lower-level or higher-level operations performed by a particular implementation of a target architecture. For example, based on the description herein, persons of ordinary skill in the art will appreciate extensions to operations executable by a microcoded processor implementation or virtual machine implementation.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method, comprising:
 a hardware processor sending a message to one or more system components in a computing system;
 an event agent of the hardware processor receiving a reply to the message from one of the one or more system components, wherein the reply comprises data supplied by a source in response to the message and a source type indicator for the source of the data, and wherein the source type indicator is set to one of a plurality of values, wherein the plurality of values comprises two or more of:
  a value that characterizes the source of the data as being a remote source, relative to the hardware processor,
  a value that characterizes the source of the data as being a local source, relative to the hardware processor,
  a value that characterizes the source of the data as being a private storage location,
  a value that characterizes the source of the data as being a shared storage location,
  a value that characterizes the source of the data as being in a different coherency domain than an originator of the message,
  a value that characterizes the source of the data as being in a same coherency domain as an originator of the message, or
  a value that indicates the data was supplied via a cache-to-cache transfer;

the event agent detecting a runtime system event in the computing system dependent on the reply, wherein the runtime system event is a system event that occurs as a result of executing a particular software application whose behavior during execution is being profiled and on whose behalf the message was sent; and the event agent associating an indication of the source type with the detected event in an event set, wherein the indication is dependent on the source type indicator that was included in the reply.

2. The method of claim 1, further comprising the event agent sampling the event, wherein said sampling comprises:

capturing extended address information corresponding to an instruction on whose behalf the message was sent, wherein the extended address information comprises one or more of: a time, an identifier of a hardware component, an identifier of a software construct, an identifier of a data allocation, an identifier of a protocol, a physical address, a virtual address, a cost value, or a register value; and associating the extended address information corresponding to the instruction with the detected event in the event set.

3. The method of claim 1, wherein the message comprises an identifier of a thread requesting data, further comprising the event agent associating the identifier with the detected event and the indication of the source type in the event set.

4. The method of claim 1, wherein the message comprises a transaction request and the reply comprises a transaction response, further comprising the event agent associating extended address information corresponding to the transaction request with the detected event and the indication of the source type in the event set.

5. The method of claim 1, wherein the detected event comprises one of: a specified data reference, a reference to a storage location in a specified hierarchy level, a hit in a cache, a miss in a cache, a coherency domain crossing, a remote memory access, a cache-to-cache transfer, or a hardware event counter condition.

6. A computer-implemented method, comprising:

a system component receiving a message comprising a data request from a hardware processor; and the system component sending a reply message to the hardware processor in response to the data request, wherein the reply message comprises data supplied by a source satisfying the data request and a source type indicator for the source of the data, and wherein the source type indicator is set to one of a plurality of values, wherein the plurality of values comprises two or more of:

a value that characterizes the source of the data as being a remote source, relative to the hardware processor, a value that characterizes the source of the data as being a local source, relative to the hardware processor, a value that characterizes the source of the data as being a private storage location, a value that characterizes the source of the data as being a shared storage location, a value that characterizes the source of the data as being in a different coherency domain than an originator of the data request, a value that characterizes the source of the data as being in a same coherency domain as an originator of the data request, or a value that indicates the data was supplied via a cache-to-cache transfer;

wherein information included in the reply message is to be used by the hardware processor in detecting, in response to receiving the reply message, a system event that occurs as a result of executing a particular software application whose behavior during execution is being profiled and on whose behalf the message was sent; and wherein the source type indicator is to be used by the hardware processor for storing in association with the detected event in an event set.

7. The method of claim 6, wherein the reply message further comprises an identifier of the system component.

8. The method of claim 6, further comprising an intermediate component relaying the reply to the hardware processor, wherein relaying the reply comprises:

receiving the reply;

modifying the reply to indicate that the reply was relayed via the intermediate component; and sending the modified reply to the hardware processor.

9. The method of claim 6, further comprising:

the hardware processor receiving the reply message;

the hardware processor detecting a runtime system event in response to receiving the reply message and dependent at least in part on information comprised in the reply message, wherein the runtime system event is a system event that occurs as a result of executing a particular software application on whose behalf the message was sent; and the hardware processor associating the source type indicator with the detected event in an event set.

10. A computing system, comprising:

a hardware processor; and a memory comprising program instructions executable by the hardware processor to implement a particular software application whose behavior during execution is to be profiled;

wherein the program instructions are configured to implement:

sending a message to one or more system components;

receiving a reply to the message, wherein the reply comprises data supplied by a source in response to the message and a source type indicator for the source of the data, and wherein the source type indicator is set to one of a plurality of values, wherein the plurality of values comprises two or more of:

a value that characterizes the source of the data as being a remote source, relative to the hardware processor, a value that characterizes the source of the data as being a local source, relative to the hardware processor, a value that characterizes the source of the data as being a private storage location, a value that characterizes the source of the data as being a shared storage location, a value that characterizes the source of the data as being in a different coherency domain than an originator of the message, a value that characterizes the source of the data as being in a same coherency domain as an originator of the message, or a value that indicates the data was supplied via a cache-to-cache transfer;

detecting a runtime system event dependent on the reply, wherein the runtime system event is a system event that occurs as a result of executing the program instructions that implement the particular software application on whose behalf the message was sent; and associating an indication of the source type with the detected event in an event set, wherein the indication is dependent on the source type indicator that was included in the reply.

11. The computing system of claim 10,
wherein the program instructions are further configured to implement sampling an instruction on whose behalf the message was sent, wherein said sampling comprises:

capturing extended address information corresponding to the instruction, wherein the extended address information comprises one or more of: a time, an identifier of a hardware component, an identifier of a software construct, an identifier of a data allocation, an identifier of a protocol, a physical address, a virtual address, a cost value, or a register value; and associating the extended address information with the detected event and the indication of the source type in the event set.

12. The computing system of claim 10, wherein the message comprises an identifier of a thread requesting data;

wherein in response to detecting the event, the program instructions are further configured to associate the thread identifier with the detected event and the indication of the source type in the event set.

13. The computing system of claim 10,
wherein the message comprises a transaction request;
wherein the reply comprises a corresponding transaction response;
wherein in response to detecting the event, the program instructions are further executable to associate extended address information corresponding to the transaction request with the detected event and the indication of the source type in the event set.

14. The computing system of claim 10, wherein the detected event comprises one of: a specified data reference, a reference to a storage location in a specified hierarchy level, a hit in a cache, a miss in a cache, a coherency domain crossing, a remote memory access, a cache-to-cache transfer, or a hardware event counter condition.

* * * * *

UNITED STATES PATENT AND TRADEMARK OFFICE
CERTIFICATE OF CORRECTION

| | | |
|---|---|---|
| PATENT NO. | : 8,762,951 B1 | Page 1 of 1 |
| APPLICATION NO. | : 11/689359 | |
| DATED | : June 24, 2014 | |
| INVENTOR(S) | : Kosche et al. | |

It is certified that error appears in the above-identified patent and that said Letters Patent is hereby corrected as shown below:

In the Drawings

On sheet 45 of 48, in figure 29, under Reference Numeral 2740, line 1, delete "receved" and insert -- received --, therefor.

In the Specification

In column 14, line 49, delete "determined" and insert -- determined. --, therefor.

In column 24, line 51, delete "performance" and insert -- performance. --, therefor.

In column 27, line 62, delete "_junc" and insert -- _func --, therefor.

In column 28, line 4, delete "_junction" and insert -- _function --, therefor.

In column 33, line 9, delete "minor" and insert -- minor. --, therefor.

In column 34, line 57, delete "determined" and insert -- determined. --, therefor.

In column 77, line 38, delete "may by" and insert -- may be --, therefor.

Signed and Sealed this
Third Day of March, 2015

Michelle K. Lee
*Deputy Director of the United States Patent and Trademark Office*